(12) United States Patent
Kitano

(10) Patent No.: US 6,903,945 B2
(45) Date of Patent: Jun. 7, 2005

(54) SWITCHING POWER SUPPLY APPARATUS

(75) Inventor: Saburou Kitano, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 117 days.

(21) Appl. No.: 10/649,800

(22) Filed: Aug. 28, 2003

(65) Prior Publication Data
US 2004/0042239 A1 Mar. 4, 2004

(30) Foreign Application Priority Data

Aug. 28, 2002 (JP) .............................. 2002-249260

(51) Int. Cl.$^7$ ............................................ H02M 3/335
(52) U.S. Cl. ...................................... 363/21.01; 363/97
(58) Field of Search ................... 363/20, 21.01, 363/49, 95, 97

(56) References Cited

U.S. PATENT DOCUMENTS

| | | | | |
|---|---|---|---|---|
| 5,671,131 A | * | 9/1997 | Brown ......................... | 363/49 |
| 6,125,046 A | * | 9/2000 | Jang et al. ................ | 363/21.15 |
| 6,542,387 B2 | * | 4/2003 | Tsuge ....................... | 363/21.01 |
| 6,549,429 B2 | * | 4/2003 | Konno ...................... | 363/21.04 |
| 6,671,188 B2 | * | 12/2003 | Morita ..................... | 363/21.01 |
| 6,714,425 B2 | * | 3/2004 | Yamada et al. ........... | 363/21.12 |

FOREIGN PATENT DOCUMENTS

| | | |
|---|---|---|
| JP | 8-18585 B2 | 2/1996 |
| JP | 10-304658 A | 11/1998 |
| JP | 2001-086745 A | 3/2001 |
| JP | 2001-346378 A | 12/2001 |
| JP | 2002-58238 A | 2/2002 |

OTHER PUBLICATIONS

Technical Data of an Energy–Saving Three–Terminal IPD (Intelligent Power Device) Manufactured by Panasonic (Matsushita Electric Industry Co. Ltd.) pp. 84–87, no date.

* cited by examiner

*Primary Examiner*—Adolf Berhane
(74) *Attorney, Agent, or Firm*—Birch, Stewart, Kolasch & Birch, LLP

(57) ABSTRACT

A switching power supply apparatus operates with less power consumption as a whole as a result of reduced power loss suffered while the switching operation of the main switching device is being stopped in burst switching control. Burst switching control is achieved by a signal level checker circuit 15 repeatedly turning on and off a switch circuit 17 provided in the line by way of which a switching controller circuit 19 is supplied with operating power. In burst switching control, when the switching operation of a main switching device 5 is being stopped, the supply of operating power to the switching controller circuit 19 is also stopped. This helps reduce the power loss suffered while the switching operation is being stopped, and thus helps reduce the power consumption of the apparatus as a whole.

28 Claims, 22 Drawing Sheets

SWITCHING POWER SUPPLY APPARATUS

This nonprovisional application claims priority under 35 U.S.C. § 119(a) on Patent Application No.2002-249260 filed in JAPAN on Aug. 28, 2002, which is herein incorporated by reference.

BACKGROUND OF THE INVENTION

1. Field of the Invention

The present invention relates to a switching power supply apparatus used as a direct-current power source in an electronic appliance.

2. Description of the Prior Art

A conventionally known example of such a switching power supply apparatus is disclosed, for example, in Japanese Patent Application Laid-Open No. H10-304658. The switching power supply apparatus disclosed in this publication is provided with a main switch that turns on and off a direct current applied to the primary coil of a transformer, a secondary-side rectifying/smoothing circuit that rectifies and smoothes the on/off signal induced in the secondary coil of the transformer so as to supply it as a main output signal, a subsidiary power source that rectifies and smoothes the on/off signal induced in the bias coil of the transformer so as to supply it as a subsidiary supply voltage, an error amplifier that generates an error voltage signal that represents the difference between the subsidiary supply voltage output from the subsidiary power source and a reference voltage, and a comparator that feeds the main switch with an on/off control signal in such a way as to reduce the error voltage signal output from the error amplifier. This switching power supply apparatus is further provided with a light-load switching controller portion that temporarily stops the on/off operation of the main switch when the main output voltage becomes higher than an upper limit voltage and that restarts the on/off operation of the main switch when the main output voltage becomes lower than a lower limit voltage.

In this conventional switching power supply apparatus, control is so performed that the on/off operation of the main switch is temporarily stopped when the main output voltage output from the secondary-side rectifying/smoothing circuit becomes higher than the upper limit voltage, and that the on/off operation of the main switch is restarted when the main output voltage becomes lower than the lower limit voltage.

Here, however, while the on/off operation of the main switch is temporarily stopped when the main output voltage becomes higher than the upper limit voltage, operating power is kept supplied to the individual circuits and control devices provided in the control circuit that drives and controls the main switch. This causes wasteful power loss. Specifically, in a configuration where the on/off operation of the main switch is temporarily stopped when the main output voltage output from the secondary-side rectifying/ smoothing circuit becomes higher than the upper limit voltage and the on/off operation of the main switch is restarted when the main output voltage becomes lower than the lower limit voltage, i.e., in so-called burst switching control, the operating power is kept supplied to all the circuits and control devices provided in the control circuit even while the switching operation is being stopped. This causes wasteful consumption of the supply current, resulting in wasteful power loss.

Also in the conventional switching power supply apparatuses disclosed in Japanese Patent Applications Laid-Open Nos. 2001-346378 and 2002-58238, as in the switching power supply apparatus described above, even during the period in which the switching operation of the main switch is being stopped in burst switching control, the operating power is kept supplied to all the circuits and control devices provided in the switching signal controlling circuit. This causes wasteful consumption of the supply current, resulting in wasteful power loss.

Incidentally, in the conventional switching power supply apparatus disclosed in Japanese Patent Application Laid-Open No. 2001-86745, to reduce power consumption in a stand-by state, the switching operation of the main switching device is stopped in that state. Thus, the aim of this invention is not to reduce the power loss suffered while the switching operation of the main switching device is being stopped in burst switching control.

SUMMARY OF THE INVENTION

To facilitate a complete understanding of the invention, a glossary of terms and acronyms is provided on the last page of the specification before the claims.

An object of the present invention is to provide a switching power supply apparatus that operates with less power consumption as a whole as a result of reduced power loss suffered while the switching operation of the main switching device is being stopped in burst switching control.

To achieve the above object, according to one aspect of the present invention, a switching power supply apparatus has a serial circuit, including the primary coil of a transformer and a main switching device, connected between a positive and a negative power supply line connected to a direct-current power source. The switching power supply apparatus outputs a direct-current voltage obtained by rectifying with a rectifier a high-frequency voltage induced in the secondary coil of the transformer by the main switching device performing switching operation. Here, the switching power supply apparatus uses as a feedback signal the result of comparison between the direct-current voltage and a predetermined reference voltage, and drives the main switching device by turning on and off, according to the signal level of the feedback signal, supply of operating power to a main switching device driving system that drives the main switching device.

In this switching power supply apparatus according to the invention, for example, in heavy-load operation, the output voltage decreases. To correct this, a lower-level feedback signal is generated. This causes the operating power to the main switching device driving system to be kept supplied thereto, and thus the main switching device continues switching operation. On the other hand, in light-load operation, when the output voltage becomes higher than a predetermined value, a higher-level feedback signal is generated. This causes the supply of the operating power to the switching device driving system to be stopped, and thus the main switching device stops switching operation. As a result, the output voltage returns to the predetermined value.

That is, with this switching power supply apparatus according to the invention, while the switching operation of the main switching device is being stopped in burst switching control, the supply of the operating power to the main switching device driving system is also stopped. This helps reduce the power loss suffered while the switching operation is being stopped, and thus helps reduce the power consumption of the apparatus as a whole.

According to another aspect of the present invention, a switching power supply apparatus has a serial circuit, including the primary coil of a transformer and a main switching device, connected between a positive and a negative power supply line connected to a direct-current power source. The switching power supply apparatus outputs a direct-current voltage obtained by rectifying with a rectifier a high-frequency voltage induced in the secondary coil of the transformer by the main switching device performing switching operation. Here, the switching power supply apparatus further includes: an output voltage detector that compares the direct-current voltage obtained through rectification with a predetermined reference voltage and that outputs the result of the comparison as a feedback signal; a switching controller that drives and controls the main switching device according to the feedback signal output from the output voltage detector; a signal level checker that monitors the signal level of the feedback signal and that outputs an operation control signal for turning on and off the switching controller according to the monitored signal level; and an operation/nonoperation switcher that is provided in the line by way of which the switching controller is supplied with operating power and that turns on and off the switching controller according to the operation control signal from the signal level checker.

In this switching power supply apparatus according to the invention, in light-load operation, when the output voltage tends to increase, i.e., when the output voltage is higher than a predetermined value, and thus the signal level of the feedback signal output from the output voltage detector is, for example, high, the signal level checker feeds the operation/nonoperation switcher with an operation control signal that requests nonoperation, and thus the operation/nonoperation switcher stops the supply of the operating power to the switching controller.

As a result, the main switching device stops switching operation, and thus the output voltage starts to decrease gradually. When the signal level of the feedback signal from the output voltage detector becomes, for example, low, the signal level checker feeds the operation/nonoperation switcher with an operation control signal that requests operation, and thus the operation/nonoperation switcher starts the supply of the operating power to the switching controller.

As a result, the main switching device restarts switching operation, and thus the output voltage starts to increase gradually. When the signal level of the feedback signal becomes high again, the signal level checker feeds the operation/nonoperation switcher with an operation control signal that requests nonoperation, and thus the operation/nonoperation switcher stops the supply of the operating power to the switching controller. As a result, the main switching device stops switching operation, and thus the output voltage starts to decrease gradually. As this sequence of operations is repeated, the output voltage is kept at the predetermined value.

In this switching power supply apparatus, when the output voltage tends to decrease, i.e., when the output voltage is lower than a predetermined value, and thus the signal level of the feedback signal output from the output voltage detector is, for example, low, the signal level checker feeds the operation/nonoperation switcher with an operation control signal that requests operation, and thus the operation/nonoperation switcher continues supplying the operating power to the switching controller so that switching operation is performed continuously.

With this switching power supply apparatus according to the invention, burst switching control is achieved as a result of the signal level checker repeatedly turning on and off the operation/nonoperation switcher provided in the line by way of which the switching controller is supplied with operating power. Moreover, while the switching operation of the main switching device is being stopped in burst switching control, the supply of the operating power to the switching controller is also stopped. This helps reduce the power loss suffered while the switching operation is being stopped, and thus helps reduce the power consumption of the apparatus as a whole.

Preferably, the feedback signal from the output voltage detector is transmitted to the switching controller through the photodiode of a photocoupler, and the signal level checker monitors the signal level of the feedback signal by comparing the current level flowing through the phototransistor of the photocoupler with a reference current level.

With this configuration, burst switching operation is controlled according to the result of comparison between the current value through the phototransistor and the reference current value. The signal level of the feedback signal (i.e., the current value through the phototransistor) represents the load current value of the switching power supply apparatus. Thus, it is possible to correctly set the load current value at which switching between continuous switching operation and burst switching operation is performed.

In burst switching operation, the output voltage fluctuates. However, since the signal level of the feedback signal represents the output voltage value, it is possible to correctly set the upper and lower limits of the output voltage.

Preferably, a current detection resistor is connected in series with the phototransistor of the photocoupler, and the signal level checker turns on and off the switching controller by feeding the switching controller with, as the operation control signal, a signal obtained by comparing the voltage drop across the current detection resistor with the voltage of a current level check reference power source.

With this configuration, it is possible to make the signal level checker detect the signal level of the feedback signal according to the voltage drop across the current detection resistor, compare the signal level with the voltage of the current level check reference power source, and turn on and off the supply of the operating power to the switching controller according to the result of the comparison.

Preferably, the operating power of the switching controller is supplied by way of the start-up current supply line by way of which a start-up current is supplied from the positive power supply line through a start-up resistor, or by way of the steady-operation current supply line by way of which a voltage induced in the subsidiary coil of the transformer is supplied after being rectified with a serial circuit composed of a plurality of diodes, and the operating power of the signal level checker is supplied from subsidiary control power extracted from a node between the plurality of diodes.

With this configuration, when the switching power supply apparatus starts to start up, it is possible to prevent, by the action of the diodes, the current that is supposed to flow to the start-up current supply line from flowing to the steady-operation current supply line. This helps reduce the time required for start-up, and also helps reduce the resistance of the start-up resistor and thereby reduce power consumption.

In other words, as compared with a switching power supply apparatus that is not provided with the function of controlling burst switching in such a way as to stop the supply of the operating power to the switching controller that performs burst switching operation when the switching power supply apparatus starts to start up, the switching power supply apparatus of the present invention starts up in as short a time while reducing the unnecessary power consumption by the start-up resistor.

Preferably, the operating power of the signal level checker and the phototransistor of the photocoupler is supplied from subsidiary control power extracted from a node between a plurality of diodes constituting a serial circuit provided in the steady-operation current supply line by way of which a voltage induced in the subsidiary coil of the transformer is supplied after being rectified with the plurality of diodes.

With this configuration, when the switching power supply apparatus starts to start up, the diodes prevent the start-up current from flowing to the subsidiary control power. This helps shorten the start-up time. Moreover, in the steady operation, the direct-current voltage obtained by rectifying the voltage induced in the subsidiary coil of the transformer is fed as the operating power to the signal level checker and the phototransistor of the photocoupler. This ensures stable operation.

Preferably, the switching controller is realized as a PWM control circuit that outputs, as the drive signal with which to drive the main switching device, a pulse signal that is pulse-width-modulated according to the voltage level of the feedback signal from the output voltage detector.

With this configuration, the main switching device is driven with a drive signal accurately commensurate with the voltage level of the feedback signal. This helps enhance the stability of the output voltage of the switching power supply apparatus.

Preferably, used as the PWM control circuit is a PWM control IC (for example, an IC with the product number FA5511 manufactured by Fuji Electric Co., Ltd.) that is realized as an integrated circuit chip having at least an FB terminal to which a voltage related to the feedback signal is input and a CS terminal to which a voltage for enabling or disabling an internal circuit is input.

With this configuration, it is possible to reduce the space occupied by the circuit that drives the main switching device, and to enhance the stability of the output voltage, leading to miniaturization of the apparatus.

Preferably, when a PWM control IC is used as the switching controller, a start-up corrector is additionally provided to correct the start-up of the PWM control IC; a first resistor is connected between the FB terminal of the PWM control IC and the negative power supply line; the signal level checker feeds a CS terminal controller, which serves as the operation/nonoperation switcher, and the FB terminal with the operation control signal and an inverted feedback signal, respectively, according to the result of checking of the signal level of the feedback signal; the CS terminal controller connects and disconnects the CS terminal of the PWM control IC to and from the negative power supply line according to the operation control signal; and the start-up corrector connects and disconnects, through a second resistor, the FB terminal to and from the negative power supply line according to the voltage level of the subsidiary control power.

With this configuration, at the start-up of the switching power supply apparatus, when the voltage of the subsidiary control power increases, immediately before a current starts to flow through the phototransistor, the start-up corrector connects the second resistor in parallel with the first resistor and thereby reduces the resistance between the FB terminal and the negative power supply line. This causes the potential at the FB terminal to decrease. In this way, when the switching power supply apparatus starts to start up, the voltage at the FB terminal is kept at the optimum level to permit reliable rising of the output voltage. In addition, in the steady state, the switching power supply apparatus is permitted to output a reliably stabilized voltage.

Preferably, the signal level checker includes a pair of transistors having the emitters thereof connected together to form a comparator, with the base of one of the transistors connected to the node between the current detection resistor and the phototransistor, with the base of the other of the transistors connected to the current level check reference power source, with the collector of the one of the transistors connected to the FB terminal of the PWM control IC, and with the collector of the other of the transistors connected to the CS terminal controller.

With this configuration, it is possible to easily realize the comparator for comparing the signal level of the feedback signal with the current level of the current level check reference power.

Preferably, the CS terminal controller includes an NPN-type transistor having the collector thereof connected to the CS terminal of the PWM control IC, having the emitter thereof connected to the negative power supply line, and having the base thereof connected to the collector of the other of the transistors included in the signal level checker.

With this configuration, where the CS terminal controller is provided with the NPN transistor connected in the manner described above, it is possible, with a simple configuration, to enable and disable the PWM control IC.

Preferably, the start-up corrector includes: a serial circuit composed of a Zener diode and a plurality of resistors connected between the line of the subsidiary control power and the negative power supply line; and an NPN-type transistor having the base thereof connected to a node between the resistors, having the collector thereof connected through the second resistor to the FB terminal of the PWM control IC, and having the emitter thereof connected to the negative supply power line.

With this configuration, where the start-up corrector is provided with the serial circuit and the NPN-type transistor described above, it is possible, with a simple configuration, to make the switching power supply apparatus output a reliably stabilized voltage in the steady operation.

Preferably, the signal level checker includes, for generation of the reference voltage, voltage division resistors, of which a lower-potential-side resistor is divided into two resistors, with the node therebetween connected through a diode to the CS terminal of the PWM control IC.

With this configuration, by varying the resistances of the individual division resistors for generating the reference voltage, it is possible to freely and accurately set the fluctuation width and burst switching period of the output voltage in burst switching operation. In particular, by making the fluctuation width of the output voltage as wide as applications permit, it is possible to reduce unnecessary power consumption in burst switching operation.

Preferably, the switching power supply apparatus further includes: a capacitor connected between the CS terminal of the PWM control IC and the negative power supply line; and a diode connected between the capacitor and the CS terminal.

With this configuration, in burst switching operation, it is possible to quicken, by the action of the diode, the fluctuation of the voltage level at the CS terminal and thereby quicken the speed of switching between a state in which switching operation is performed and a state in which switching operation is stopped. Moreover, in burst switching operation, it is possible to reduce the fluctuation width of the output voltage and increase the accuracy of the upper and lower limits of the output voltage. Moreover, when the load current abruptly increases during burst switching operation, it is possible to shorten the time required to shift to continuous switching operation and thereby prevent a decrease in the output voltage.

Preferably, when a PWM control IC is used as the switching controller, the switching power supply apparatus further includes: a current adjuster connected between the FB terminal of the PWM control IC and the negative power supply line to adjust the current output from the FB terminal according to the signal level of the feedback signal; and a CS terminal controller that serves as the operation/nonoperation switcher by connecting and disconnecting the CS terminal of the PWM control IC to and from the negative power supply line according to an output signal of the signal level checker.

With this configuration, at the start-up of the switching power supply apparatus, the current adjuster adjusts the voltage at the FB terminal of the PWM control IC to a high value. Thus, the PWM control IC makes the main switching device perform switching operation with a great on-state duty, and thereby reduces the start-up time. Moreover, the CS terminal controller connects and disconnects the CS terminal of the PWM control IC to and from the negative power supply line according to the output signal of the signal level checker, and thereby turns on and off the PWM control IC.

Preferably, the current adjuster includes an NPN-type transistor having the collector thereof connected to the FB terminal of the PWM control IC, having the emitter thereof connected through a resistor to the negative power supply line, and having the base thereof connected to the line of the feedback signal.

With this configuration, the current adjuster has a simpler configuration than the start-up corrector, but nevertheless achieves the same effect. That is, it is possible, with a simpler configuration, to reduce the start-up time of the switching power supply apparatus.

According to another aspect of the present invention, the switching power supply apparatus has a serial circuit, including the primary coil of a transformer and a main switching device, connected between a positive and a negative power supply line connected to a direct-current power source. The switching power supply apparatus outputs a desired direct-current voltage by controlling the main switching device according to a feedback signal obtained as a result of comparison between a direct-current voltage obtained through rectification of a high-frequency voltage induced in the secondary coil of the transformer by the main switching device performing switching operation and a previously set reference voltage. Here, the signal level of the feedback signal is compared with the signal level of a previously generated oscillation signal. According to the result of the comparison, the on-state duty of the drive signal to be fed to the main switching device is determined and switching between burst switching control and continuous switching control is performed. Moreover, while the switching operation of the main switching device is being stopped in burst switching control, supply of the operating power for driving the main switching device is stopped.

In this switching power supply apparatus according to the invention, the on-state duty of the drive signal to be fed to the main switching device is determined according to the result of comparison between the signal level of the previously generated oscillation signal and the signal level of the feedback signal. This makes it possible to accurately control the switching of the main switching device. Moreover, switching between burst switching and continuous switching is also performed according to the result of the comparison. This makes it possible to accurately perform the switching. Moreover, while the switching operation of the main switching device is being stopped, the supply of the operating power for driving the main switching device is stopped. This helps reduce the power loss suffered while the switching operation is being stopped, and thus helps reduce the power consumption of the apparatus as a whole.

Preferably, burst switching control is achieved by turning on and off the supply of operating power to the switching controller that drives the main switching device. This helps reduce the power loss suffered while the switching operation is being stopped.

Preferably, when a PWM control IC is used as the switching controller, a capacitor is connected between the FB terminal of the PWM control IC and an internal power terminal connected to an internal power supply line.

With this configuration, in a case where, for phase compensation of the output voltage stabilizing control system, a serial circuit composed of a capacitor and a resistor is connected between the FB terminal of the PWM control IC and the negative power supply line, even when the load current abruptly increases during burst switching operation, it is possible to quicken the control of the burst switching operation control system as much as possible and thereby prevent a decrease in the output voltage of the switching power supply apparatus. In addition, it is possible to reduce unnecessary power consumption in the burst switching operation.

Preferably, when a PWM control IC is used as the switching controller, a serial circuit composed of a capacitor and a resistor is connected between the FB terminal of the PWM control IC and an internal power terminal connected to an internal power supply line.

With this configuration, in a case where, for phase compensation of the output voltage stabilizing control system, a serial circuit composed of a capacitor and a resistor is connected between the FB terminal of the PWM control IC and the negative power supply line, even when the load current abruptly increases during burst switching operation, it is possible to quicken the control of the burst switching operation control system as much as possible and thereby prevent a decrease in the output voltage of the switching power supply apparatus. In addition, it is possible to achieve phase compensation in the output voltage stabilizing control system with almost no effects on the burst switching operation characteristics.

Preferably, the current adjuster includes an NPN-type transistor having the collector thereof connected to the FB terminal of the PWM control IC, having the emitter thereof connected through a resistor to the negative power supply line, and having the base thereof connected to the line of the feedback signal, and in series with the resistor connected between the base of the NPN-type transistor and the negative power supply line is connected an NPN-type transistor having the collector and base thereof connected together.

With this configuration, even when characteristics change as temperature varies, the current adjuster can suppress the variation of the predetermined current value (of the load current) at which switching between burst switching operation and continuous switching operation is performed. This helps stabilize the output voltage.

Preferably, when a PWM control IC is used as the switching controller, a start-up corrector is additionally provided to correct the start-up of the PWM control IC; a start-up switcher is additionally provided to turn on and off the supply of operating power to the signal level checker; a first resistor is connected between the FB terminal of the PWM control IC and the negative power supply line; the signal level checker feeds a CS terminal controller, which serves as the operation/nonoperation switcher, and the FB terminal with the operation control signal and an inverted feedback signal, respectively, according to the result of checking of the signal level of the feedback signal; the CS terminal controller connects and disconnects the CS terminal of the PWM control IC to and from the negative power supply line according to the operation control signal; the start-up corrector detects whether or not the feedback signal is present so that, if the feedback signal is present, the start-up corrector connects, through a second resistor, the FB terminal of the PWM control IC to the negative power supply line and, if not, the start-up corrector cuts off the second resistor; and the start-up switcher detects whether or not the feedback signal is present so that, if the feedback signal is present, the start-up switcher turns on the supply of the operating power to the signal level checker and, if not, the start-up switcher turns off the supply of the operating power to the signal level checker.

With this configuration, at the start of start-up, power immediately starts to be supplied to the PWM control IC, and the switching power supply apparatus starts switching operation. This switching operation causes the output voltage of the switching power supply apparatus to increase until a feedback signal is generated, when the feedback signal is detected by the start-up corrector and the start-up switcher. As a result, the start-up corrector connects the second resistor in addition to and in parallel with the first resistor, and the start-up switcher starts to supply an operating current to the signal level checker. Supplied with the operating current, the signal level checker starts to operate, and, during the period in which the signal level of the feedback signal is lower than the voltage level of the current level check reference power, the CS terminal controller keeps the CS terminal of the PWM control IC disconnected from the negative power supply line so that operating power is kept supplied to the PWM control IC. Thus, switching operation is continued to permit the output voltage of the switching power supply apparatus to increase to a predetermined value.

Thereafter, when the load of the switching power supply apparatus is light, and the signal level of the feedback signal is found to be higher than the voltage level of the current level check reference power, the CS terminal controller connects the CS terminal of the PWM control IC to the negative power supply line to turn off the supply of operating power to the PWM control IC and thereby stop the switching operation of the switching power supply apparatus. As the output voltage decreases, the signal level of the feedback signal decreases until it becomes lower than the current level check reference, when the signal level checker turns the operation control signal low. This causes the CS terminal controller to disconnect the CS terminal of the PWM control IC from the negative power supply line so that operating power is supplied to the PWM control IC. This sequence of operations is repeated to achieve burst oscillation operation.

On the other hand, when the load of the switching power supply apparatus is heavy, and the signal level of the feedback signal does not reach the voltage level of the current level check reference power, the signal level checker turns the operation control signal low. This causes the CS terminal controller to disconnect the CS terminal of the PWM control IC from the negative power supply line so that continuous switching operation is continued.

In particular, the start-up corrector is so configured as to cut off the second resistor at start-up to increase the resistance between the FB terminal of the PWM control IC and the negative power supply line and thereby make the potential at the FB terminal higher. This ensures reliable start-up operation. On the other hand, in the steady operation, the start-up corrector connects the second resistor in parallel with the first resistor to make the potential at the FB terminal of the PWM control IC lower. This permits the PWM control IC to reliably control the switching power supply apparatus to output a stabilized voltage.

Preferably, the start-up switcher includes an NPN-type transistor having the collector thereof connected to the node between a current detection resistor connected to the line of the feed back signal and the internal reference voltage line of the signal level checker, having the base thereof connected to the phototransistor, and having the emitter thereof connected to the negative power supply line.

With this configuration, it is possible to realize the start-up switcher with a simple circuit.

Preferably, the start-up corrector includes an NPN-type transistor having the collector thereof connected through the second resistor to the FB terminal of the PWM control IC, having the base thereof connected through a resistor to the phototransistor, and having the emitter thereof connected to the negative power supply line.

With this configuration, it is possible to realize the start-up corrector with a simple circuit.

Preferably, when a PWM control IC is used as the switching controller, a start-up corrector is additionally provided to correct the start-up of the PWM control IC; a first resistor is connected between the FB terminal of the PWM control IC and the negative power supply line; the signal level checker feeds a CS terminal controller, which serves as the operation/nonoperation switcher, and the FB terminal with the operation control signal and an inverted feedback signal, respectively, according to the result of checking of the signal level of the feedback signal; the CS terminal controller connects and disconnects the CS terminal of the PWM control IC to and from the negative power supply line according to the operation control signal; and the start-up corrector detects whether or not the feedback signal is present so that, if the feedback signal is present, the start-up corrector connects, through a diode and the second resistor, the FB terminal of the PWM control IC to the negative power source line and turns on the supply of operating power to the signal level checker and, if not, the start-up corrector cuts off the diode and the second resistor and turns off the supply of the operating power to the signal level checker.

With this configuration, at the start of start-up, power immediately starts to be supplied to the PWM control IC, and the switching power supply apparatus starts switching operation. This switching operation causes the output voltage of the switching power supply apparatus to increase until a feedback signal is generated, when the feedback signal is detected by the start-up corrector. As a result, the start-up corrector connects the second resistor in addition to and in parallel with the first resistor, and starts to supply an operating current to the signal level checker. Supplied with the operating current, the signal level checker starts to operate, and, during the period in which the signal level of the feedback signal is lower than the voltage level of the current level check reference power, the CS terminal controller keeps the CS terminal of the PWM control IC disconnected from the negative power supply line so that operating power is kept supplied to the PWM control IC. Thus, switching operation is continued to permit the output voltage of the switching power supply apparatus to increase to a predetermined value.

Thereafter, when the load of the switching power supply apparatus is light, and the signal level of the feedback signal is found to be higher than the voltage level of the current level check reference power, the CS terminal controller connects the CS terminal of the PWM control IC to the negative power supply line to turn off the supply of operating power to the PWM control IC and thereby stop the switching operation of the switching power supply apparatus. As the output voltage decreases, the signal level of the feedback signal decreases until it becomes lower than the current level check reference, when the signal level checker turns the operation control signal low. This causes the CS terminal controller to disconnect the CS terminal of the PWM control IC from the negative power supply line so that operating power is supplied to the PWM control IC. This sequence of operations is repeated to achieve burst oscillation operation.

On the other hand, when the load of the switching power supply apparatus is heavy, and the signal level of the feedback signal does not reach the voltage level of the current level check reference power, the signal level checker turns the operation control signal low. This causes the CS terminal controller to disconnect the CS terminal of the PWM control IC from the negative power supply line so that continuous switching operation is continued.

In particular, the start-up corrector is so configured as to cut off the second resistor at start-up to increase the resistance between the FB terminal of the PWM control IC and the negative power supply line and thereby make the potential at the FB terminal higher. This ensures reliable start-up operation. On the other hand, in the steady operation, the start-up corrector connects the second resistor in parallel with the first resistor to make the potential at the FB terminal of the PWM control IC lower. This permits the PWM control IC to reliably control the switching power supply apparatus to output a stabilized voltage.

The diode prevents a current from flowing through the signal level checker in a predetermined timing period, and thereby prevents the signal level checker from operating unnecessarily, contributing to higher operation accuracy.

Preferably, the start-up corrector includes an NPN-type transistor having the collector thereof connected through the diode and the second resistor to the FB terminal of the PWM control IC, having the base thereof connected through a resistor to the phototransistor, and having the emitter thereof connected to the negative power supply line.

With this configuration, it is possible to realize the start-up corrector with a simple circuit.

Preferably, the signal level checker includes, for generation of the reference voltage, voltage division resistors, of which a lower-potential-side resistor is divided into two resistors, with the node therebetween connected through a diode to the CS terminal controller, and the CS terminal controller is connected through another diode to the CS terminal of the PWM control IC.

With this configuration, by varying the resistances of the individual division resistors for generating the reference voltage, it is possible to freely and accurately set the fluctuation width and burst switching period of the output voltage in burst switching operation. In particular, by making the fluctuation width of the output voltage as wide as applications permit, it is possible to reduce unnecessary power consumption in burst switching operation.

Moreover, the other diode prevents a high-level voltage from being applied to the CS terminal of the PWM control IC when the switching power supply apparatus starts to start up. This is because, when a high-level voltage is applied to the CS terminal, the output of the PWM control IC is turned off.

Preferably, when a PWM control IC is used as the switching controller, a start-up switcher is additionally provided to turn on and off the supply of operating power to the signal level checker; a current adjuster is additionally provided that is connected between the FB terminal of the PWM control IC and the negative power supply line to adjust the current output from the FB terminal according to the signal level of the feedback signal; the signal level checker feeds a CS terminal controller, which serves as the operation/nonoperation switcher, with the operation control signal according to the result of checking of the signal level of the feedback signal; the CS terminal controller connects and disconnects the CS terminal of the PWM control IC to and from the negative power supply line according to the operation control signal; and the start-up switcher detects whether or not the feedback signal is present so that, if the feedback signal is present, the start-up switcher turns on the supply of operating power to the signal level checker and, if not, the start-up switcher turns off the supply of operating power to the signal level checker.

With this configuration, at the start-up of the switching power supply apparatus, the current adjuster adjusts the current at the FB terminal of the PWM control IC. Thus, the PWM control IC makes the main switching device perform switching operation with a great on-state duty, and thereby reduces the start-up time. Moreover, on detecting the feedback signal, the start-up switcher starts to supply operating power to the signal level checker. Moreover, the CS terminal controller connects and disconnects the CS terminal of the PWM control IC to and from the negative power supply line according to the output signal of the signal level checker, and thereby turns on and off the PWM control IC. In this way, it is possible to realize burst switching operation with high power use efficiency.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, embodiments of the present invention will be described with reference to the drawings.
First Embodiment FIG. 1 is a circuit diagram of the switching power supply apparatus of a first embodiment of the invention.

Figure 1:
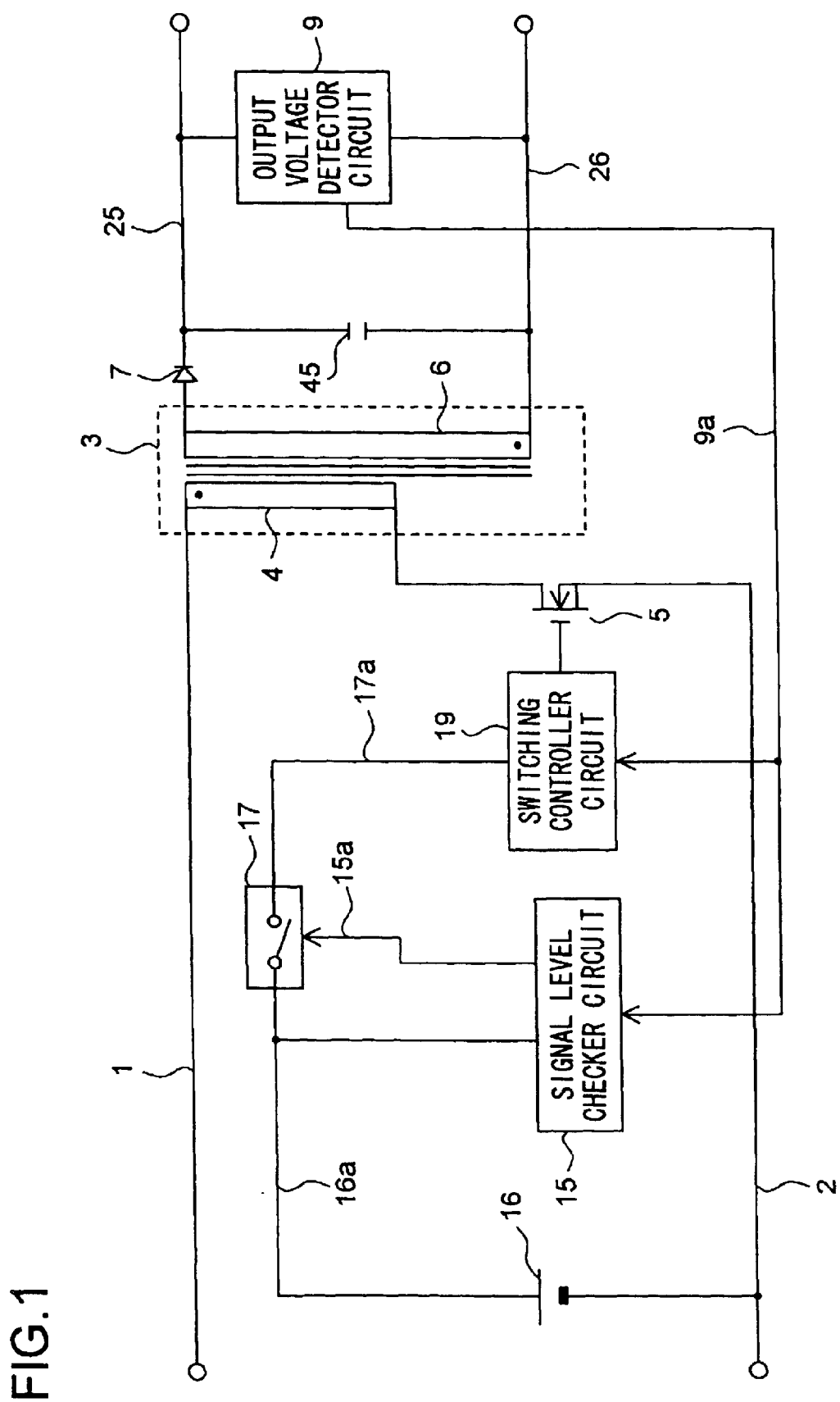
FIG. 1 is a circuit diagram of the switching power supply apparatus of a first embodiment of the invention.

In the switching power supply apparatus shown in FIG. 1, a transformer 3 has its primary coil 4 connected, at its one end, to a positive power supply line 1 and, at its other end, through a main switching device 5 to a negative power supply line 2. The main switching device 5 is realized with, for example, an FET (field-effect transistor). The transformer 3 has its secondary coil 6 connected, at its one end, through a diode 7 to an output line 25 and, at its other end, to an output line 26. Between the output lines 25 and 26, there are connected a capacitor 45 and an output voltage detector circuit 9. The output terminal of the output voltage detector circuit 9 is connected by way of a line 9a to the input terminal of a signal level checker circuit 15 and to the input terminal of a switching controller circuit 19 to feed each of them with a feedback signal.

An operating power source 16 has its negative end connected to the negative power supply line 2, and has its positive end connected by way of a line 16a to the power terminal of the signal level checker circuit 15 and to the input terminal of a switch circuit 17. The signal level checker circuit 15 feeds an operation control signal by way of a line 15a to the control terminal of the switch circuit 17. The output terminal of the switch circuit 17 is connected by way of a line 17a to the power terminal of the switching controller circuit 19. The output terminal of the switching controller circuit 19 is connected to the control terminal of the main switching device 5.

Next, the operation of the switching power supply apparatus of the first embodiment will be described. When a voltage from a nonillustrated direct-current power source is applied between the positive and negative power supply lines 1 and 2, the main switching device 5, under the control of the switching controller circuit 19, performs switching operation, and thereby causes a high-frequency current to flow through the primary coil 4 of the transformer 3. This induces a high-frequency voltage in the secondary coil 6 of the transformer 3. This high-frequency voltage is rectified by the diode 7 and then smoothed by the capacitor 45, and is thereby converted into a direct-current voltage. This direct-current voltage is applied between the output lines 25 and 26 so as to be output as the output voltage of the switching power supply apparatus.

The output voltage detector circuit 9 compares the output voltage between the output lines 25 and 26 with a predetermined reference voltage, and feeds the result of the comparison in the form of a feedback signal by way of the line 9a to the signal level checker circuit 15 and the switching controller circuit 19. The switching controller circuit 19 operates from the power supplied thereto from the operating power source 16 through the switch circuit 17, and, by controlling the timing with which the main switching device 5 is turned on and off according to the feedback signal, performs control in such a way that a desired direct-current voltage is output between the output lines 25 and 26.

When the load connected between the output lines 25 and 26 (the output terminals of the switching power supply apparatus) consumes a small amount of electric power (i.e., in light-load operation), the output voltage between the output lines 25 and 26 (the output voltage of the switching power supply apparatus) tends to be higher. To correct this, the output voltage detector circuit 9 outputs to the line 9a a feedback signal having, for example, a higher level.

On the other hand, when the load connected between the output lines 25 and 26 consumes a large amount of electric power (i.e., in heavy-load operation), the output voltage between the output lines 25 and 26 tends to be lower. To correct this, the output voltage detector circuit 9 outputs to the line 9a a feedback signal having, for example, a lower level.

When the output voltage between the output lines 25 and 26 (the output voltage of the switching power supply apparatus) is higher than the reference voltage, and the feedback signal output by way of the line 9a has a higher level, the signal level checker circuit 15 feeds an operation control signal by way of the line 15a to the switch circuit 17 so as to turn the switch circuit 17 off.

With the switch circuit 17 turned off, the switching controller circuit 19 ceases to be supplied with the voltage from the operating power source 16, and thus stops operating. As a result, the main switching device 5 stops operating, and thus permits the output voltage between the output lines 25 and 26 (the output voltage of the switching power supply apparatus) to decrease gradually.

As the output voltage decreases, the level of the feedback signal from the output voltage detector circuit 9 becomes, for example, lower. Then, the signal level checker circuit 15 feeds an operation control signal by way of the line 15a to the switch circuit 17 so as to turn the switch circuit 17 on. This causes the voltage from the operating power source 16 to be supplied to the switching controller circuit 19, and thus the switching controller circuit 19 restarts operating, and makes the main switching device 5 perform switching operation.

Consequently, the output voltage between the output lines 25 and 26 (the output voltage of the switching power supply apparatus) increases, and meanwhile the output voltage detector circuit 9 feeds a higher-level feedback signal by way of the line 9a to the signal level checker circuit 15. Then, the signal level checker circuit 15 turns the switch circuit 17 off to stop the operation of the switching controller circuit 19 and thereby stop the switching operation by the main switching device 5.

When the load connected between the output lines 25 and 26 is a heavy load that consumes a considerably large amount of electric power, the output voltage tends to be considerably low. In this case, the signal level checker circuit 15 keeps the switch circuit 17 continuously on. Thus, the switching controller circuit 19 makes the main switching device 5 perform switching operation continuously and thereby stabilizes the output voltage.

As described above, bust switching operation is achieved by repeatedly stopping switching operation when the output voltage of the switching power supply apparatus increases and restarting switching operation when the output voltage decreases. This stabilizes the output voltage.

In burst switching operation, the operating power of the signal level checker circuit 15 is supplied thereto without passing through the switch circuit 17, and therefore the signal level checker circuit 15 keeps operating even when switching operation is being stopped. However, the power consumption of the signal level checker circuit 15 is far lower than that of the switching controller circuit 19, and accordingly the switching power supply apparatus operates with less power consumption, contributing to energy saving.

Second Embodiment

Figure 2:
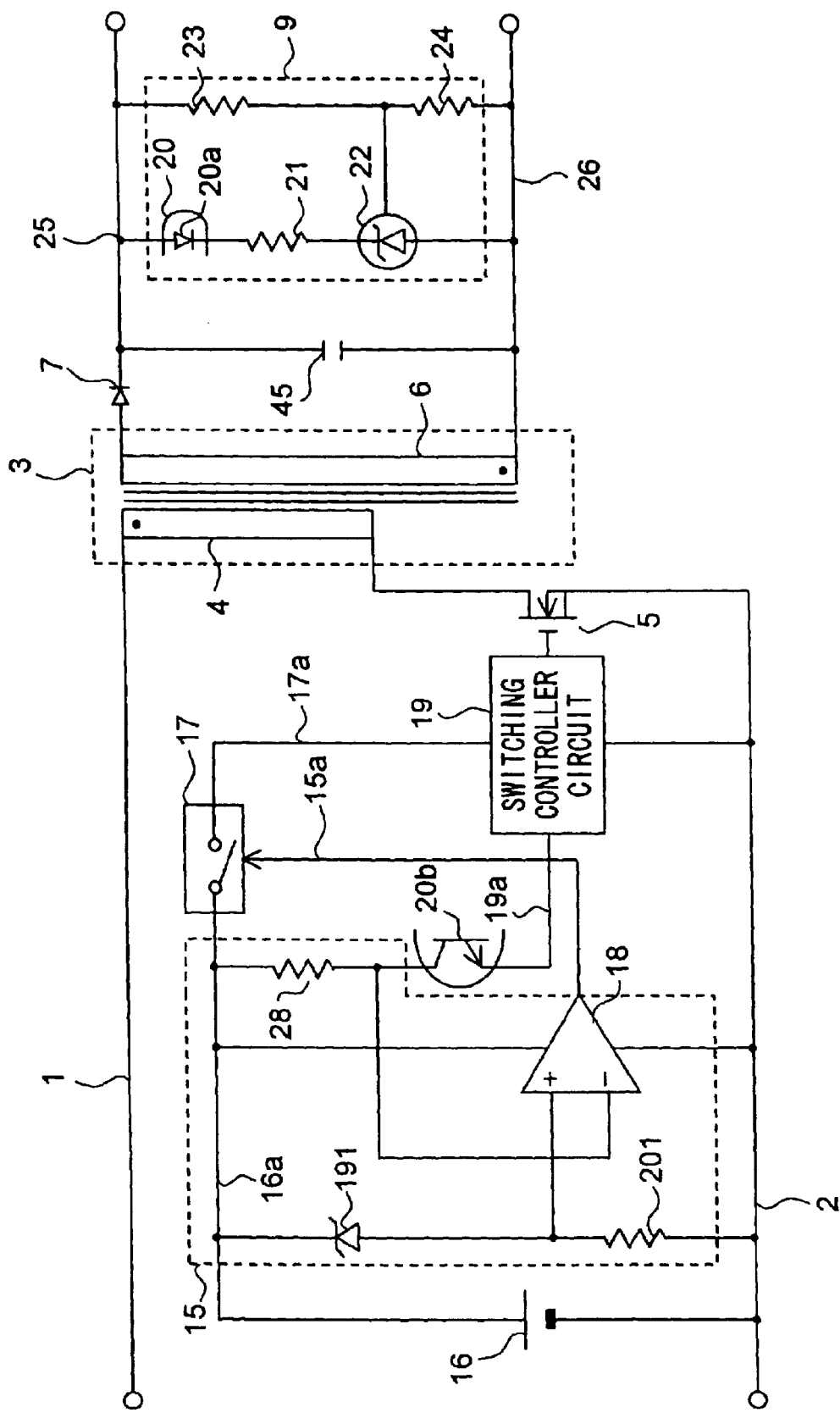
FIG. 2 is a circuit diagram of the switching power supply apparatus of a second embodiment of the invention.

FIG. 2 is a circuit diagram of the switching power supply apparatus of a second embodiment of the invention.

In the switching power supply apparatus shown in FIG. 2, a transformer 3 has its primary coil 4 connected, at its one end, to a positive power supply line 1 and, at its other end, through a main switching device 5 to a negative power supply line 2. The transformer 3 has its secondary coil 6 connected, at its one end, through a diode 7 to an output line 25 and, at its other end, to an output line 26. Between the output lines 25 and 26, there are connected a capacitor 45 and an output voltage detector circuit 9.

The output voltage detector circuit 9 is composed of two serial circuits connected between the output lines 25 and 26, more specifically one composed of a photocoupler 20, a resistor 21, and a shunt regulator 22 and another composed of output voltage division resistors 23 and 24. The photocoupler 20 is composed of a photodiode 20a and a phototransistor 20b. The control terminal of the shunt regulator 22 is connected to the node between the output voltage division resistors 23 and 24. The shunt regulator 22 compares the voltage at the node between the output voltage division resistors 23 and 24 with a reference voltage that has previously been prepared internally, and permits a current commensurate with the result of the comparison to flow through the photodiode 20a.

An operating power source 16 has its negative end connected to the negative power supply line 2, and has its positive end connected to a steady-state operating current supply line 16a. A signal level checker circuit 15 is composed of a Zener diode 191, a resistor 201, a comparator 18, and a current detection resistor 28.

The Zener diode 191 has its cathode connected to the steady-state operating current supply line 16a, and has its anode connected to one end of the resistor 201 and to the non-inverting input terminal of the comparator 18. The other end of the resistor 201 is connected to the negative power supply line 2. The current detection resistor 28 has its one end connected to the steady-state operating current supply line 16a, and has its other end connected to the inverting input terminal of the comparator 18 and to the collector of the phototransistor 20b of the photocoupler 20.

The comparator 18 has its positive power terminal connected to the steady-state operating current supply line 16a, and has its negative power terminal connected to the negative power supply line 2. The output terminal of the comparator 18 is connected by way of a line 15a to the control terminal of a switch circuit 17. The emitter of the phototransistor 20b is connected by way of a line 19a to the control terminal of the switching controller circuit 19. The output terminal of the switching controller circuit 19 is connected to the control terminal of the main switching device 5.

Next, the operation of the switching power supply apparatus of the second embodiment will be described. When a direct-current voltage from the operating power source 16 is applied between the positive and negative power supply lines 1 and 2, the main switching device 5, under the control of the switching controller circuit 19, performs switching operation, and thereby causes a high-frequency current to flow through the primary coil 4 of the transformer 3. This induces a high-frequency voltage in the secondary coil 6 of the transformer 3. This high-frequency voltage is rectified by the diode 7 and then smoothed by the capacitor 45, and is thereby converted into a direct-current voltage. This direct-current voltage is applied between the output lines 25 and 26 so as to be output as the output voltage of the switching power supply apparatus.

The output voltage detector circuit 9 compares the output voltage between the output lines 25 and 26 with a predetermined reference voltage, and feeds the result of the comparison in the form of a feedback signal, on one hand, via the node between the collector of the phototransistor 20b and the current detection resistor 28 to the signal level checker circuit 15 and, on the other hand, by way of the line 19a to the switching controller circuit 19.

More specifically, in the output voltage detector circuit 9, the shunt regulator 22 compares the voltage at the node between the output voltage division resistors 23 and 24 with a reference voltage that has previously been prepared internally, and makes a current commensurate with the result of the comparison flow through the photodiode 20a. The phototransistor 20b supplies a current commensurate with the current flowing through the photodiode 20a from the operating power source 16 through current detection resistor 28 to the switching controller circuit 19. Thus, according to the current supplied, the switching controller circuit 19 controls the switching operation of the main switching device 5, and thereby controls the output voltage of the switching power supply apparatus (the voltage between the output lines 25 and 26) so as to make it equal to a predetermined value.

In the signal level checker circuit 15, the comparator 18 compares the voltage drop across the current detection resistor 28 with the voltage of the current level check reference power generated by the Zener diode 191 and the resistor 201, and feeds a signal commensurate with the result of the comparison by way of the line 15a to the switch circuit 17. The Zener diode 191 may be replaced with a resistor.

When the load connected between the output lines 25 and 26 (the output terminals of the switching power supply apparatus) consumes a small amount of electric power (i.e., in light-load operation), the output voltage between the output lines 25 and 26 (the output voltage of the switching power supply apparatus) tends to be higher. To correct this, the output voltage detector circuit 9 increases the current flowing through the phototransistor 20b.

The comparator 18, as the result of comparing the current value through the phototransistor 20b with the reference current level set by the current level check reference power, outputs a high-level operation control signal, and feeds this high-level operation control signal by way of the line 15a to the control terminal of the switch circuit 17, which is thereby turned off. This stops the supply of the supply voltage to the switching controller circuit 19, and thus the switching controller circuit 19 stops operating. Consequently, the main switching device 5 stops operating, and thus the output voltage of the switching power supply apparatus decreases gradually.

As the output voltage decreases, the current value through the phototransistor 20b decreases. Then, the comparator 18, as the result of comparing the current value through the phototransistor 20b with the reference current level set by the current level check reference power, outputs a low-level operation control signal, and feeds this low-level operation control signal by way of the line 15a to the control terminal of the switch circuit 17, which is thereby turned on. This starts the supply of the supply voltage to the switching controller circuit 19, and thus the switching controller circuit 19 starts to operate. Consequently, the main switching device 5 starts to operate, and thus the output voltage of the switching power supply apparatus increases gradually.

As the output voltage increases, the current value through the phototransistor 20b increases. Then, the comparator 18, as the result of comparing the current value through the phototransistor 20b with the reference current level set by the current level check reference power, outputs a high-level operation control signal, and feeds this high-level operation control signal by way of the line 15a to the control terminal of the switch circuit 17, which is thereby turned off. This stops the supply of the supply voltage to the switching controller circuit 19, and thus the switching controller circuit 19 stops operating. Consequently, the main switching device 5 stops operating, and thus the output voltage of the switching power supply apparatus decreases gradually. Thereafter, this sequence of control is repeated, and burst oscillation is thereby maintained. In this way, the output voltage of the switching power supply apparatus is kept approximately constant.

Incidentally, among the operations described above, those belonging to the first part of the sequence described above, namely the turning off of the switch circuit 17, the stopping of the switching operation of the main switching device 5, the decrease in the output voltage, the decrease in the current through the phototransistor 20b, and the output of the low-level signal from the comparator 18, are not performed simultaneously, but, because of delays produced by various portions of the circuit, performing all these operations requires a certain operation time, and, during this operation time, the switching power supply apparatus stops switching operation.

Likewise, the operations belonging to the second part of the sequence described above, namely the turning on of the switch circuit 17, the starting of the switching operation of the main switching device 5, the increase in the output voltage, the increase in the current through the phototransistor 20b, and the output of the high-level signal from the comparator 18, are not performed simultaneously, but, because of delays produced by various portions of the circuit, performing all these operations requires a certain operation time, and, during this operation time, the switching power supply apparatus continues switching operation.

The theory that the operation times described above help maintain the periods during which the switching power supply apparatus keeps performing and stops performing switching operation applies not only in this embodiment but also in the first embodiment.

A small degree of hysteresis may be introduced in the control by slightly lowering the voltage level of the current level check reference power fed to the non-inverting input terminal of the comparator 18 at the same time that the switch circuit 17 is turned off and, likewise, slightly raising the voltage level of the current level check reference power fed to the non-inverting input terminal of the comparator 18 at the same time that the switch circuit 17 is turned on. This helps make longer the periods during which the switching power supply apparatus keeps performing and stops performing switching operation.

On the other hand, when the load connected between the output lines 25 and 26 consumes a large amount of electric power (i.e., in heavy-load operation), the output voltage between the output lines 25 and 26 tends to be lower. This causes the current flowing through the phototransistor 20b to decrease, and thus causes the voltage drop across the current detection resistor 28 to become lower than the voltage across the Zener diode 191. Accordingly, the comparator 18 outputs a low-level operation control signal, and thus the switch circuit 17 is kept continuously on, permitting the switching power supply apparatus to perform continuous switching operation.

Here, it should be noted that burst switching is achieved according to the result of comparison between the current value through the phototransistor 20b and the reference current value (the voltage across the Zener diode 191 as converted into a current value). The signal level of the feedback signal from the output voltage detector circuit 9 (i.e., the current value through the phototransistor 20b) represents the load current value of the switching power supply apparatus. Thus, it is possible to correctly set the load current value at which switching between continuous switching operation and burst switching operation is performed.

In burst switching operation, the output voltage fluctuates as described earlier. However, since the signal level of the feedback signal, i.e., the current value through the phototransistor 20b, also represents the output voltage value of the switching power supply apparatus as has already been described and will also be described later, it is possible to correctly set the upper and lower limits of the output voltage.

The signal level of the feedback signal may be detected on the line 19a leading to the control terminal of the switching controller circuit 19. However, as will be described later, this configuration cannot cope with a case where a current flows out of the switching controller circuit 19 via its control terminal. That is, as the supply of operating power to the switching controller circuit 19 is turned on and off, the current value flowing out of it via its control terminal varies, and thus the voltage value at the control terminal no longer correctly represents the output voltage and the load current as described earlier.

In this way, burst switching operation is achieved by repeatedly stopping switching operation when the output voltage of the switching power supply apparatus increases and restarting stitching operation when the output voltage decreases. This helps stabilize the output voltage.

In burst switching operation, the operating power of the signal level checker circuit 15 is supplied thereto without passing through the switch circuit 17, and therefore the signal level checker circuit 15 keeps operating even when switching operation is being stopped. However, the power consumption of the signal level checker circuit 15 is far lower than that of the switching controller circuit 19, and accordingly the switching power supply apparatus operates with less power consumption, contributing to energy saving.

Third Embodiment

Figure 3:
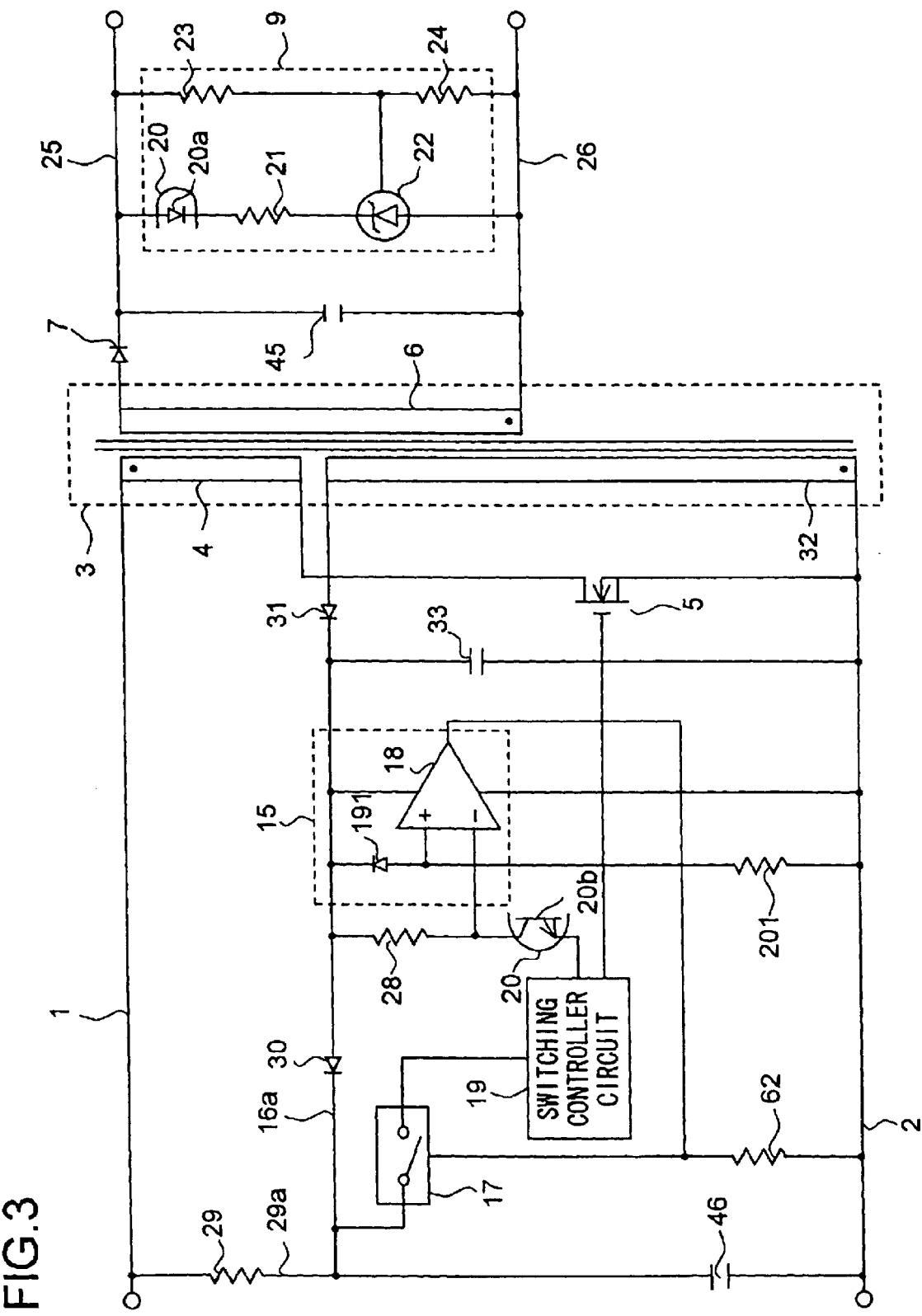
FIG. 3 is a circuit diagram of the switching power supply apparatus of a third embodiment of the invention.

FIG. 3 is a circuit diagram of the switching power supply apparatus of a third embodiment of the invention. FIG. 3 is a circuit diagram showing the detailed circuit configuration of the operating power source 16 shown in FIGS. 1 and 2. In FIG. 3, such circuit components that find their counterparts in FIGS. 1 and 2 are identified with the same reference numerals, and their explanations will not be repeated.

In FIG. 3, the operating power of the switching controller circuit 19 is supplied thereto by way of a start-up current supply line 29a by way of which a start-up current is supplied from the positive power supply line 1 through a start-up resistor 29, or by way of a steady-state operating currant supply line 16a by way of which a voltage induced in a subsidiary coil 32 of the transformer 3 is supplied through a serial circuit composed of a plurality of diodes 30 and 31. The operating power of the signal level checker circuit 15 and the phototransistor 20b of the photocoupler 20 is supplied thereto from subsidiary control power extracted from the node between the diodes 30 and 31.

The circuit corresponding to the operating power source 16 described earlier is composed of the subsidiary coil 32 of the transformer 3, the diode 31, a capacitor 33, the diode 30, the start-up resistor 29, and a capacitor 46. In this switching power supply apparatus, at the start of start-up, when a direct-current voltage from a nonillustrated direct-current power source is applied between the positive and negative power supply lines 1 and 2, a charge current flows through the capacitor 46 by way of the start-up resistor 29, and, as will be described later, since the switch circuit 17 is on, when the charge voltage of the capacitor 46 reaches a predetermined voltage level, the switching controller circuit 19 starts to operate and starts to supply the main switching device 5 with a drive signal.

Thus, the switching power supply apparatus starts switching operation, and a high-frequency voltage is induced in the subsidiary coil 32 of the transformer 3. This high-frequency voltage is rectified and smoothed by the diode 31 and the capacitor 33, and is thereby converted into a direct-current voltage. The phototransistor 20b and the comparator 18 operate from the operating power supplied thereto from the capacitor 33, and operate in such a way as to keep the output voltage of the switching power supply apparatus at a predetermined value and achieve burst switching control when the load is light as described earlier.

During the start-up operation of the switching power supply apparatus, the diode 30 prevents a current from flowing from the positive power supply line 1 through the start-up resistor 29 to the capacitor 33, and thus helps shorten the time required for the charge voltage of the capacitor 46 to reach the predetermined voltage level. On completion of the start-up of the switching power supply apparatus, the capacitor 46 is charged mainly by the current fed thereto from the capacitor 33 through the diode 30, and supplies operating power to the switching controller circuit 19 through the switch circuit 17.

When the switching power supply apparatus starts to start up, the charge voltage of the capacitor 33 is zero, and therefore the comparator 18 is not operating. However, since the output terminal of this comparator 18 is pulled down by a resistor 62, the switch circuit 17 is in an on state.

Likewise, when the switching power supply apparatus starts to start up, the charge voltage of the capacitor 33 is zero, and therefore no current flows through the phototransistor 20b. Thus, the switching controller circuit 19 controls the main switching device 5 on the assumption that the output voltage of the switching power supply apparatus is lower than the predetermined value. Thereafter, as the output voltage of the switching power supply apparatus increases, the charge voltage of the capacitor 33 increases until a current flows through the phototransistor 20b, when the switching power supply apparatus starts to operate in a predetermined steady state.

As described above, during the period after the switching power supply apparatus starts to start up until it starts to operate in the steady state, the switching controller circuit 19 and the switch circuit 17 operates by using as operating power the charge voltage of the capacitor 46. Accordingly, to prevent the charge voltage of the capacitor 46 from becoming lower than the permitted minimum operating voltage during that period, the capacitor 46 needs to be given a sufficiently high capacitance.

By increasing the resistance of the start-up resistor 29, it is possible to reduce the power loss through the start-up resistor 29. However, making the resistance too high results in lengthening the time required to charge the capacitor 46 when the switching power supply apparatus starts up, slowing down its start-up.

In this embodiment, when the switching power supply apparatus starts up, the diode 30 prevents the charge accumulated in the capacitor 46 from flowing out of it to the phototransistor 20b and the comparator 18. This helps reduce the time required for start-up. Moreover, by increasing the resistance of the start-up resistor 29, it is possible to reduce power consumption.

In the switching power supply apparatus of this embodiment, the signal level checker circuit 15 achieves burst switching control by repeatedly turning on and off the switch circuit 17 provided in the line by way of which the switching controller circuit 19 is supplied with operating power. Moreover, in burst switching control, while the switching operation of the main switching device 5 is being stopped, the supply of operating power to the switching controller circuit 19 is also stopped. This helps reduce the power loss suffered while the switching operation is being stopped, and thus helps reduce the power consumption of the apparatus as a whole.

Fourth Embodiment

Figure 4:
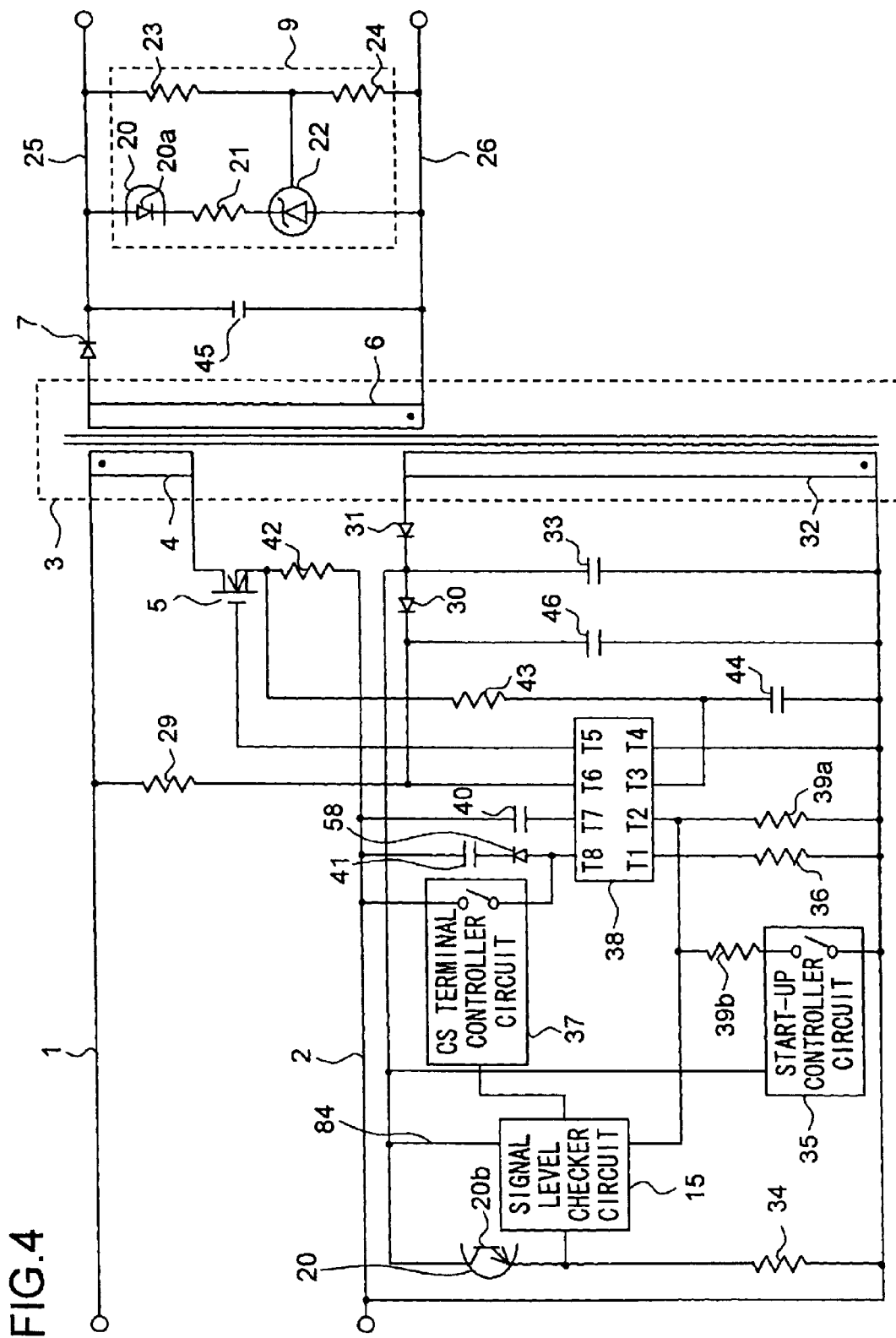
FIG. 4 is a circuit diagram of the switching power supply apparatus of a fourth embodiment of the invention.

FIG. 4 is a circuit diagram of the switching power supply apparatus of a fourth embodiment of the invention. In FIG. 4, such circuit components that find their counterparts in FIGS. 1 to 3 are identified with the same reference numerals, and their explanations will not be repeated. The switching power supply apparatus of this embodiment incorporates a PWM (pulse-width modulation) control IC, for example one with the product number FA5511 manufactured by Fuji Electric Co., Ltd. In FIG. 4, FA5511 is shown as an IC 38.

Figure 6:
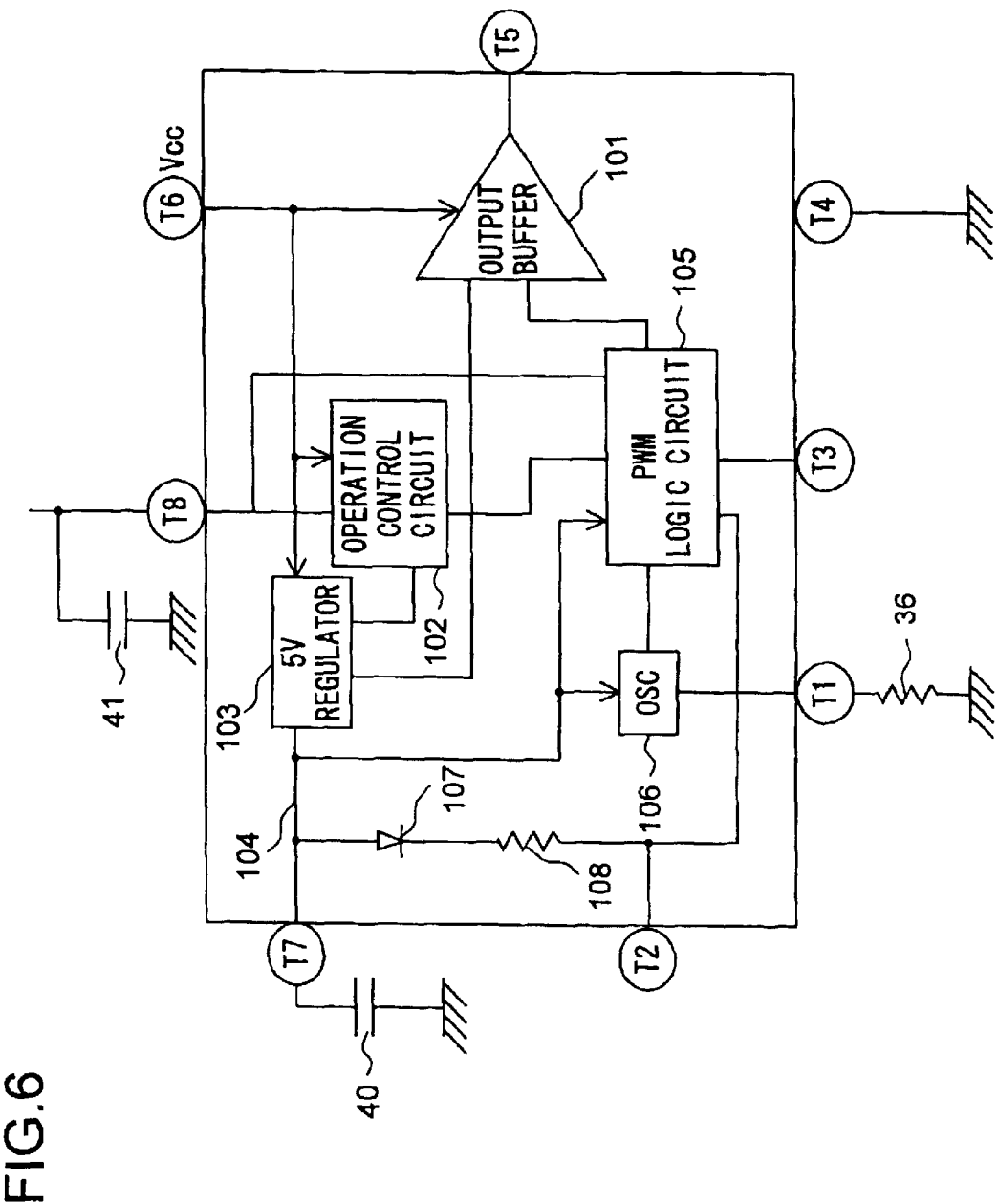
FIG. 6 is a circuit diagram showing an outline of the circuit configuration of FA5511.

FIG. 6 shows an outline of the configuration of FA5511. In FIG. 6, when operating power is supplied to a Vcc terminal T6, this operating power is supplied to an output buffer 101, an operation control circuit 102, and a 5 V voltage regulator 103. When the voltage supplied via the Vcc terminal T6 becomes higher than a predetermined operation starting voltage, the 5 V voltage regulator 103 is brought into an output-enabled state, and thus supplies stabilized 5 V power, on one hand, by way of an internal supply line 104 to a PWM logic circuit 105 and an OSC (oscillation circuit) 106 and, on the other hand, by way of the internal supply line 104 and then through a diode 107 and a resistor 108 to an FB terminal T2.

An internal power terminal T7 is connected to the internal supply line 104, and to this internal power terminal T7 is externally connected a capacitor 40 for eliminating noise from the internal supply line 104. This capacitor 40 prevents noise from being superimposed on the power supplied by way of the internal supply line 104, and thereby prevents erroneous control.

The oscillation frequency of the OSC 106 is set by the resistance of a resistor 36 that is externally connected via a terminal T1. The oscillation signal generated by the OSC 106 is fed to the PWM logic circuit 105. The FB terminal T2 is pulled up to the internal supply line 104 through a serial circuit composed of a diode 107 and a resistor 108, and thus a voltage divided by the serial circuit and a circuit element externally connected to the FB terminal T2 is supplied to the PWM logic circuit 105.

The PWM logic circuit 105 performs, in the manner that will be described later, logic calculation on the voltage level at the FB terminal T2, the voltage level at a CS terminal T8, which will be described later, and the oscillation signal fed from the OSC 106, and feeds the output buffer 101 with a drive signal for driving the main switching device 5 (see FIG. 4). The output buffer 101 current-amplifies the drive signal, and then feeds it as the drive signal to the main switching device 5, which is externally connected via an output terminal T5.

Via a terminal T3, a current detection signal from the main switching device 5 is fed in. When the current flowing through the main switching device 5 exceeds a predetermined level, the PWM logic circuit 105 shuts off the drive signal for the main switching device 5 (reduces it to a low level) to protect the main switching device 5. A terminal T4 serves as a common ground terminal of the internal circuit of FA5511, and is connected to the negative power supply line 2 (see FIG. 4) of the switching power supply apparatus.

To a CS terminal T8 is externally connected a capacitor 41. At the same time that the operation control circuit 102 outputs an output enable signal to the 5 V voltage regulator 103 as described earlier, the operation control circuit 102 feeds the capacitor 41 with a weak current, with which the capacitor 41 is charged gradually. When the switching power supply apparatus is operating in the steady state, the operation control circuit 102 controls the charge voltage of the capacitor 41 in such a way that it does not exceed a predetermined voltage level.

When the potential at the CS terminal T8 is forcibly turned low with an external circuit, the operation control circuit 102 disables the 5 V voltage regulator 103 and thereby stops the supply of power to the internal supply line 104, and simultaneously the 5 V voltage regulator 103 outputs a disable signal to the output buffer 101. Thus, when the potential at the CS terminal T8 is forcibly turned low with an external circuit, the power consumption by FA5511 is greatly reduced.

The switching power supply apparatus of this embodiment exploits the above-described function of FA5311. Specifically, when the output voltage of the switching power supply apparatus is high, and thus the signal level of the feedback signal is high, the signal level checker circuit 15 (see FIG. 4) forcibly turns the potential at the CS terminal T8 low with an external circuit, and thereby stops the operation of the output buffer 101, PWM logic circuit 105, and OSC 106. This causes the switching power supply apparatus to stop operating, and as a result the signal level of the feedback signal decreases. Then, the signal level checker circuit 15 ceases to forcibly turn the potential at the CS terminal T8 low, and thereby restarts the switching power supply apparatus. In this way, in light-load operation of the switching power supply apparatus, burst switching operation is achieved.

Figure 5:
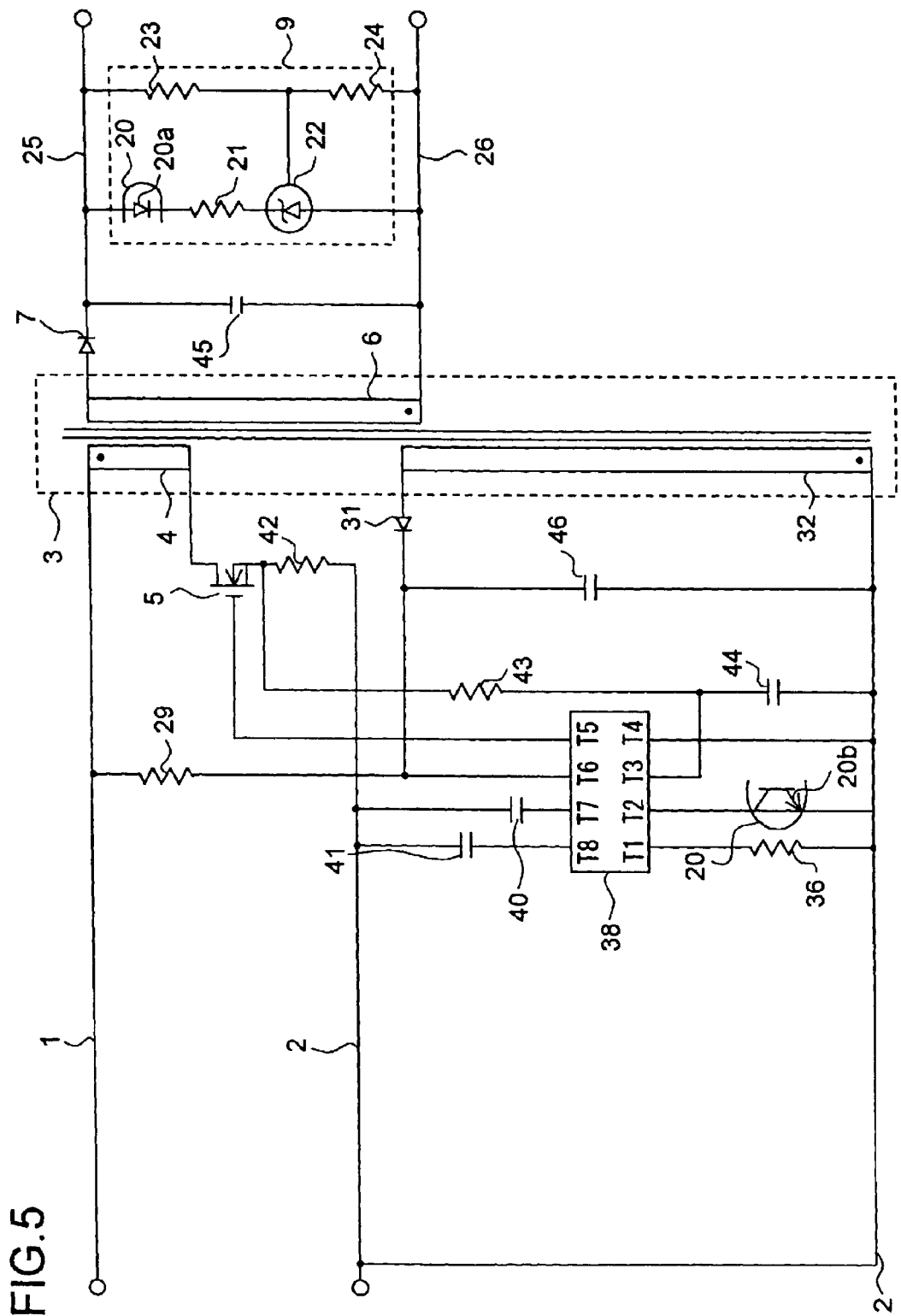
FIG. 5 is a circuit diagram of a typical circuit configuration of a switching power supply apparatus employing FA5511, for reference purposes.
Figure 7:
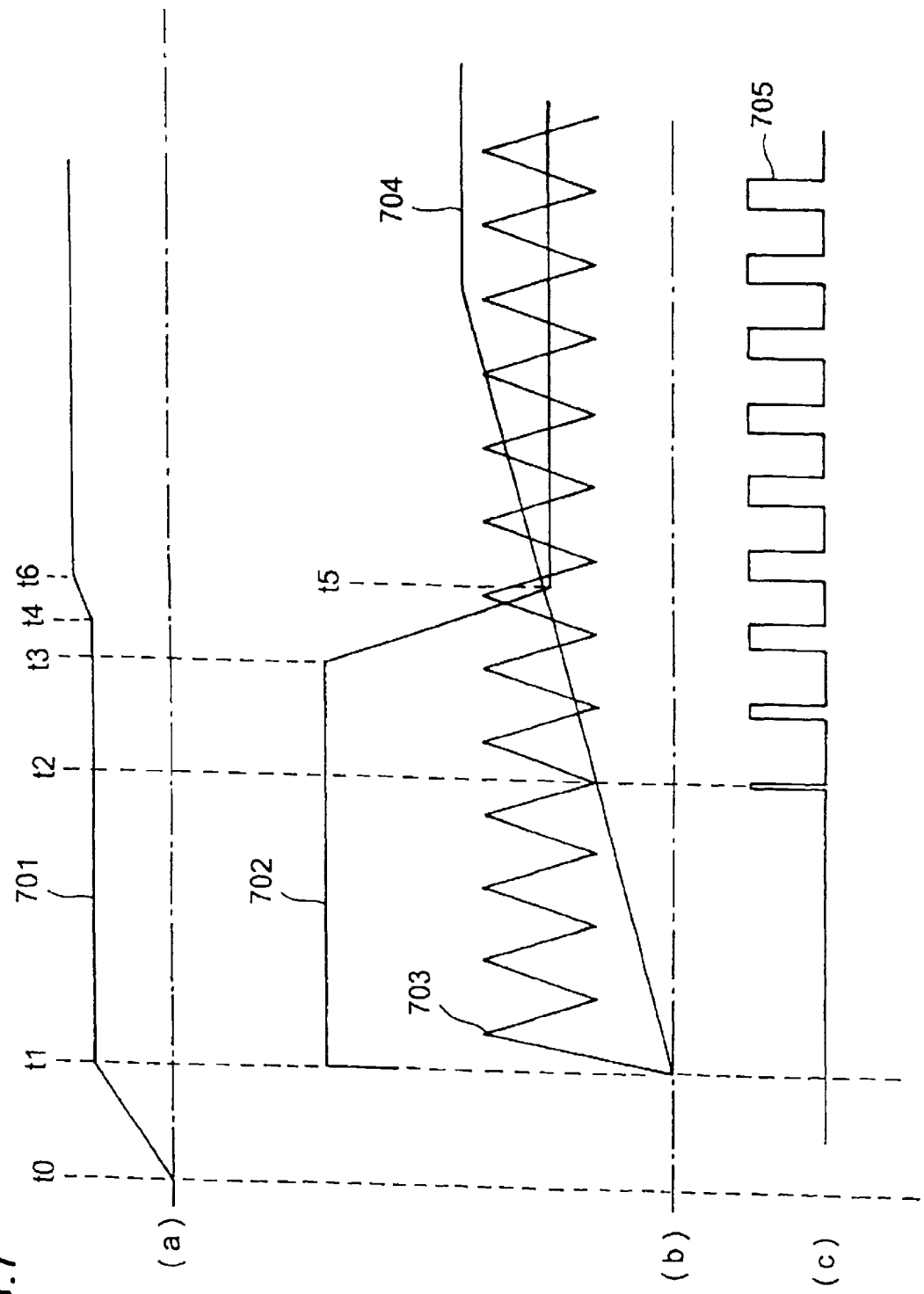
FIG. 7 is a signal waveform diagram illustrating the start-up operation of the switching power supply apparatus shown in FIG. 5.

FIG. 5 shows, for reference proposes, the circuit configuration of a switching power supply apparatus having a typical circuit configuration in a case where it adopts FA5511. In FIG. 5, such circuit components that find their counterparts in FIG. 4 are identified with the same reference numerals, and their explanations will not be repeated. FIG. 7 shows the waveforms of the signals observed at relevant points in the switching power supply apparatus during the period after it starts to start up until it starts to operate in the steady state. In FIG. 7, at (a) is shown the voltage 701 across the capacitor 46 shown in FIG. 5; at (b) are shown the voltage 702 at the FB terminal T2 of the IC 38, i.e., FA5511, shown in FIG. 5, the oscillation signal 703 that the OSC 106 (see FIG. 6) feeds to the PWM logic circuit 105 (see FIG. 6), and the voltage 704 at the CS terminal T8; at (c) is shown the output signal 705 output via the output terminal T5.

Now, with reference to FIGS. 5 and 7, the operation of this switching power supply apparatus will be described. First, when, at a time point t0, a direct-current voltage is applied between the positive and negative power supply lines 1 and 2, the voltage 701 across the capacitor 46 increases gradually owing to a charge current supplied thereto through the start-up resistor 29. When, at a time point t1, the voltage reaches the predetermined operation starting voltage of FA5511, the voltage on the internal supply line 104 inside the IC 38 rises as described earlier, and thus the OSC 106, PWM logic circuit 105, and output buffer 101 start to operate.

Thus, the OSC 106 feeds the PWM logic circuit 105 with an oscillation signal 703 having constant upper and lower limits and a constant period, and, as a result of the capacitor 41 being charged with the weak current fed thereto from the operation control circuit 102, the voltage 704 at the CS terminal T8 increases gradually. At the time point t1, the voltage between the output lines 25 and 26 is still zero, and therefore no current flows through the shunt regulator 22 and the phototransistor 20b. Thus, the voltage 702 at the FB terminal T2 of the IC 38 is high.

When whichever of the voltage 704 at the CS terminal T8 and the voltage 702 at the FB terminal T2 is lower is higher than the voltage of the oscillation signal 703 output from the OSC 106, the PWM logic circuit 105 outputs an output signal (a pulse signal) 705 of which the level is higher than the voltage at the output terminal T5 of the output buffer 101. Thus, during the period from the time point t1 to a time point t2, during which the level of the voltage 704 at the CS terminal T8 is lower than the level of the oscillation signal 703 output from the OSC 106, the output signal 705 remains low. At the time point t2, when the level of the voltage 704 at the CS terminal T8 momentarily exceeds the level of the oscillation signal 703 of the OSC 106, the output signal 705 becomes high and then remains high for the corresponding period, turning the main switching device 5 on.

Thereafter, as the voltage 704 increases, the period during which the output signal 705 remains high becomes increasingly long, and correspondingly the power supplied from the secondary coil 6 of the transformer 3 through the diode 7 to between the output lines 25 and 26 increases. Thus, the voltage between the output lines 25 and 26 increases until, at a time point t3, a current starts to flow through the shunt regulator 22 and the phototransistor 20b, when the voltage 702 at the FB terminal T2 starts to decrease.

Next, when, at a time point t5, the voltage 702 at the FB terminal T2 becomes lower than the voltage 704 at the CS terminal T8, the period during which the output signal 705 at the output terminal T5 is high is determined by the result of comparison between the level of the oscillation signal 703 of the OSC 106 and the voltage 702 at the FB terminal T2. Since the level of the voltage 702 represents the feedback signal output from the output voltage detector circuit 9, the switching power supply apparatus now starts to operate in the steady state in which it outputs a predetermined voltage.

On the other hand, the charge voltage 701 of the capacitor 46 tends to slightly decrease during the period from the time point t1 to the time point t3, because during that period more current flows to the Vcc terminal T6 than is supplied from the start-up resistor 29. However, this decrease is so controlled as not to go below the minimum operating Vcc voltage of the IC 38, i.e., FA5511, by giving the capacitor 46 a sufficiently high capacitance.

As described earlier, the output voltage of the switching power supply apparatus increases, and correspondingly the charge voltage 701 of the capacitor 46 starts to increase at a time point t4 and reaches the steady-state stable voltage at a time point t6.

It is to be understood that the circuit configuration of the switching power supply apparatus explained with reference to FIG. 5 is a mere example of a typical circuit configuration in a case where FA5511 is adopted, and thus does not incorporate the function of achieving burst switching in light-load operation which will be described later in connection with this particular embodiment.

Figure 8:
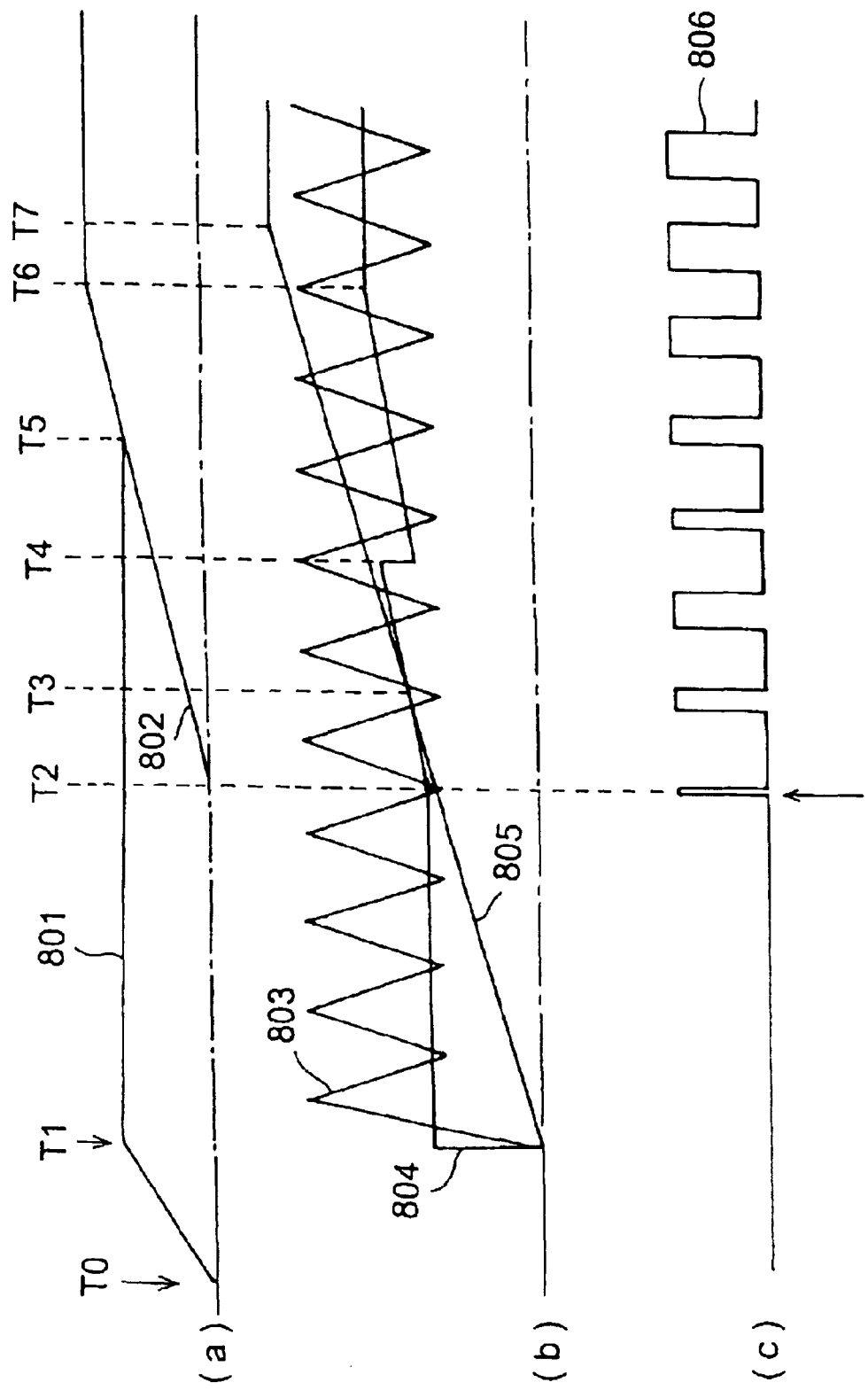
FIG. 8 is a signal waveform diagram illustrating the start-up operation of the switching power supply apparatus shown in FIG. 4.

Next, the operation of the switching power supply apparatus of this embodiment shown in FIG. 4 will be described with reference to a signal waveform diagram shown in FIG. 8. In FIG. 8, at (a) is shown the voltage 801 across the capacitor 46 shown in FIG. 4; at (b) are shown the voltage 804 at the FB terminal T2 of the IC 38, i.e., FA5511, shown in FIG. 4, the oscillation signal 803 that the OSC 106 (see FIG. 6) feeds to the PWM logic circuit 105 (see FIG. 6), and the voltage 805 at the CS terminal T8 of the IC 38; at (c) is shown the output signal 806 output via the output terminal T5 of the IC 38.

First, when, at a time point T0, a direct-current voltage is applied between the positive and negative power supply lines 1 and 2, the voltage 801 across the capacitor 46 increases gradually owing to a charge current supplied thereto through the start-up resistor 29. When, at a time point T1, the voltage reaches the predetermined operation starting voltage of FA5511, the voltage on the internal supply line 104 inside the IC 38 rises as described earlier, and thus the OSC 106, PWM logic circuit 105, and the output buffer 101 start to operate.

Thus, the OSC 106 feeds the PWM logic circuit 105 with an oscillation signal 803 having constant upper and lower limits and a constant period, and, as a result of the capacitor 41 being charged with the weak current fed thereto from the operation control circuit 102, the voltage 805 at the CS terminal T8 increases gradually. At the time point T1, the charge voltage of the capacitor 33 is zero, the output current of the signal level checker circuit 15 is zero, and the switch of a start-up corrector circuit 35 is, as will be described later, off. Accordingly, the voltage 804 at the FB terminal T2 of the IC 38 is a division voltage that results from voltage division by the diode 107 provided inside the IC 38, the resistor 108, and a resistor 39a (see FIG. 4).

This division voltage has its value set to be slightly higher than the lower-limit voltage level of the oscillation signal 803.

When whichever of the voltage 805 at the CS terminal T8 and the voltage 804 at the FB terminal T2 is lower is higher than the voltage level of the oscillation signal 803 output from the OSC 106, the PWM logic circuit 105 outputs an output signal 806 via the output terminal T5 of the output buffer 101.

Thus, during the period from the time point T1 to a time point T2, during which the level of the voltage 805 at the CS terminal T8 is lower than the level of the oscillation signal 703 output from the OSC 106, the output signal 806 remains low. At the time point T2, when the level of the voltage 805 at the CS terminal T8 momentarily exceeds the level of the oscillation signal 803 of the OSC 106, the output signal 705 becomes high and then remains high for the corresponding period, turning the main switching device 5 on.

This causes the voltage between the output lines 25 and 26 to slightly increase, and thus causes the charge voltage of the capacitor 33 to increase in such a way as to correspond to the increase in the voltage between the output lines 25 and 26. Consequently, a current starts to be supplied from the capacitor 33 through the signal level checker circuit 15 to the FB terminal T2 of the IC 38, and thus the voltage 804 at the FB terminal T2 starts to increase.

When the current value through the phototransistor 20b is lower than a predetermined value set within the signal level checker circuit 15, the signal level checker circuit 15 supplies a current to the FB terminal T2 of the IC 38; by contrast, when the current value through the phototransistor 20b is higher than the predetermined value set within the signal level checker circuit 15, the signal level checker circuit 15 feeds a current to a CS terminal controller circuit 37, but supplies no current to either of the FB terminal T2 and the CS terminal T8.

While the signal level checker circuit 15 is supplying a current to the FB terminal T2 of the IC 38, when the current value through the phototransistor 20b increases, the signal level checker circuit 15 decreases the supply current (inverted feedback signal); by contrast, when the current value through the phototransistor 20b decreases, the signal level checker circuit 15 increases the supply current (inverted feedback signal).

The supply current also depends on the operating power of the signal level checker circuit 15; that is, it also depends on the charge voltage of the capacitor 33. Thus, as described earlier, after the switching power supply apparatus starts to start up, as the voltage between the output lines 25 and 26 increases, and thus as the charge voltage of the capacitor 33 increases, the supply current increases.

Thereafter, when the supply current increases until the steady-operation state is reached in which the voltage between the output lines 25 and 26 are stabilized, the voltage between the output lines 25 and 26 and the charge voltage of the capacitor 33 are stabilized at constant values determined by the predetermined output voltage of the switching power supply apparatus and the winding ratio between the secondary coil 6 and the subsidiary coil 32 of the transformer 3. Thus, now, the supply current depends solely on the current value through the phototransistor 20b as described above.

Next, after the time point T2, as the voltage 805 at the CS terminal T8 increases, the period during which the output signal 806 output via the output terminal T5 remains high becomes increasingly long, thus the voltage between the output lines 25 and 26 increases, thus the charge voltage of the capacitor 33 increases, and thus the current supplied from the signal level checker circuit 15 increases. As a result of this course of events, the voltage 804 at the FB terminal T2 increases gradually.

After a time point T3, when the voltage 805 at the CS terminal T8 becomes higher than the voltage 804 at the FB terminal T2, as described earlier, the PWM logic circuit 105 compares the voltage 804 at the FB terminal T2 with the oscillation signal 803 of the OSC 106, and, according to the result of the comparison, outputs the output signal 806 through the output buffer 101 via the output terminal T5 so as to feed the output signal 806 as the drive signal to the main switching device 5.

As described above, the charge voltage of the capacitor 33 depends on the voltage between the output lines 25 and 26 and the winding ratio between the secondary coil 6 and subsidiary coil 32 of the transformer 3. Thus, after the time point T2, as the voltage between the output lines 25 and 26 increases, the charge voltage of the capacitor 33 increases describing a curve 802 shown at (a) in FIG. 8. When, at a time point T4, the voltage of the capacitor 33 becomes higher than a predetermined value set within the start-up corrector circuit 35, the start-up corrector circuit 35 turns on a switch provided therein so as to connect a resistor 39b in parallel with the resistor 39a.

Consequently, the voltage 804 at the FB terminal T2 momentarily decreases, but, since the voltage level after this decrease is higher than the lower limit of the oscillation signal 803, although the high-level period of the output signal 806 at the output terminal T5 is momentarily shortened, the main switching device 5 continues switching operation. Thus, the voltage between the output lines 25 and 26 and the charge voltage of the capacitor 33 still continues to increase, and the voltage 804 at the FB terminal T2 starts to increase again.

Immediately before a time point T6, when the voltage resulting from voltage division by the resistors 23 and 24 reaches the comparison reference value provided within the shunt regulator 22, a current starts to flow through the shunt regulator 22, photodiode 20a, and phototransistor 20b. Thus, the supply current from the signal level checker circuit 15 stops increasing, the voltage 804 at the FB terminal T2 stops increasing, and the switching power supply apparatus starts to operate in the steady state.

In this steady-state operation, for example, when the voltage between the output lines 25 and 26 increases, the voltage resulting from voltage division by the resistors 23 and 24 increases, thus the current through the shunt regulator 22, photodiode 20a, and phototransistor 20b increases, thus the supply current from the signal level checker circuit 15 decreases, thus the voltage 804 at the FB terminal T2 decreases, then the PWM logic circuit 105 compares the oscillation signal 803 of the OSC 106 with the voltage 804 at the FB terminal T2 and as a result outputs via the output terminal T5 of the IC 38 an output signal (drive signal) 806 of which the high-level period is short, thus the on-state duty of the main switching device 5 becomes shorter, and thus the current supplied through the diode 7 to the output line 25 decreases. As a result of this course of events, the voltage between the output lines 25 and 26 is decreased.

By contrast, when the voltage between the output lines 25 and 26 decreases, the voltage resulting from voltage division by the resistors 23 and 24 decreases, thus the current through the shunt regulator 22, photodiode 20a, and phototransistor 20b decreases, thus the supply current from the signal level checker circuit 15 increases, thus the voltage 804 at the FB terminal T2 increases, then the PWM logic circuit 105 compares the oscillation signal 803 of the OSC 106 with the voltage 804 at the FB terminal T2 and as a result outputs via the output terminal T5 of the IC 38 an output signal (drive signal) 806 of which the high-level period is long, thus the on-state duty of the main switching device 5 becomes longer, and thus the current supplied through the diode 7 to the output line 25 increases. As a result of this course of events, the voltage between the output lines 25 and 26 is increased.

Through this sequence of operations, the voltage between the output lines 25 and 26 is stabilized at a predetermined value. Consequently, the charge voltage of the capacitor 33 is also stabilized, and thus the amount of current supplied from the signal level checker circuit 15 depends solely on the current through the phototransistor 20b.

The start-up corrector circuit 35 switches the resistance between the FB terminal T2 of the IC 38 and the negative power supply line 2 between when the switching power supply apparatus is starting up and when it is operating in the steady state. This ensures that the switching power supply apparatus reliably performs switching operation.

Specifically, when the switching power supply apparatus starts to start up, the charge voltage of the capacitor 33 is zero, and the current supplied from the signal level checker circuit 15 is zero. Thus, the resistor 39a is given a high resistance so that, as described earlier, the voltage resulting from voltage division by the diode 107 provided within the IC 38, the resistor 108, and the resistor 39a (see FIG. 4) is higher than the lower limit of the oscillation signal of the OSC 106.

If this is not the case, even after the voltage level at the CS terminal T8 of the IC 38 increases, the voltage level at the FB terminal T2 remains lower than the lower limit of the oscillation signal of the OSC 106, and thus the PWM logic circuit 105 does not output a high-level signal via the output terminal T5. This makes it impossible for the output voltage of the switching power supply apparatus to rise.

On the other hand, in steady-state operation, if the resistance between the FB terminal T2 of the IC 38 and the negative power supply line 2 is kept high, for example, when the output voltage of the switching power supply apparatus increases as a result of the switching power supply apparatus operating in a no-load state, as the output voltage is stabilized, even when the signal level checker circuit 15 stops the supply current, the voltage resulting from voltage division by the diode 107 within the IC 38, the resistor 108, and the resistor 39a (see FIG. 4) does not fall below the lower limit of the oscillation signal of the OSC 106, and thus, quite inconveniently, the voltage at the FB terminal T2 cannot be so controlled as to decrease the output voltage.

To overcome this inconvenience, when the switching power supply apparatus is starting up, as the charge voltage of the capacitor 33 increases, immediately before a current starts to flow through the phototransistor 20b, the signal level checker circuit 15 additionally connects the resistor 39b so as to reduce the resistance between the FB terminal T2 of the IC 38 and the negative power supply line 2.

As described above, the switching power supply apparatus performs burst switching operation in light-load operation. This helps reduce power loss in light-load operation.

As described earlier, in the switching power supply apparatus, the output voltage tends to increase in light-load operation. To correct this, the current value through the phototransistor 20b is increased. This current through the phototransistor 20b is made to flow through the current-detection resistor 34, and the voltage across this current-detection resistor 34 is compared with the reference voltage provided within the signal level checker circuit 15 so that, when the voltage across the current-detection resistor 34 is higher than the reference voltage, the signal level checker circuit 15 feeds the supply current to the CS terminal controller circuit 37 and stops the supply of current to the FB terminal T2 of the IC 38.

On detecting the supply current, the CS terminal controller circuit 37 turns on the switch provided therein to turn the voltage at the CS terminal T8 of the IC 38 low. When the voltage at the CS terminal T8 is turned low, the operation control circuit 102 turns off the output of the 5 V voltage regulator 103, and stops the supply of pull-up current to the FB terminal T2 and the supply of operating power to the OSC 106 and the PWM logic circuit 105.

Moreover, the operation control circuit 102 feeds a disable signal to the output buffer 101 to stop the operation of the output buffer 101. This stops the feeding of the drive signal from the output terminal T5 of the IC 38 to the main switching device 5, and thus the switching power supply apparatus stops switching operation.

Consequently, as the voltage between the output lines 25 and 26 decreases, the voltage resulting from voltage division by the resistors 23 and 24 decreases, thus the current flowing through the shunt regulator 22, photodiode 20a, and phototransistor 20b decreases, thus the voltage across the current-detection resistor 34 decreases, and then the signal level checker circuit 15 compares the voltage across the current-detection resistor 34 with the reference voltage provided therein and judges the voltage across the current-detection resistor 34 to be lower. Thus, the signal level checker circuit 15 feeds the supply current to the FB terminal T2 of the IC 38 and stops the supply of current to the CS terminal controller circuit 37.

Consequently, the CS terminal controller circuit 37 turns off the switch provided therein to turn the voltage at the CS terminal T8 of the IC 38 high. Thus, the operation control circuit 102 turns the 5 V voltage regulator 103 on, and restarts the supply of pull-up current to the FB terminal T2 and the supply of operating power to the OSC 106 and the PWM logic circuit 105. Moreover, the operation control circuit 102 feeds an enable signal to the output buffer 101 to restart the operation of the output buffer 101.

This restarts the supply of the drive signal from the output terminal T5 of the IC 38 to the main switching device 5, and thus the switching power supply apparatus restarts switching operation.

Thereafter, when the voltage between the output lines 25 and 26 increases again, switching operation is stopped as described above. When, consequently, the voltage between the output lines 25 and 26 increases decreases, and the voltage across the current-detection resistor 34 decreases, switching operation is restarted as described above. Through repetition of these operations, burst switching operation is achieved.

In this burst switching state, as the output current of the switching power supply apparatus is increased, the time comes when, during the period of switching operation, the voltage level across the current-detection resistor 34 no longer reaches the level of the reference voltage provided within the signal level checker circuit 15. This is the start of a continuous switching mode.

Adopting the technique of the fourth embodiment described above makes it possible to carry out the present invention on a practical basis simply by adding an additional circuit to a commercially available PWM control IC, for example one with the product number FA5511 manufactured by Fuji Electric Co., Ltd. or an equivalent.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the principal circuit portions of the IC 38 is also stopped. This helps reduce the power loss suffered while the switching operation is being stopped, and thus helps reduce the power consumption of the apparatus as a whole.

Here, the principal circuit portions of the IC 38 are the OSC 106, PWM logic circuit 105, FB terminal T2, and output buffer 101.

Moreover, the start-up corrector circuit 35 so operates that, when the switching power supply apparatus shifts from start-up operation to steady-state operation, the resistor 39b is connected in parallel with the resistor 39a to reduce the resistance between the FB terminal T2 of the IC 38 and the negative power supply line 2. This lowers the potential at the FB terminal T2, and thereby ensures that the switching power supply apparatus performs reliable output voltage stabilizing control when operating in the steady state.

Fifth Embodiment

Figure 9:
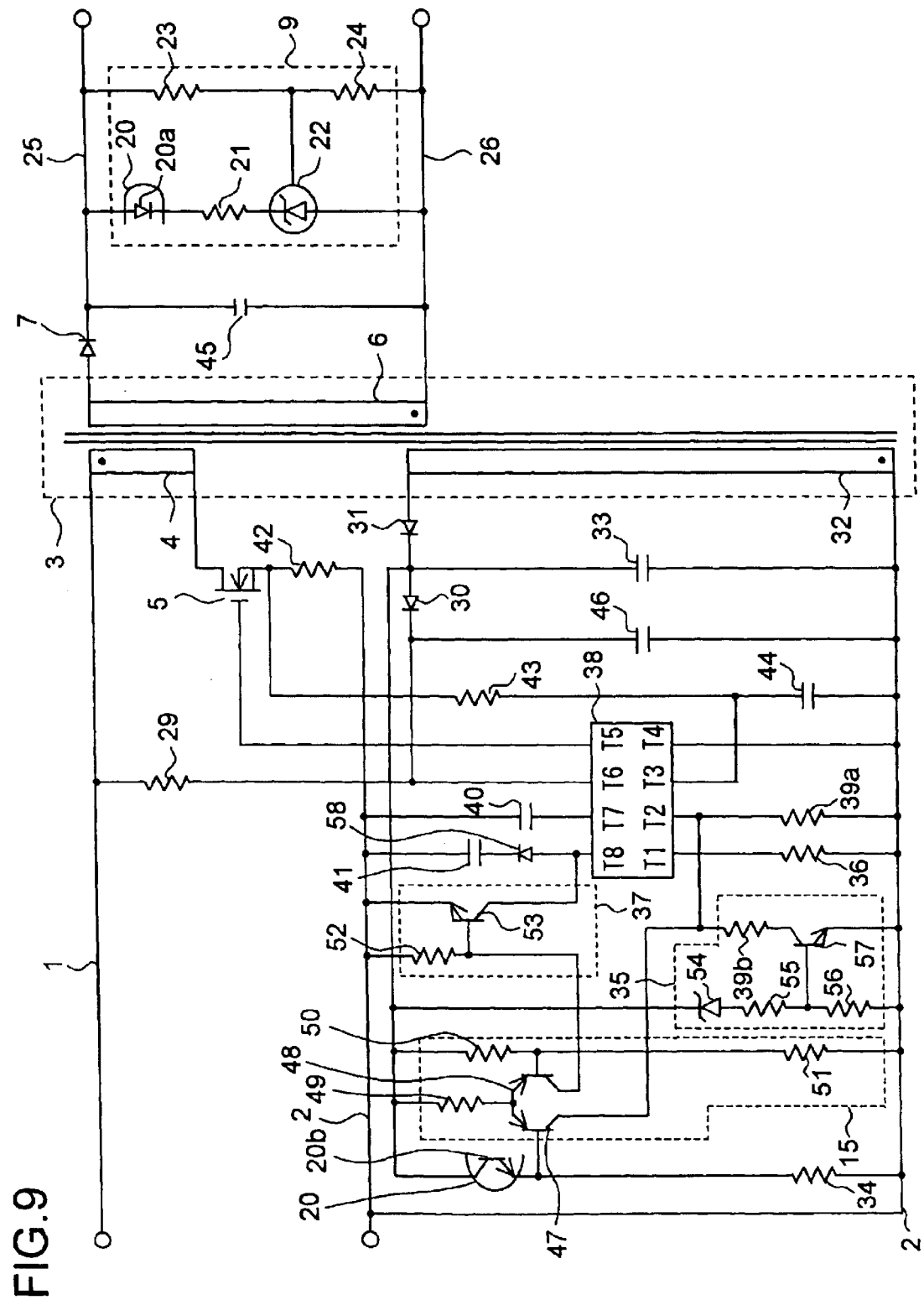
FIG. 9 is a circuit diagram of the switching power supply apparatus of a fifth embodiment of the invention.

FIG. 9 is a circuit diagram of the switching power supply apparatus of a fifth embodiment of the invention. In FIG. 9, such circuit components that find their counterparts in FIG. 4 are identified with the same reference numerals, and their explanations will not be repeated. In the switching power supply apparatus of the fifth embodiment, the configuration of the signal level checker circuit 15, start-up corrector circuit 35, and CS terminal controller circuit 37 is shown in detail.

The signal level checker circuit 15 is composed of PNP-type transistors 47 and 48 and resistors 49, 50, and 51. The start-up corrector circuit 35 is composed of a Zener diode 54, resistors 55, 56, and 39b, and an NPN-type transistor 57. The CS terminal controller circuit 37 is composed of an NPN-type transistor 53 and a resistor 52. In the following descriptions, both PNP-type and NPN-type transistors are referred to simply as transistors.

In the signal level checker circuit 15, the emitter of the transistor 47 and the emitter of the transistor 48 are connected together, and between these emitters and the capacitor 33 is connected the resistor 49. The base of the transistor 47 is connected to the node between the emitter of the phototransistor 20b and the current-detection resistor 34.

The base of the transistor 48 is connected to the point (the node between the resistors 50 and 51) at which a reference voltage is generated by dividing the voltage across the capacitor 33 with the serially connected resistors 50 and 51. The collector of the transistor 47 is connected to the FB terminal T2 of the IC 38, i.e., FA5511, and the collector of the transistor 48 is connected to the base of the transistor 53 provided in the CS terminal controller circuit 37.

Configured as described above, the signal level checker circuit 15 operates in the following manner when the switching power supply apparatus is operating in the steady state.

As described earlier, the charge voltage of the capacitor 33 is stabilized, and a voltage produced by dividing the charge voltage with the resistors 50 and 51 is used as a reference voltage. Let this reference voltage be Eb. At the node between the phototransistor 20b and the current-detection resistor 34, there appears a voltage roughly proportional to the signal level of the feedback signal output from the output voltage detector circuit 9. When this voltage is lower than the reference voltage Eb, the transistor 47 is on and the transistor 48 is off. Thus, a current Ia given by formula (1) below flows through the collector of the transistor 47.

$$Ia=(Ea-Ee-Va)/Rd \tag{1}$$

In formula (1) above, Ea represents the charge voltage of the capacitor 33, Ee represents the voltage at the node between the phototransistor 20b and the current-detection resistor 34 (i.e., the base voltage of the transistor 47), Va represents the forward voltage between the base and emitter of the transistor 47, and Rd represents the resistance of the resistor 49.

Accordingly, as the current flowing through the phototransistor 20b increases, the current supplied to the FB terminal T2 of the IC 38 is reduced, and, as the current flowing through the phototransistor 20b decreases, the current supplied to the FB terminal T2 is increased. Moreover, when the current flowing through the phototransistor 20b further increases, the voltage at the node between the phototransistor 20b and the current-detection resistor 34 becomes higher than the reference voltage Eb. This turns the transistor 47 off and the transistor 48 on, and thus a current is supplied from the collector of the transistor 48 to the CS terminal controller circuit 37.

Next, the CS terminal controller circuit 37 will be described. The transistor 53 has its collector connected to the CS terminal T8 of the IC 38, i.e., FA5511, has its emitter connected to the negative power supply line 2, and has its base connected to the output end of the signal level checker circuit 15.

Accordingly, when a current is supplied from the signal level checker circuit 15, the transistor 53 turns on, and thereby turns the voltage at the CS terminal T8 of the IC 38 low.

A diode 58 is connected between the CS terminal T8 of the IC 38 and the capacitor 41, and this diode 58 serves to quicken the fluctuation of the voltage level at the CS terminal T8 of the IC 38 and thereby quicken the speed of switching between an oscillating state and a resting state in burst oscillation operation.

If this diode 58 is not inserted, i.e., if the CS terminal T8 of the IC 38 is connected directly to the capacitor 41, when the transistor 53 turns on, the voltage at the CS terminal T8 does not turn low until the charge accumulated in the capacitor 41 is depleted. This delays the stopping of switching operation. On the other hand, when the transistor 53 turns off, it takes time for the capacitor 41 to be charged by the current supplied from the operation control circuit 102 to above the lower-limit voltage level of the oscillation signal of the OSC 106. This delays the restarting of switching operation. As a result, in burst switching operation, it occurs that, when the load current of the switching power supply apparatus abruptly increases during the period in which switching operation is not being performed, the output voltage decreases by an increased amount.

In applications where the effects of the delays in the stopping and restarting of switching operation can be ignored, it is not necessary to insert the diode 58.

Next, the start-up corrector circuit 35 will be described. In the start-up corrector circuit 35, the Zener voltage of the Zener diode 54 is the aforementioned predetermined voltage that is so set that, when the charge voltage of the capacitor 33 increases above it, the transistor 57 is turned on. Accordingly, when the charge voltage of the capacitor 33 increases above the Zener voltage (predetermined voltage), the transistor 57 is supplied with its base current from the capacitor 33 through the Zener diode 54 and the resistor 55. This turns the transistor 57 on, which thus connects the resistor 39b in parallel with the resistor 39a and thereby lowers the voltage at the FB terminal T2 of the IC 38.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the principal circuit portions of the IC 38, namely the OSC 106, PWM logic circuit 105, FB terminal T2, and output buffer 101, is also stopped. This helps reduce the power loss suffered while the switching operation is being stopped, and thus helps reduce the power consumption of the apparatus as a whole.

Moreover, the start-up corrector circuit 35 so operates that, when the switching power supply apparatus shifts from start-up operation to steady-state operation, the resistor 39b is connected in parallel with the resistor 39a to reduce the resistance between the FB terminal T2 of the IC 38 and the negative power supply line 2. This lowers the potential at the FB terminal T2, and thereby ensures that the switching power supply apparatus performs reliable output voltage stabilizing control when operating in the steady state.

Moreover, the signal level checker circuit 15, start-up corrector circuit 35, and CS terminal controller circuit 37 can be realized with a simple circuit configuration, and the switching controller circuit can be realized with an IC 38, i.e., FA5511. This helps reduce the space of the circuit board, and thereby reduce the size and cost of the switching power supply apparatus.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation. Incidentally, with the current technology, forming the main switching device in a single package along with such other components results in giving the main switching device a high on-state resistance.

Sixth Embodiment

Figure 10:
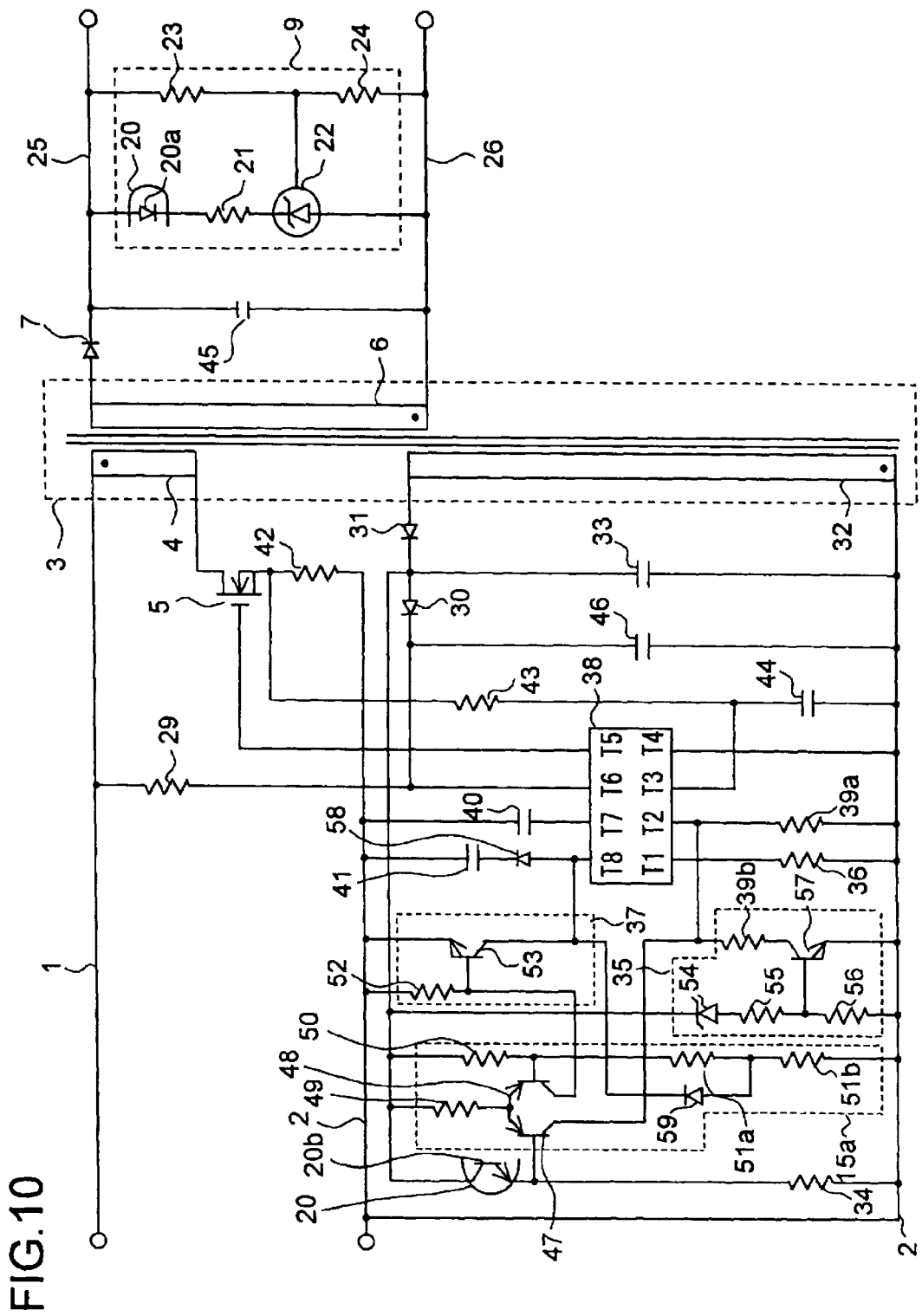
FIG. 10 is a circuit diagram of the switching power supply apparatus of a sixth embodiment of the invention.

FIG. 10 is a circuit diagram of the switching power supply apparatus of a sixth embodiment of the invention. In FIG. 10, such circuit components that find their counterparts in FIG. 9 are identified with the same reference numerals, and their explanations will not be repeated.

In the switching power supply apparatus of the previous embodiment shown in FIG. 9, in burst switching operation, the period in which switching operation is stopped and the period in which switching operation is performed depend, as described earlier, on the delays in the control performed by the output voltage control system. By contrast, in the switching power supply apparatus of this embodiment shown in FIG. 10, the comparison reference power provided within the signal level checker circuit 15a is varied between in the period in which switching operation is stopped and in the period in which switching operation is performed so that, according to how the width of this variation is set, the period in which switching operation is stopped and the period in which switching operation is performed can be extended and adjusted.

In this embodiment, to permit the setting of the comparison reference power, in the voltage division circuit provided in the signal level checker circuit 15 shown in FIG. 9 and composed of the serially connected resistors 50 and 51, the resistor 51 is divided into resistors 51a and 51b as in the signal level checker circuit 15a shown in FIG. 10. The node between the resistors 51a and 51b is connected through a diode 59 to the CS terminal T8 of the IC 38.

In FIG. 10, when the switching power supply apparatus is operating in the steady state, during the period in which switching operation is performed, the voltage at the CS terminal T8 of the IC 38 is high, and the diode 59 prevents a current from flowing from the CS terminal T8 to the node between the resistors 51a and 51b. Thus, the base voltage of the transistor 48 (i.e., the comparison reference power) Esa is roughly set as given by formula (2) below.

$$Esa=[(Ra+Rb) \times Ec]/(Ro+Ra+Rb) \quad (2)$$

In formula (2) above, Ra represents the resistance of the resistor 51a, Rb represents the resistance of the resistor 51b, Ro represents the resistance of the resistor 50, and Ec represents the charge voltage of the capacitor 33.

On the other hand, when the switching power supply apparatus is performing burst switching operation, during the period in which switching operation is stopped, the transistor 53 is on, and the resistor 51b is short-circuited. Thus, the base voltage of the transistor 48 (i.e., the comparison reference power) Esb is roughly set as given by formula (3) below.

$$Esb=(Ra \times Ec)/(Ro+Ra) \quad (3)$$

Hence, the relationship Esa>Esb holds. By appropriately setting the resistances of the resistors 50, 51a, and 51b, it is possible to feely set the value of Esa−Esb.

While the switching power supply apparatus is performing switching operation, when the output voltage increases as a result of, for example, the load current decreasing, and thus the base voltage of the transistor 47 increases above the voltage Esa, as described above, a current is supplied from the transistor 48 to the base of the transistor 53. This turns the transistor 53 on, and thus the switching power supply apparatus stops switching operation.

As a result, the output voltage of the switching power supply apparatus starts to decrease, and, when the base voltage of the transistor 47 decreases below the voltage Esb, the transistor 48 turns off and turns the voltage at the CS terminal T8 of the IC 38 high. Thus, the switching power supply apparatus restarts switching operation. As a result, the output voltage of the switching power supply apparatus increases, and, when the base voltage of the transistor 47 increases above the voltage Esa, the switching power supply apparatus stops switching operation. This sequence of operations is repeated.

Accordingly, the switching power supply apparatus that adopts the signal level checker circuit 15a shown in FIG. 10 exhibits operation characteristics as described below.

In the signal level checker circuit 15 shown in FIG. 9, the voltage of the comparison reference power is fixed. Thus, in a switching power supply apparatus adopting this signal level checker circuit 15, when it is performing burst switching operation, the lengths of the period in which switching is performed and the period in which switching operation is stopped depend on the delay characteristics of the control performed by the output voltage control system. By contrast, in a switching power supply apparatus adopting the signal level checker circuit 15a shown in FIG. 10, the lengths of the period in which switching is performed and the period in which switching operation is stopped are longer than in the switching power supply apparatus adopting the signal level checker circuit 15, and in addition those lengths can be freely set by appropriately setting the value of Esa−Esb as described earlier.

Moreover, in a switching power supply apparatus adopting the signal level checker circuit 15 shown in FIG. 9, when it is performing burst switching operation, the width of the fluctuation of the output voltage (the ripples in the output voltage) is set to be equal to the maximum value determined by the delay characteristics of the control of the output voltage control system. By contrast, in a switching power supply apparatus adopting the signal level checker circuit 15a shown in FIG. 10, the width of the fluctuation of the output voltage is greater than in the switching power supply apparatus adopting the signal level checker circuit 15, and in addition that width can be freely set by appropriately setting the value of Esa−Esb as described earlier.

Incidentally, increasing the width of the variation of the output voltage (i.e., the ripples in the output voltage) leads to the advantage of reducing the power loss suffered in burst switching operation.

Specifically, in a switching power supply apparatus adopting the signal level checker circuit 15, switching operation is started when, in the state in which switching operation is stopped, the signal level of the feedback signal decreases even slightly. At this time point at which switching operation is started, the voltage at the FB terminal T2 of the IC 38 increases little, and therefore the duty of the drive signal output from the output terminal T5 of the IC 38 is small (i.e., the high-level period is short).

By contrast, in a switching power supply apparatus adopting the signal level checker circuit 15a, switching operation is not started until, in the state in which switching operation is stopped, the signal level of the feedback signal decreases down to the level of the voltage Esb. Thus, at this time point at which switching operation is started, the voltage at the FB terminal T2 of the IC 38 increases greatly, and therefore the duty of the drive signal output from the output terminal T5 is great (i.e., the high-level period is long).

Accordingly, at the time point at which switching operation is started, a strikingly large current per switching period is fed from the secondary coil 6 of the transformer 3 through the diode 7, and thus, when observed in a long time span, switching has only to be performed a smaller number of times. This helps reduce power loss.

Therefore, in applications where a minimum fluctuation width is permitted in the output voltage in burst switching operation, the signal level checker circuit 15 shown in FIG. 9 is adopted, and, in applications where priority is given to reduction of power consumption, the signal level checker circuit 15a shown in FIG. 10 is adopted. In a case where the signal level checker circuit 15a is adopted, as described earlier, the width of the fluctuation of the output voltage can be set to be the optimum value that produces fluctuation smaller than applications permit and that simultaneously minimizes power consumption.

Incidentally, when a switching power supply apparatus adopting the signal level checker circuit 15a is operating in a heavy-load state, its output voltage tends to decrease. This keeps the base voltage of the transistor 47 lower than the voltage Esa, and thus the switching power supply apparatus performs continuous switching.

In the switching power supply apparatus of this embodiment, the signal level checker circuit 15a achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the IC 38 is also stopped. This helps reduce the power loss suffered while the switching operation is being stopped, and thus helps reduce the power consumption of the apparatus as a whole.

Moreover, the start-up corrector circuit 35 so operates that, when the switching power supply apparatus shifts from start-up operation to steady-state operation, the resistor 39b is connected in parallel with the resistor 39a to reduce the resistance between the FB terminal T2 of the IC 38 and the negative power supply line 2. This lowers the potential at the FB terminal T2, and thereby ensures that the switching power supply apparatus performs reliable output voltage stabilizing control when operating in the steady state.

Moreover, the signal level checker circuit 15a, start-up corrector circuit 35, and CS terminal controller circuit 37 can be realized with a simple circuit configuration, and the switching controller circuit can be realized with an IC 38, i.e., FA5511. This helps reduce the space of the circuit board, and thereby reduce the size and cost of the switching power supply apparatus.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation. Incidentally, with the current technology, forming the main switching device in a single package along with such other components results in giving the main switching device a high on-state resistance.

Seventh Embodiment

Figure 11:
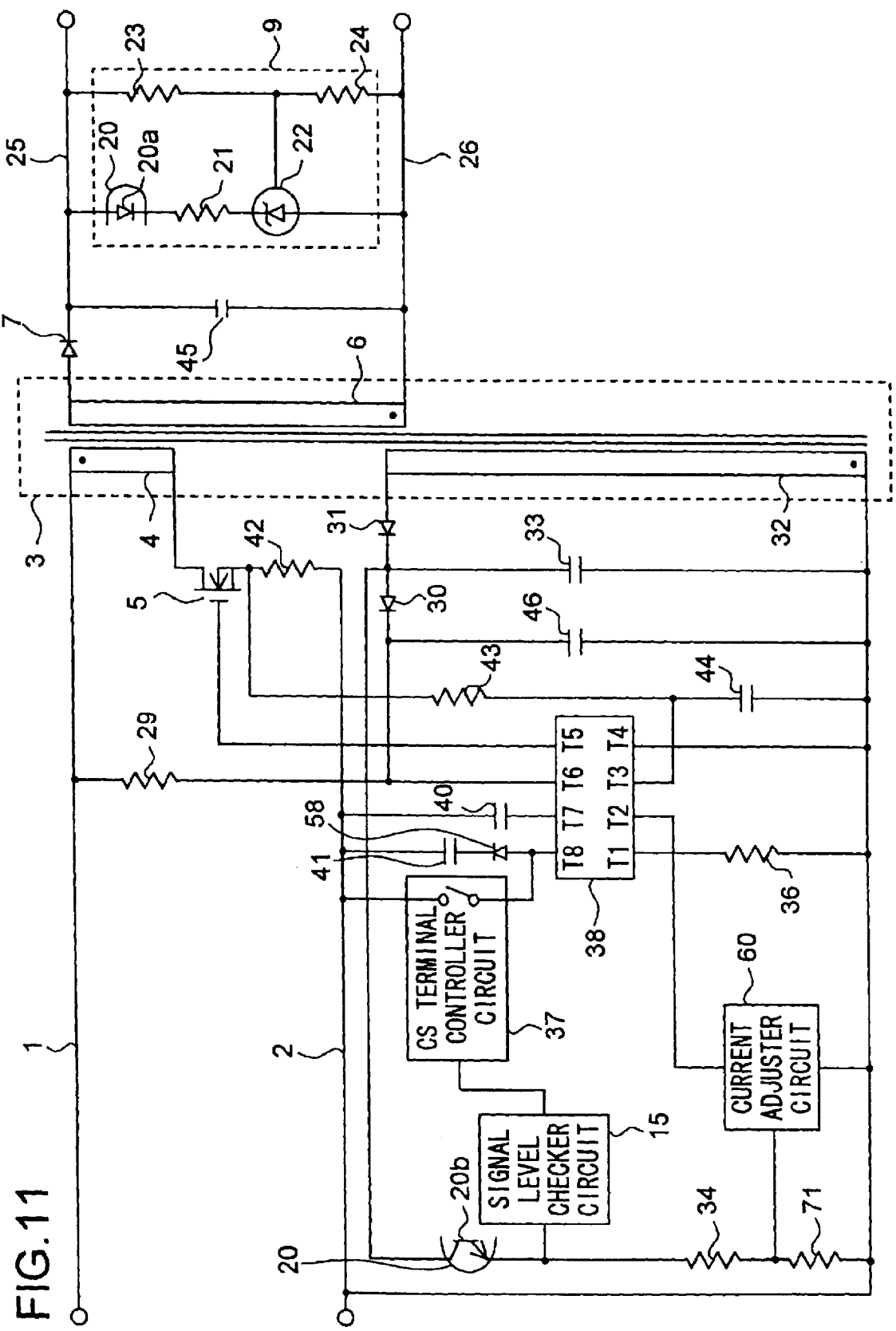
FIG. 11 is a circuit diagram of the switching power supply apparatus of a seventh embodiment of the invention.

FIG. 11 is a circuit diagram of the switching power supply apparatus of a seventh embodiment of the invention. In FIG. 11, such circuit components that find their counterparts in FIG. 4 are identified with the same reference numerals, and their explanations will not be repeated.

In the switching power supply apparatus shown in FIG. 4, the feedback signal is fed from the phototransistor 20b through the signal level checker circuit 15 and then, after having the increase or decrease in its signal level inverted as described earlier, to the FB terminal T2 of the IC 38. By contrast, in the switching power supply apparatus of this embodiment shown in FIG. 11, the feedback signal is fed from the phototransistor 20b through the resistor 34 and a current adjuster circuit 60 to the FB terminal T2 of the IC 38. Moreover, in this embodiment, the start-up corrector circuit is omitted for the reason stated later.

The current adjuster circuit 60 absorbs from the FB terminal T2 of the IC 38 a current proportional to the voltage at the node between the phototransistor 20b and the resistor 34. Accordingly, when the output voltage of the switching power supply apparatus is, for example, higher than a predetermined value, the output voltage detector circuit 9 increases the voltage at the node between the phototransistor 20b and the resistor 34, and the current adjuster circuit 60 increases, in a manner corresponding to the increase in that voltage, the current that it absorbs from the FB terminal T2 of the IC 38. This causes the voltage at the FB terminal T2 to decrease.

As this voltage decreases, the PWM logic circuit 105 (see FIG. 6) provided within the IC 38 feeds, via the output terminal T5 of the IC 38, the main switching device 5 with a drive signal of which the high-level period is short. This causes the current supplied from the secondary coil 6 of the transformer 3 through the diode 7 to decrease, and thus the output voltage is so controlled as to decrease.

On the other hand, when the output voltage of the switching power supply apparatus is, for example, lower than the predetermined value, the output voltage detector circuit 9 decreases the voltage at the node between the phototransistor 20b and the resistor 34, and the current adjuster circuit 60 decreases, in a manner corresponding to the decrease in that voltage, the current that it absorbs from the FB terminal T2 of the IC 38. This causes the voltage at the FB terminal T2 to increase.

As this voltage increases, the PWM logic circuit 105 (see FIG. 6) provided within the IC 38 feeds, via the output terminal T5 of the IC 38, the main switching device 5 with a drive signal of which the high-level period is long. This causes the current supplied from the secondary coil 6 of the transformer 3 through the diode 7 to increase, and thus the output voltage is so controlled as to increase.

The principle on which the switching power supply apparatus shown in FIG. 11 achieves burst switching control is the same as that on which the switching power supply apparatus shown in FIG. 4 achieves burst switching control.

The switching power supply apparatus of this embodiment, at start-up, starts up in the same manner as a common circuit (see FIG. 5) that employs FA5511 (IC 38). This makes it possible to omit the start-up corrector circuit described earlier.

Specifically, at the time point t1 shown in FIG. 7, the charge voltage of the capacitor 33 is zero, the voltage at the node between the phototransistor 20b and the resistor 34 is also zero, and the current adjuster circuit 60 does not absorb a current from the FB terminal T2 of the IC 38. Thus, the voltage at the FB terminal T2 has the same level as the output voltage of the 5 V voltage regulator 103 (see FIG. 6).

Thereafter, the output voltage of the switching power supply apparatus and the charge voltage of the capacitor 33 increase, and, when, at the time point t3, the output voltage of the switching power supply apparatus reaches close to the predetermined voltage set by the resistors 23 and 24, a current flows through the phototransistor 20b. This causes the voltage at the node between the phototransistor 20b and the resistor 34 to increase, and the voltage at the FB terminal T2 of the IC 38 start to decrease. Now, control for outputting a stabilized steady-state voltage is started. During the period up to the time point t3, the duty of the drive signal output from the output terminal T5 of the IC 38 is controlled by the voltage level at the CS terminal T8.

The operation described above is the same as the operation performed at start-up by a common circuit employing FA5511 like the one described in connection with the switching power supply apparatus shown in FIG. 4. The switching power supply apparatus shown in FIG. 11 does not require a start-up corrector circuit.

As described above, the switching power supply apparatus shown in FIG. 11 does not require a start-up corrector circuit, and thus has an accordingly simpler circuit configuration. However, in this switching power supply apparatus, as will be described later in connection with the eighth embodiment, the characteristics of the individual components such as semiconductor devices used in the current adjuster circuit 60 drift with temperature. Disadvantageously, this causes variation in the load current target value at which switching is performed from burst switching to normal continuous switching and the load current target value at which switching is performed from normal continuous switching to burst switching. Therefore, the switching power supply apparatus shown in FIG. 11 is suitable in applications where variation in the load current target—values is permitted.

In the switching power supply apparatus of this embodiment, the signal level checker circuit 15 achieves burst switching control by repeatedly turning on and off the CS terminal controller circuit. Moreover, in burst switching control, while the switching operation of the main switching device 5 is being stopped, the supply of operating power to the principal components of the IC 38, namely the OSC 106, PWM logic circuit 105, FB terminal T2, and output buffer 101, is also stopped. This helps reduce the power loss suffered while the switching operation is being stopped, and thus helps reduce the power consumption of the apparatus as a whole.

Moreover, when the switching power supply apparatus starts up, the current adjuster circuit 60 so operates as to adjust the current at the FB terminal T2 of the IC 38. Thus, the PWM control IC makes the main switching device perform switching operation with a great on-state duty. This helps reduce start-up time.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation.

Eighth Embodiment

Figure 12:
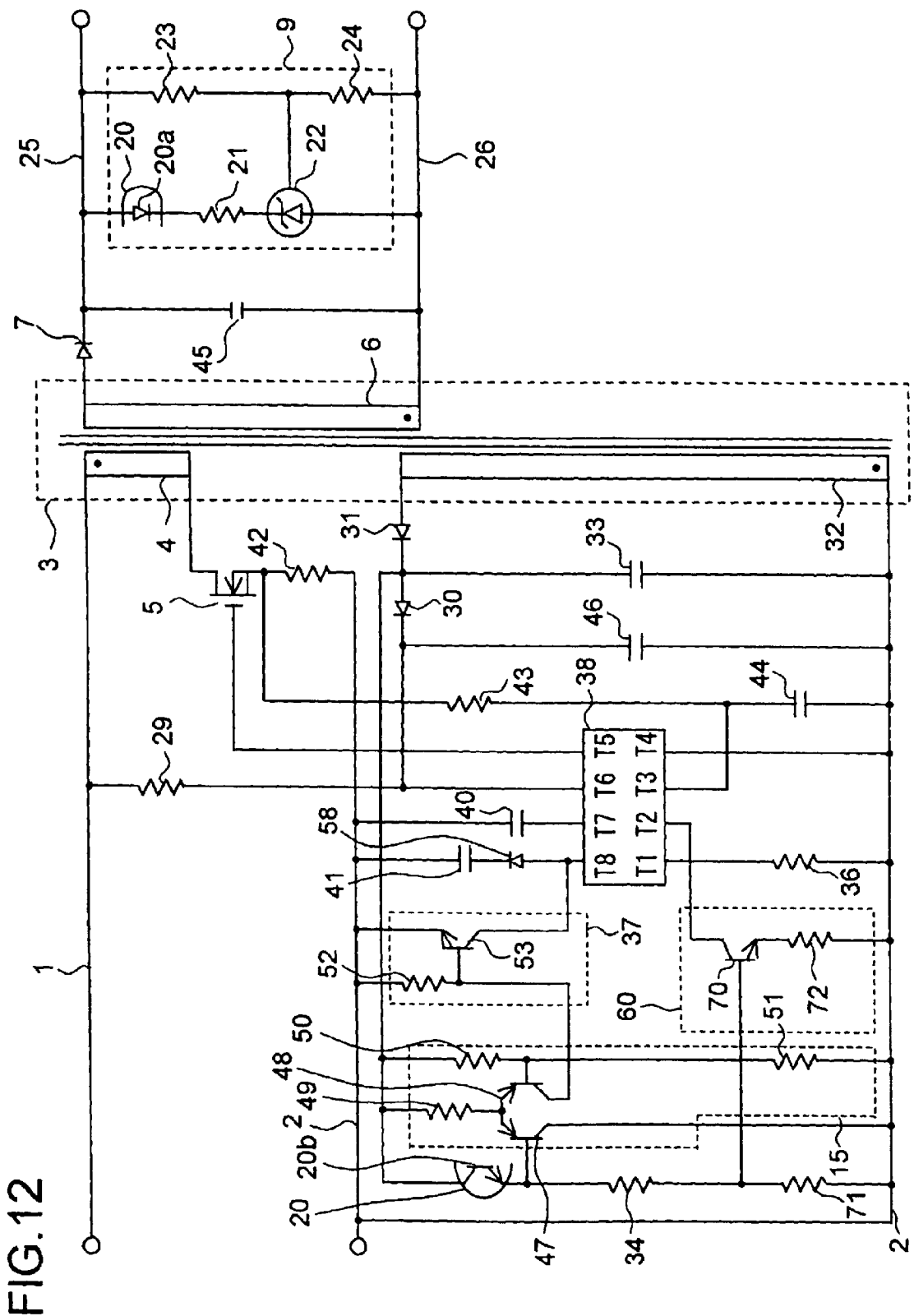
FIG. 12 is a circuit diagram of the switching power supply apparatus of an eighth embodiment of the invention.

FIG. 12 is a circuit diagram of the switching power supply apparatus of an eighth embodiment of the invention. In FIG. 12, such circuit components that find their counterparts in FIGS. 10 and 11 are identified with the same reference numerals, and their explanations will not be repeated.

In FIG. 12, the current adjuster circuit 60 is composed of a transistor 70 and a resistor 72. The transistor 70 has its collector connected to the FB terminal T2 of the IC 38, has its base connected to the node between the resistor 34 and a resistor 71, and has its emitter connected through the resistor 72 to the negative power supply line 2.

When the switching power supply apparatus is performing normal continuous switching operation, the voltage Ef at the FB terminal T2 of the IC 38 is roughly determined by formula (4) below.

$$Ef = Er - (Ea - Vb) \times Re/Rc - Vf \quad (4)$$

In formula (4) above, Er represents the output voltage of the 5 V voltage regulator 103 (see FIG. 6) provided within the IC 38, i.e., FA5511, Ea represents the voltage at the node between the resistor 71 and the resistor 34, Vb represents the forward voltage between the base and emitter of the transistor 70, Re represents the resistance of the pull-up resistor 108 (see FIG. 6) provided within the IC 38, Rc represents the resistance of the resistor 72, and Vf represents the forward voltage drop across the diode 107 (see FIG. 6) provided within the IC 38.

As will be clear from formula (4) above, the voltage Ef relates to the forward voltage between the base and emitter of the transistor 70. In general, the forward voltage between the base and emitter of a transistor varies with temperature. Therefore, even when the base voltage of the transistor 47 is stable, as the operating ambient temperature varies, the forward voltage of the transistor 70 varies, and thus the voltage at the FB terminal T2 of the IC 38 varies.

Moreover, when the switching power supply apparatus is performing continuous switching, as described earlier, the voltage level at the FB terminal T2 of the IC 38 is varied according to the variation of the output voltage of the switching power supply apparatus so that the output voltage is stabilized. This means, since the output voltage depends on the variation of the load, that the output voltage is stabilized by varying the voltage level at the FB terminal T2 according to the variation of the load current. Thus, the voltage value at the FB terminal T2 represents the load current of the switching power supply apparatus.

In the switching power supply apparatus, as described earlier, in continuous switching operation, as the load current is decreased gradually, the base voltage of the transistor 47 increases, and, when it becomes higher than the base voltage (comparison reference voltage) of the transistor 48, the transistor 53 turns on, achieving a shift into burst switching operation. Thus, if the voltage at the FB terminal T2 of the IC 38 at the time point of this switching varies according to the operating ambient temperature of the switching power supply apparatus, it follows that, quite undesirably, the load current at the time point of that switching also varies according to the operating ambient temperature of the switching power supply apparatus.

Depending on the type of the appliance connected to the switching power supply apparatus, the appliance may require an accurate value as the reference relative to which to evaluate the load current to determine whether to perform switching or not. Thus, in such applications, the switching power supply apparatus is not very suitable. However, in applications where such accuracy is not required, the switching power supply apparatus, having a comparatively simple configuration, is suitable.

Incidentally, in the circuits shown in FIGS. 4, 9, and 10 described earlier, instead of providing a current adjuster circuit 60, the causes for the variation of the load current are eliminated. This makes it possible to comparatively accurately evaluate the load current at the time of operation mode switching. However, the additional provision of the start-up corrector circuit 35 makes the circuit configuration a little more complicated.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the principal circuit portions of the IC 38, namely the OSC 106, PWM logic circuit 105, FB terminal T2, and output buffer 101, is also stopped. This helps reduce the power loss suffered while the switching operation is being stopped, and thus helps reduce the power consumption of the apparatus as a whole.

Moreover, when the switching power supply apparatus starts up, the current adjuster circuit 60 so operates as to adjust the current at the FB terminal T2 of the IC 38. Thus, the PWM control IC makes the main switching device perform switching operation with a great on-state duty. This helps reduce start-up time.

Moreover, the signal level checker circuit 15, current adjuster circuit 60, and CS terminal controller circuit 37 can be realized with a simple circuit configuration, and the switching controller circuit can be realized with an IC 38, i.e., FA5511. This helps reduce the space of the circuit board, and thereby reduce the size and cost of the switching power supply apparatus.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation.

Ninth Embodiment

Figure 13:
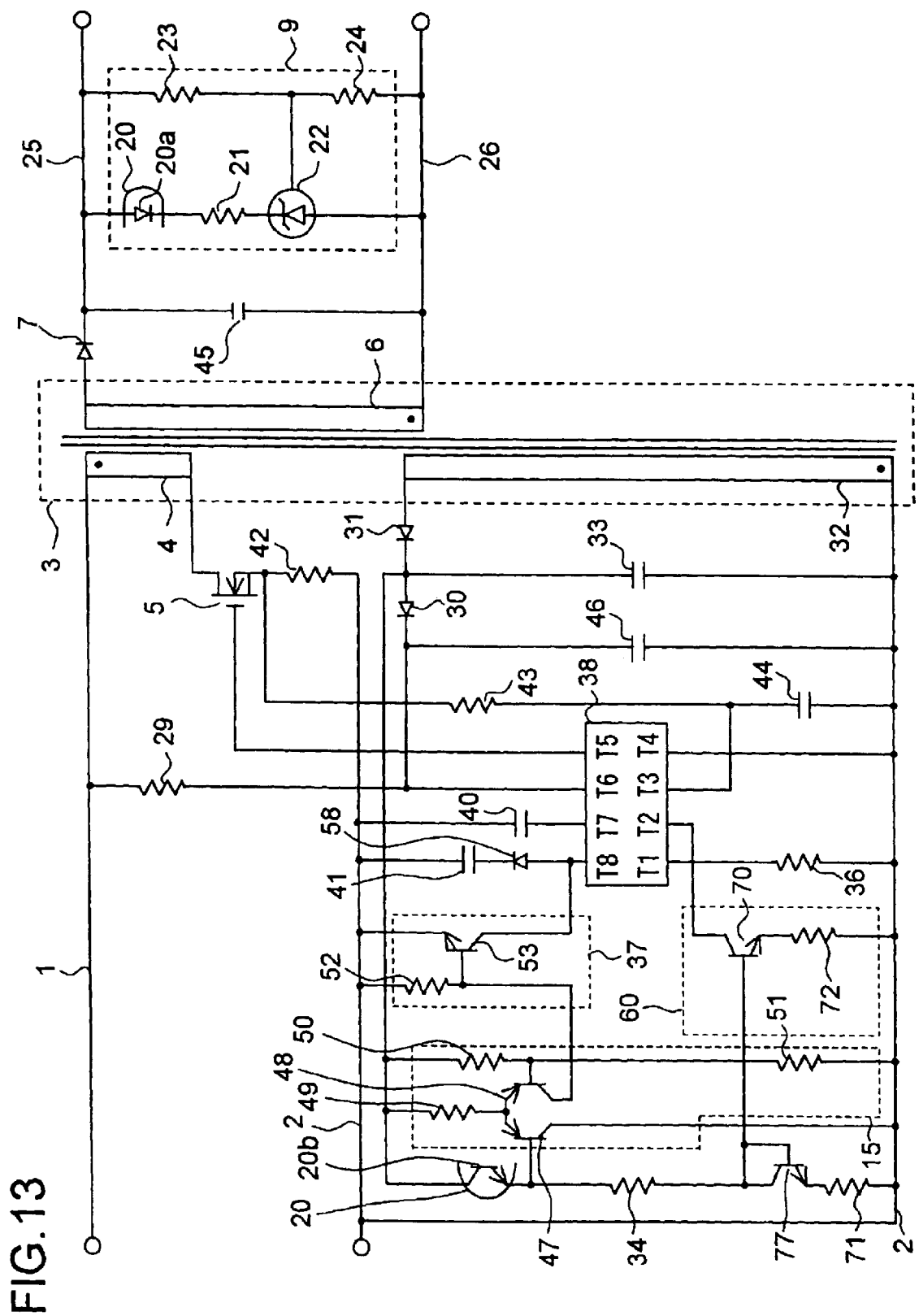
FIG. 13 is a circuit diagram of the switching power supply apparatus of a ninth embodiment of the invention.

FIG. 13 is a circuit diagram of the switching power supply apparatus of a ninth embodiment of the invention. In FIG. 13, such circuit components that find their counterparts in FIG. 12 are identified with the same reference numerals, and their explanations will not be repeated.

The circuit shown in FIG. 13 differs from that shown in FIG. 12 in that a transistor 77 having identical characteristics with the transistor 70 is additionally connected in series with the resistor 71. By the action of this transistor 77, the circuit shown in FIG. 13 can alleviate drift of characteristics with temperature. Specifically, for example, when the operating ambient temperature of the switching power supply apparatus rises, at the same time that the forward voltage between the base and emitter of the transistor 70 decreases, the forward voltage between the base and emitter of the transistor 77 also decreases. This causes the base voltage of the transistor 70 to decrease, and thereby suppresses variation of the voltage at the FB terminal T2 of the IC 38.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the IC 38 is also stopped. This helps reduce the power loss suffered while the switching operation is being stopped, and thus helps reduce the power consumption of the apparatus as a whole.

Moreover, when the switching power supply apparatus starts up, the current adjuster circuit 60 so operates as to adjust the current at the FB terminal T2 of the IC 38. Thus, the PWM control IC makes the main switching device perform switching operation with a great on-state duty. This helps reduce start-up time.

Moreover, the signal level checker circuit 15, current adjuster circuit 60, and CS terminal controller circuit 37 can be realized with a simple circuit configuration, and the switching controller circuit can be realized with an IC 38, i.e., FA5511. This helps reduce the space of the circuit board, and thereby reduce the size and cost of the switching power supply apparatus.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation.

Tenth Embodiment

Figure 14:
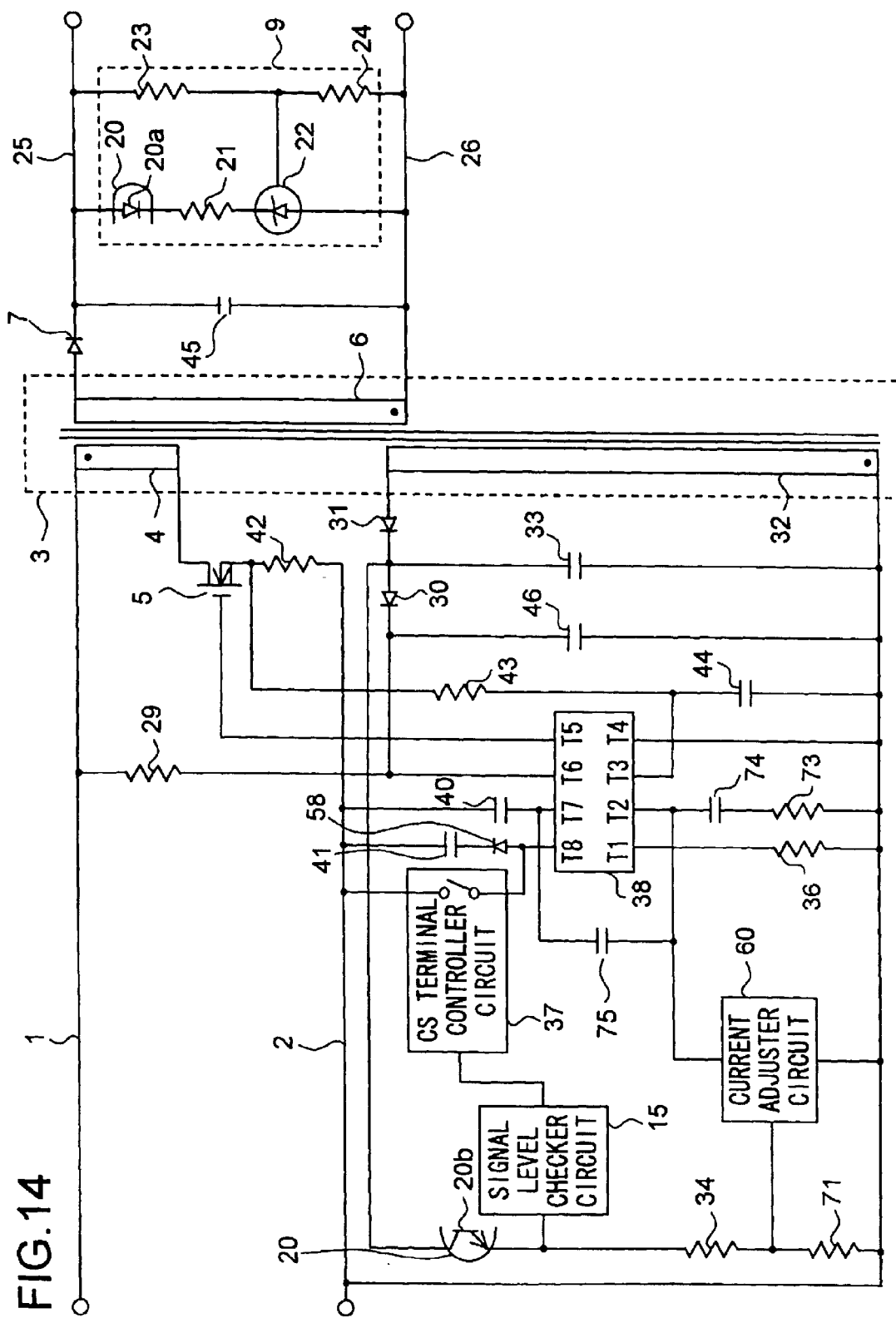
FIG. 14 is a circuit diagram of the switching power supply apparatus of a tenth embodiment of the invention.

FIG. 14 is a circuit diagram of the switching power supply apparatus of a tenth embodiment of the invention. In FIG. 14, such circuit components that find their counterparts in FIG. 11 are identified with the same reference numerals, and their explanations will not be repeated.

The circuit shown in FIG. 14 differs from that shown in FIG. 11 in that a capacitor 75 is additionally connected between the terminal T7 and the FB terminal T2 of the IC 38. Moreover, in the circuit shown in FIG. 14, mainly for phase compensation of the output stabilizing control system in the continuous switching state, a serial circuit composed of a resistor 73 and a capacitor 74 may be additionally connected between the FB terminal T2 of the IC 38 and the negative power supply line 2.

Adding the capacitor 74 and the resistor 73, however, causes the following undesirable phenomenon in burst switching operation.

When the switching power supply apparatus is performing burst switching operation, during the period in which switching operation is stopped, as described earlier, the output voltage of the 5 V voltage regulator 103 (see FIG. 6) is zero, and thus the voltage at the FB terminal T2 of the IC 38 decreases. Thereafter, as described earlier, at the time point at which switching operation is started, the output voltage of the 5 V voltage regulator 103 rises, and thus a current flows into the capacitor 74 through the diode 107 (see FIG. 6) and the resistor 108 (see FIG. 6). Thus, it takes a while for the voltage at the FB terminal T2 of the IC 38 to reach the lower-limit voltage level of the output signal of the OSC 106. This delays the starting of switching operation.

For example, while the switching power supply apparatus is performing burst switching operation, when the load current abruptly increases during the period in which switching operation is stopped, the decrease in the output voltage of the switching power supply apparatus is detected by the signal level checker circuit 15 detecting a decrease in the feedback signal. In this case, even if the output voltage of the 5 V voltage regulator 103 (FIG. 6) is made to rise quickly, the aforementioned delay in the starting of switching operation, quite disadvantageously, lets the output voltage of the switching power supply apparatus further decrease during the delay.

That is, in burst switching operation, when the load increases abruptly, the delay in the operation of the burst switching operation control system increases the amount by which the output voltage of the switching power supply apparatus decreases. For this reason, it is desirable to increase the control speed of the burst switching control system as much as possible.

Incidentally, when the output of the 5 V voltage regulator 103 (see FIG. 6) rises, by supplying a current through the capacitor 75 to the capacitor 74, it is possible to eliminate the delay of the operation of the burst switching operation control system. Moreover, by giving the capacitor 75 a capacitance higher than that required to eliminate the delay of the operation of the burst switching operation control system, it is possible to achieve the same effects as those achieved in the embodiment shown in FIG. 10.

Specifically, when the capacitor 75 is given so high a capacitance, in burst switching operation, at the time point at which switching operation is started, the voltage at the FB terminal T2 of the IC 38 becomes higher than the value corresponding to the level of the feedback signal, and thus a drive signal having a great duty is fed via the output terminal T5 of the IC 38 to the main switching device 5. Thus, for the same reasons as stated in connection with the embodiment shown in FIG. 10, the switching power supply apparatus shown in FIG. 14 contributes to reduction of the power loss suffered in the burst switching operation.

As compared with the switching power supply apparatus of the embodiment shown in FIG. 10, however, the way how power loss in burst switching operation is reduced in the switching power supply apparatus of the embodiment shown in FIG. 14 is a little less reliable because of the difficulty in setting the capacitance of the added capacitor 75. That is, in the switching power supply apparatus of the embodiment shown in FIG. 14, the addition of the capacitor 75 affects the phase compensation of the output voltage stabilizing control system, and therefore this configuration can be suitably adopted in a case where, with the capacitor 75 added, the desired phase compensation is achieved.

Figure 16:
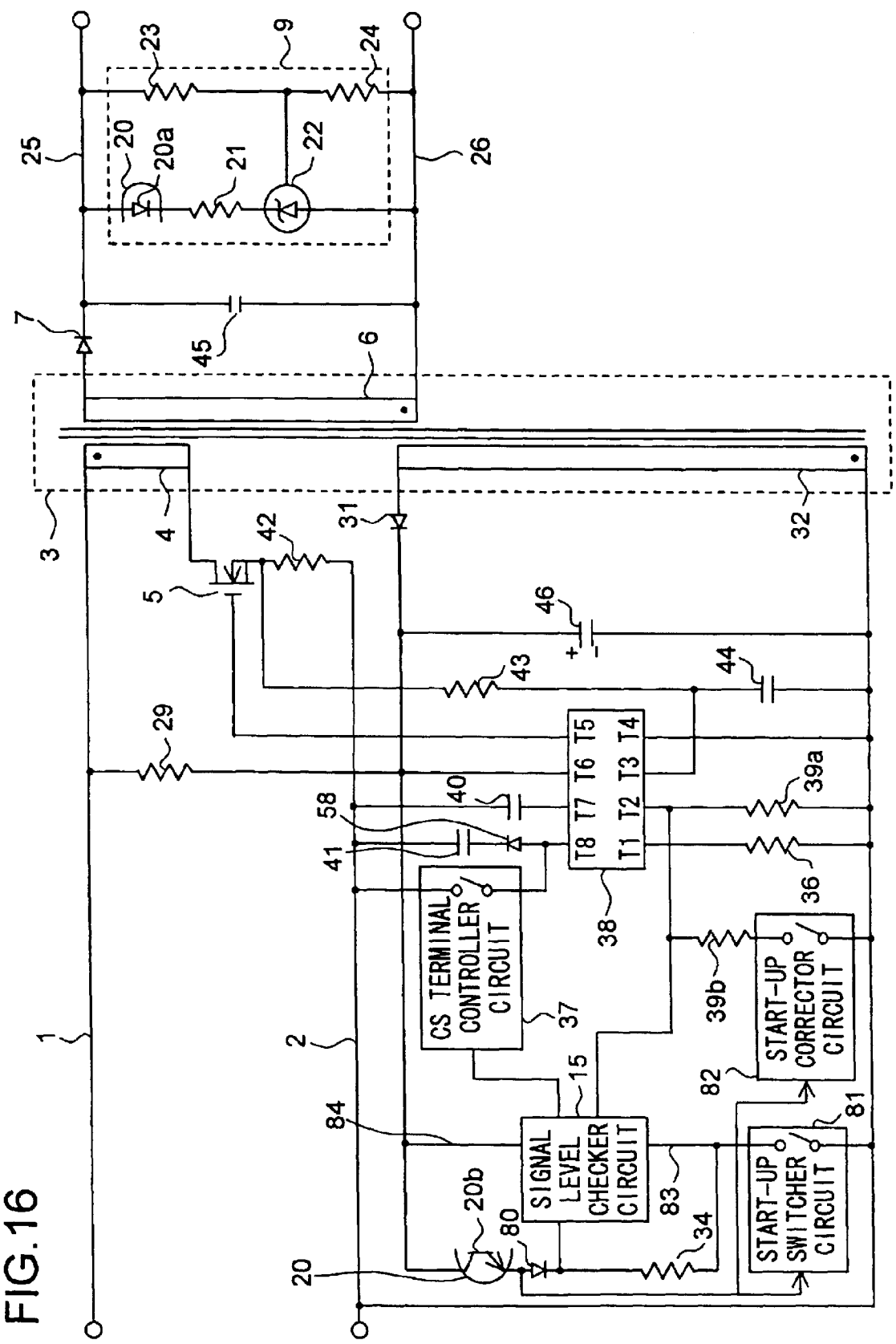
FIG. 16 is a circuit diagram of the switching power supply apparatus of a twelfth embodiment of the invention.
Figure 19:
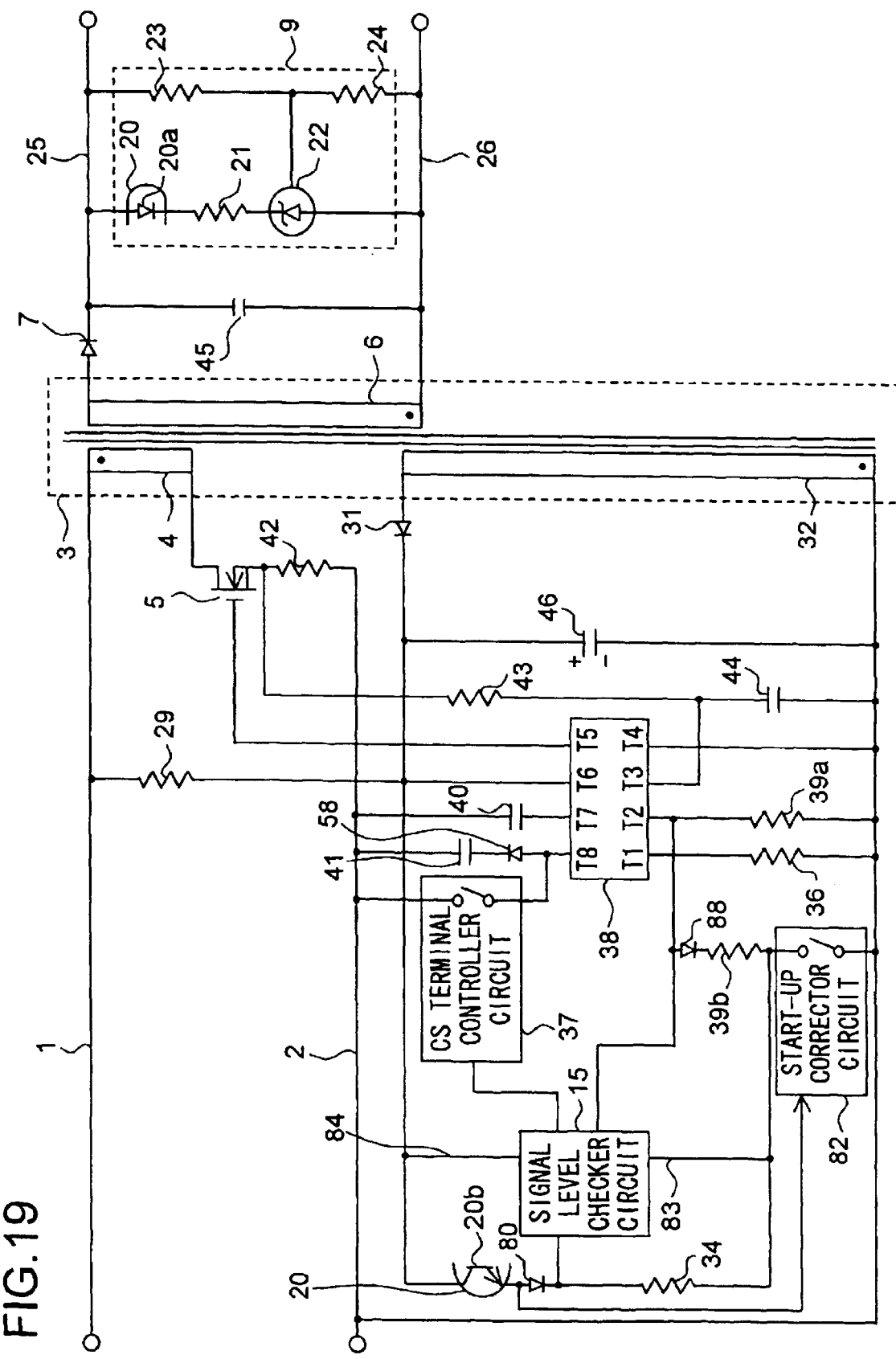
FIG. 19 is a circuit diagram of the switching power supply apparatus of a fourteenth embodiment of the invention.

Incidentally, the addition of the capacitor 75 is effective also in a case where the capacitor 74 and the resistor 73 are added in the switching power supply apparatus of the embodiment shown in FIGS. 4, 16, or 19.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the principal components of the IC 38, namely the OSC 106, PWM logic circuit 105, FB terminal T2, and output buffer 101, is also stopped. This helps reduce the power loss suffered while the switching operation is being stopped, and thus helps reduce the power consumption of the apparatus as a whole.

Moreover, when the switching power supply apparatus starts up, the current adjuster circuit 60 so operates as to adjust the current at the FB terminal T2 of the IC 38. Thus, the PWM control IC makes the main switching device perform switching operation with a great on-state duty. This helps reduce start-up time.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation.

Eleventh Embodiment

Figure 15:
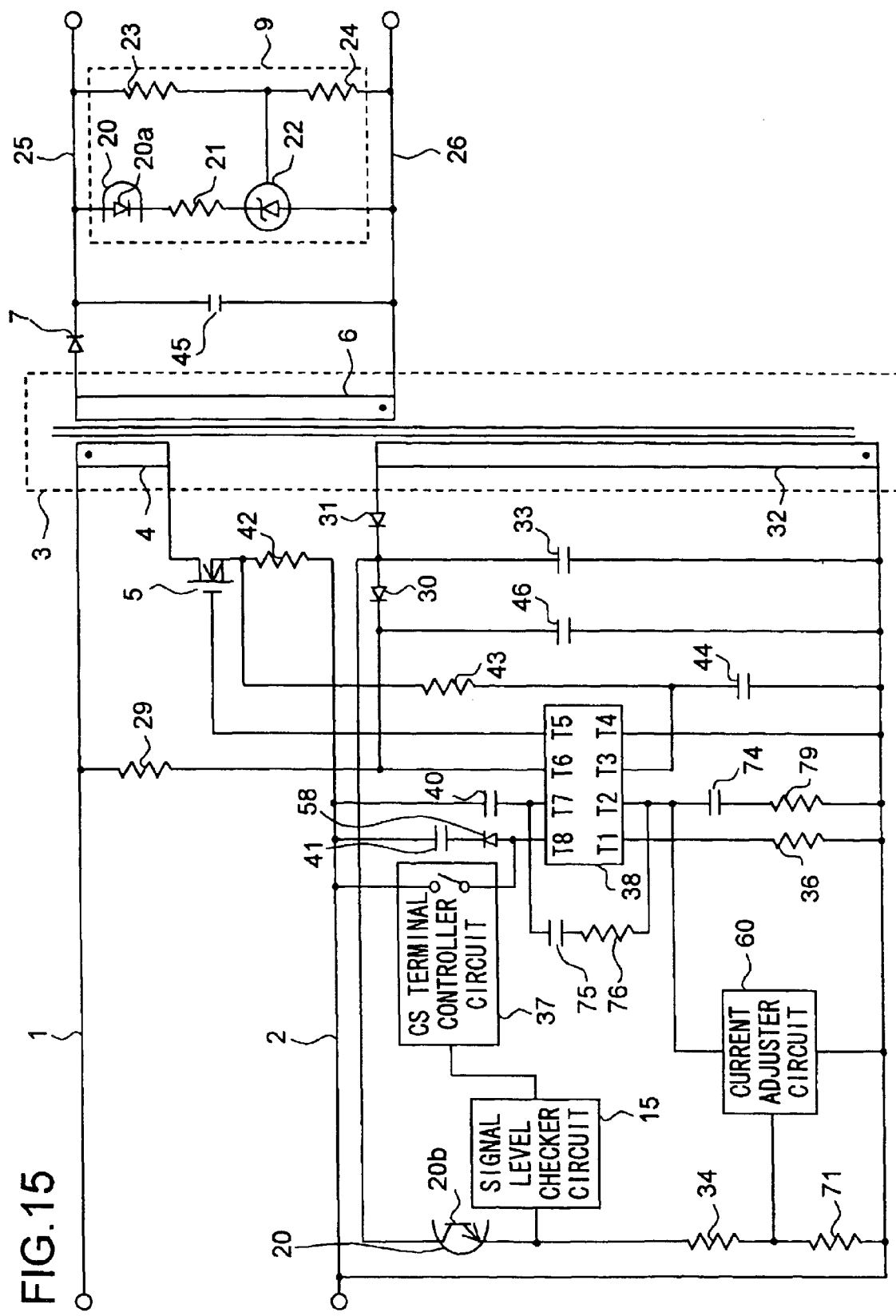
FIG. 15 is a circuit diagram of the switching power supply apparatus of an eleventh embodiment of the invention.

FIG. 15 is a circuit diagram of the switching power supply apparatus of an eleventh embodiment of the invention. In FIG. 15, such circuit components that find their counterparts in FIG. 14 are identified with the same reference numerals, and their explanations will not be repeated.

The switching power supply apparatus shown in FIG. 15 differs from that shown in FIG. 14 in that the phase compensation circuit composed of the capacitor 74 and the resistor 73 which is provided in the latter is replaced with two serial circuits in the former, specifically one composed of a capacitor 75 and a resistor 76 and another composed of a capacitor 78 and a resistor 79 as shown in FIG. 15. By giving these capacitors 75 and 78 and resistors 76 and 69 capacitances and resistances that fulfill formulae (5) and (6) below, it is possible to completely eliminate the effects of the phase compensation circuit in burst switching operation and to realize the desired phase compensation in continuous switching operation.

$$Ca \times Rm = Cb \times Rn \quad (5)$$

$$Ed = Er \times Ca/(Ca+Cb) \quad (6)$$

In formulae (5) and (6) above, Ca represents the capacitance of the capacitor 75, Cb represents the capacitance of the capacitor 78, Rm represents the resistance of the resistor 76, Rn represents the resistance of the resistor 79, Er represents the output voltage of the 5 V voltage regulator 103 (see FIG. 6), and Ed represents the voltage drop (variation in voltage) that occurs at the FB terminal T2 of the IC 38.

More specifically, Ed represents the voltage drop (variation in voltage) that occurs at the FB terminal T2 of the IC 38 when the 5 V voltage regulator 103 stops its output in burst switching operation. For example, in the switching power supply apparatus of the embodiment shown in FIG. 15, immediately before the 5 V voltage regulator 103 stops its output, the current adjuster circuit 60 absorbs from the FB terminal T2 a current commensurate with the signal level of the feedback signal fed from the phototransistor 20b, and thus the voltage at the FB terminal T2 is kept at the voltage level commensurate with the absorbed current. However, as soon as the 5 V voltage regulator 103 stops its output, the voltage at the FB terminal T2 drops to zero. Ed represents this voltage difference (voltage drop).

In formula (6), if the value of the right side is made greater than Ed, in burst switching operation, at the time point at which switching operation is started, the voltage at the FB terminal T2 becomes higher than the value corresponding to the level of the feedback signal, and thus a drive signal having a great duty is fed via the output terminal T5 of the IC 38 to the main switching device 5. Thus, for the same reasons as stated in connection with the embodiment shown in FIG. 10, the switching power supply apparatus shown in FIG. 15 contributes to reduction of the power loss suffered in the burst switching operation.

Moreover, in the switching power supply apparatus of the embodiment shown in FIG. 15, by setting the capacitances of the capacitors and the resistances of the resistors in such a way that they fulfill formulae (7) and (8) below, it is possible, in continuous switching operation, to obtain the same phase compensation characteristic as when phase compensation is achieved with the serial circuit composed of the capacitor 74 and the resistor 73 (see FIG. 14) alone.

$$Ca \times Rm = Cb \times Rn = Cd \times Rt \quad (7)$$

$$Cd = Ca + Cb \quad (8)$$

In formulae (7) and (8) above, Ca represents the capacitance of the capacitor 75, Cb represents the capacitance of the capacitor 78, Cd represents the capacitance of the capacitor 74 (see FIG. 14), Rm represents the resistance of the resistor 76, Rn represents the resistance of the resistor 79, and Rt represents the resistance of the resistor 73.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the IC 38 is also stopped. This helps reduce the power loss suffered while the switching operation is being stopped, and thus helps reduce the power consumption of the apparatus as a whole.

Moreover, when the switching power supply apparatus starts up, the current adjuster circuit 60 so operates as to adjust the current at the FB terminal T2 of the IC 38. Thus, the PWM control IC makes the main switching device perform switching operation with a great on-state duty. This helps reduce start-up time.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation.

Twelfth Embodiment

FIG. 16 is a circuit diagram of the switching power supply apparatus of a twelfth embodiment of the invention. In FIG. 16, such circuit components that find their counterparts in FIG. 4 are identified with the same reference numerals, and their explanations will not be repeated.

In the switching power supply apparatus of this embodiment shown in FIG. 16, the subsidiary control power used in FIG. 4 is omitted, and instead a direct current produced by rectifying with the diode 31 the voltage induced in the subsidiary coil 32 of the transformer 3 is used as the power of the control circuit, and is thus fed directly to the capacitor 46.

When the switching power supply apparatus shown in FIG. 16 starts to start up, as described earlier, the start-up current that is supplied through the start-up resistor 29 flows through the signal level checker circuit 15, and this lengthens the time required for the charge voltage of the capacitor 46 to reach the operation starting voltage of the IC 38, i.e., FA5511. To prevent this, here, a start-up switcher circuit 81 is additionally provided.

The output current (feedback signal) of the phototransistor 20b is fed through a diode 80 to the signal level checker circuit 15, and the start-up switcher circuit 81 and a start-up corrector circuit 82 check whether the feedback signal is present or not by monitoring the voltage at the node between the phototransistor 20b and the diode 80.

The current consumed by the signal level checker circuit 15 (the current consumed including that consumed by the comparison reference power) is fed thereto from the positive terminal of the capacitor 46 by way of a line 84, and is returned by way of a line 83 through the switch provided within the start-up switcher circuit 81 to the negative terminal of the capacitor 46. On the other hand, the current through the phototransistor 20b is fed thereto from the positive terminal of the capacitor 46, and is returned through the diode 80, the current-detection resistor 34, and the switch provided within the start-up switcher circuit 81 to the negative terminal of the capacitor 46.

When the switching power supply apparatus starts to start up, the internal switch of the start-up switcher circuit 81 and the internal switch of the start-up corrector circuit 82 are off, and the output voltage of the switching power supply apparatus is lower than a predetermined target voltage. Thus, no current is consumed by the signal level checker circuit 15 (including the comparison reference power provided therein) or the phototransistor 20b. Accordingly, the charge voltage of the capacitor 46, owing to the start-up current fed thereto through the start-up resistor 29, quickly rises and reaches the operation start voltage level of the IC 38, i.e., FA5511. The time required for the charge voltage of the capacitor 46 to rise here is roughly as short as in a common configuration employing FF5511.

Next, the start-up operation of the switching power supply apparatus will be described with reference to a signal waveform diagram shown in FIG. 17.

Figure 17:
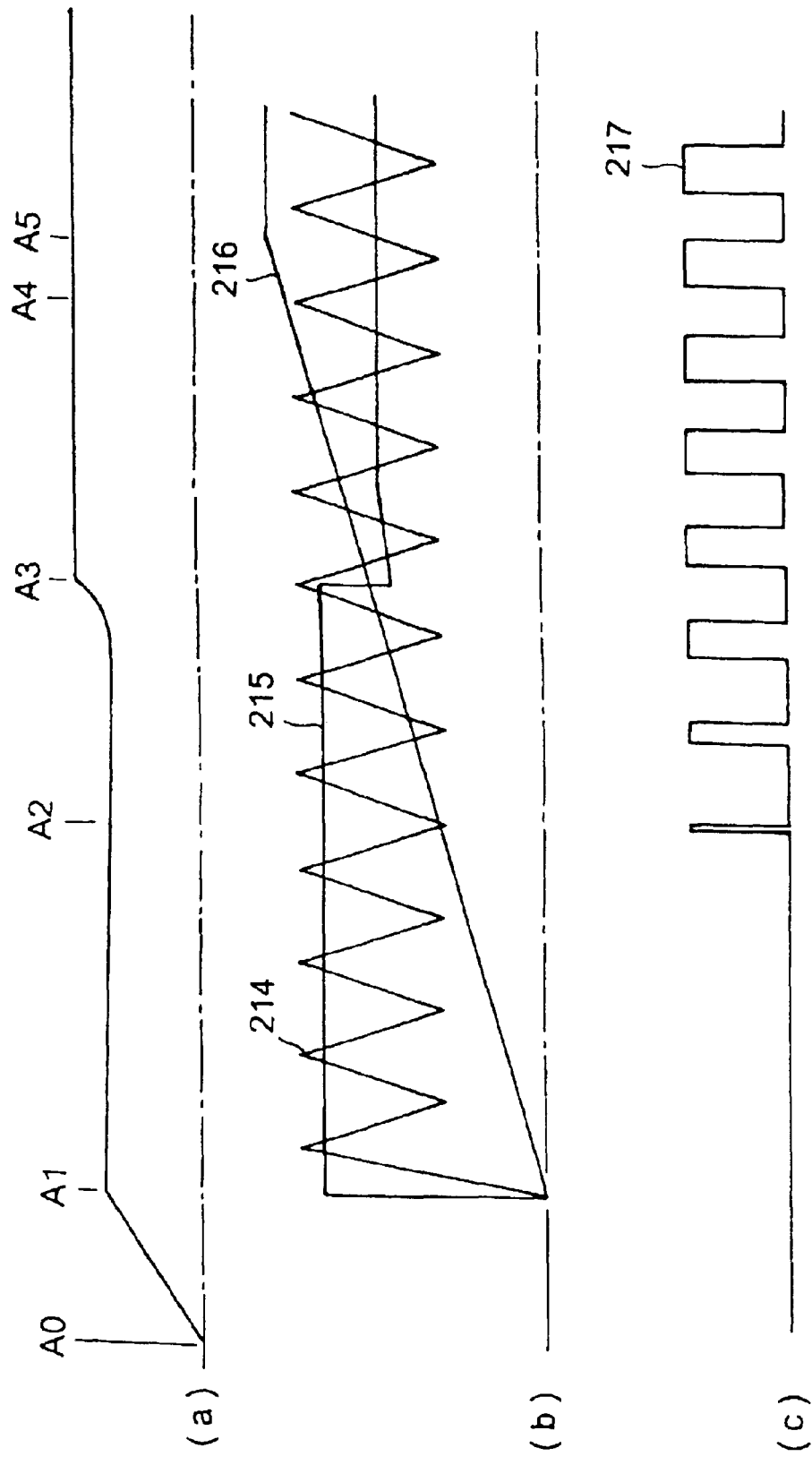
FIG. 17 is a signal waveform diagram illustrating the start-up operation of the switching power supply apparatuses shown in FIGS. 16 and 19.

When, at a time point A0 shown at (a) in FIG. 17, a direct-current voltage is applied between the positive and negative power supply lines 1 and 2, the voltage 213 across the capacitor 46 increases gradually owing to the charge current supplied thereto through the start-up resistor 29. When, at a time point A1, the voltage 213 across the capacitor 46 reaches the predetermined operation starting voltage of the IC 38, i.e., FA5511, the voltage on the internal supply line 104 within the IC 38 rises, and thus the OSC 106, PWM logic circuit 105, and output buffer 101 starts to operate.

Thus, the OSC 106 feeds the PWM logic circuit 105 with an oscillation signal 214 having constant upper and lower limits and a constant period, and accordingly the voltage 216 at the CS terminal T8 of the IC 38 increases gradually.

Moreover, at the time point A1, as described above, the start-up switch 81 is off, and therefore the signal level checker circuit 15 is not supplied with operating current. Thus, the output current of the signal level checker circuit 15 is zero. Moreover, the switch of the start-up corrector circuit 82 is off, and thus the voltage 215 at the FB terminal T2 of the IC 38 is equal to the division voltage resulting from voltage division by the diode 107 (see FIG. 6) provided within the IC 38, the resistor 108 (see FIG. 6), and the resistor 39a (see FIG. 16). Here, the resistance of the resistor 39a is so set that this division voltage has roughly the same level as the upper-limit voltage level of the oscillation signal 214 of the OSC 106.

As described earlier, when whichever of the voltage 216 at the CS terminal T8 of the IC 38 and the voltage 215 at the FB terminal T2 is lower is higher than the voltage level of the oscillation signal 214 of the OSC 106, the PWM logic circuit 105 outputs a high-level voltage via the output terminal T5.

Accordingly, as shown at (c) in FIG. 17, during the period from the time point A0 to a time point A2, during which the level of the voltage 216 at the CS terminal T8 of the IC 38 is lower than the voltage level of the oscillation signal 214 of the OSC 106, the voltage 217 at the output terminal T5 of the IC 38 remains low. At the time point A2, when the voltage level of the voltage 216 at the CS terminal T8 momentarily exceeds the voltage level of the oscillation signal 214 of the OSC 106, the voltage 217 at the output terminal T5 becomes high and then remains high for the corresponding period, turning the main switching device 5 on.

When the main switching device 5 is turned on in this way, the voltage between the output lines 25 and 26 slightly increases, and, during the period up to a time point A3, as the voltage 216 at the CS terminal T8 of the IC 38 increases, the duty of the drive signal 217 output via the output terminal T5 of the IC 38 continues to increase. This causes the output voltage of the switching power supply apparatus to increase quickly.

When, at a time point A3, the output voltage of the switching power supply apparatus reaches close to the predetermined target voltage, (i.e., when the voltage resulting from voltage division of the output voltage by the resistors 23 and 24 reaches a level roughly equal to the comparison reference voltage within the shunt regulator 22), a current flows through the shunt regulator 22 and the photodiode 20a, and thus the voltage at the node between the phototransistor 20b and the diode 80 increases. On detecting the increase in this voltage, the start-up switcher circuit 81 turns its internal switch on to permit a current to flow through the signal level checker circuit 15 and the resistor 34. This causes the relevant circuits to start to operate.

On the other hand, the charge voltage of the capacitor 46, owing to the current supplied thereto from the subsidiary coil 32 of the transformer 3 through the diode 31, starts to increase immediately before the time point A3 at which the output voltage of the switching power supply apparatus reaches the predetermined target voltage. At the time point A3, the charge voltage of the capacitor 46 has reached the value determined by the predetermined target output voltage of the switching power supply apparatus and the winding ratio between the subsidiary coil 32 and secondary coil 6 of the transformer 3. Thus, the current flowing through the signal level checker circuit 15 and the resistor 34 prevents the operating voltage of the IC 38 from falling below the permitted minimum operating voltage and thereby prevents its malfunctioning.

At the time point A3, the start-up corrector circuit 82 turns its internal switch on as does the start-up switcher circuit 81, and thus the resistor 39b is connected in parallel with the resistor 39a. Now, as will be described later, the voltage 215 at the FB terminal T2 of the IC 38 starts to perform steady-state operation. It should be noted that FIG. 17 illustrates an example in which the switching power supply apparatus starts up in a heavy-load state, including what is shown in FIG. 8 described earlier.

When the current value through the phototransistor 20b is lower than a predetermined value set within the signal level checker circuit 15, the signal level checker circuit 15 supplies a current to the FB terminal T2; by contrast, when the current value through the phototransistor 20b is higher than the predetermined value set within the signal level checker circuit 15, the signal level checker circuit 15 feeds a current to the CS terminal controller circuit 37 to turn the internal switch of the CS terminal controller circuit 37 on, and stops the supply of operating power to the principal circuit portions of the IC 38, namely the OSC 106, PWM logic circuit 105, FB terminal T2, and output buffer 101.

Incidentally, the signal level checker circuit 15 does not supply a current simultaneously to the FB terminal T2 and the CS terminal controller circuit 37.

Moreover, while the signal level checker circuit 15 is supplying a current to the FB terminal T2 of the IC 38, the signal level checker circuit 15 so functions as to decrease the supply current when the current value through the phototransistor 20b increases and increase the supply current when the current value through the phototransistor 20b decreases. This function permits the output voltage of the switching power supply apparatus to be stabilized at the predetermined target value.

Incidentally, the start-up corrector circuit 82 switches the resistance between the FB terminal T2 and the negative power supply line 2 between when the switching power supply apparatus is starting up and when it is operating in the steady state. This ensures that the switching power supply apparatus operates reliably.

Specifically, when the switching power supply apparatus starts to start up, the signal level checker circuit 15 is not operating, and thus no current is supplied from the signal level checker circuit 15. Therefore, the resistor 39a is given a high resistance so that the voltage resulting from voltage division by the diode 107 provided within the IC 38, i.e., FA5511, the resistor 108 (see FIG. 6), and the resistor 39a (see FIG. 16) is close to the upper limit of the oscillation signal 214 of the OSC 106. If this is not the case, even after the voltage level 216 at the CS terminal T8 of the IC 38 increases, the voltage level 215 at the FB terminal T2 remains lower than the lower limit of the oscillation signal of the OSC 106, and thus the PWM logic circuit 105 (see FIG. 6) does not output a high-level signal via the output terminal T5. This makes it impossible for the output voltage of the switching power supply apparatus to rise.

On the other hand, in steady-state operation, if the resistance between the FB terminal T2 and the negative power supply line 2 is kept high, for example, when the output voltage of the switching power supply apparatus increases as a result of the switching power supply apparatus operating in a no-load state, as the output voltage is stabilized in the manner described earlier, even when the signal level checker circuit 15 stops the supply current, the voltage at the FB terminal T2 does not fall below the lower-limit voltage of the oscillation signal 214 of the OSC 106 owing to the current supplied from the output line 104 of the 5 V voltage regulator 103 (see FIG. 6) through the diode 107 and the resistor 108. Quite inconveniently, this makes it impossible to decrease the output voltage of the switching power supply apparatus.

To overcome this inconvenience, when the switching power supply apparatus starts up, at the time point A3, the start-up corrector circuit 82 reduces the resistance between the FB terminal T2 and the negative power supply line 2. After the time point A3, the internal switches of the start-up switcher circuit 81 and the start-up corrector circuit 82 are kept on, and thus, in light-load operation, the switching power supply apparatus performs burst switching operation on the same principle as described in connection with the embodiment shown in FIG. 4. This helps reduce power loss in light-load operation.

The switching power supply apparatus of this embodiment shown in FIG. 16 permits omission of the capacitor 33 and the diode 30 used in the switching power supply apparatus shown in FIG. 4, but instead requires addition of the start-up switcher circuit 81. While in this embodiment the start-up switcher circuit 81 can easily be incorporated in an IC, the capacitor 33 cannot be incorporated in an IC. Thus, this embodiment is suitable to produce a new IC incorporating FA5511 or an equivalent IC along with a CS terminal controller circuit, signal level checker circuit, start-up switcher circuit, start-up corrector circuit, and other attendant circuits.

This embodiment is more susceptible than the embodiment shown in FIG. 4 to the effects of temperature-related drift of the forward voltage of the diode 80, resulting in the disadvantage of a small degree of temperature-related drift of the load current target value at which switching between burst switching and continuous switching is performed. Therefore, it is advisable to adopt the embodiment shown in FIG. 4 in applications where the effects of temperature-related drift needs to be strictly eliminated, and adopt the circuit of this embodiment in applications where no such strict requirement needs to be met.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the principal circuit portions of the IC 38, namely the OSC 106, PWM logic circuit 105, FB terminal T2, and output buffer 101, is also stopped. This helps reduce the power loss suffered while the switching operation is being stopped, and thus helps reduce the power consumption of the apparatus as a whole.

Moreover, the start-up corrector circuit 35 so operates that the second resistor 39b is connected in parallel with the first resistor 39a to reduce the resistance between the FB terminal T2 of the IC 38 and the negative power supply line 2. This considerably lowers the potential at the FB terminal T2, and thus the IC 38 can make the main switching device 5 perform switching operation quickly. This helps reduce start-up time.

Moreover, through the operation of the start-up switcher circuit 81, when the switching power supply apparatus starts to start up, the start-up current supplied through the start-up resistor 29 is prevented from flowing through the signal level checker circuit 15 and thereby lengthening the time required for the charge voltage of the capacitor 46 to reach the operation starting voltage of the IC 38, i.e., FA5111.

Thirteenth Embodiment

Figure 18:
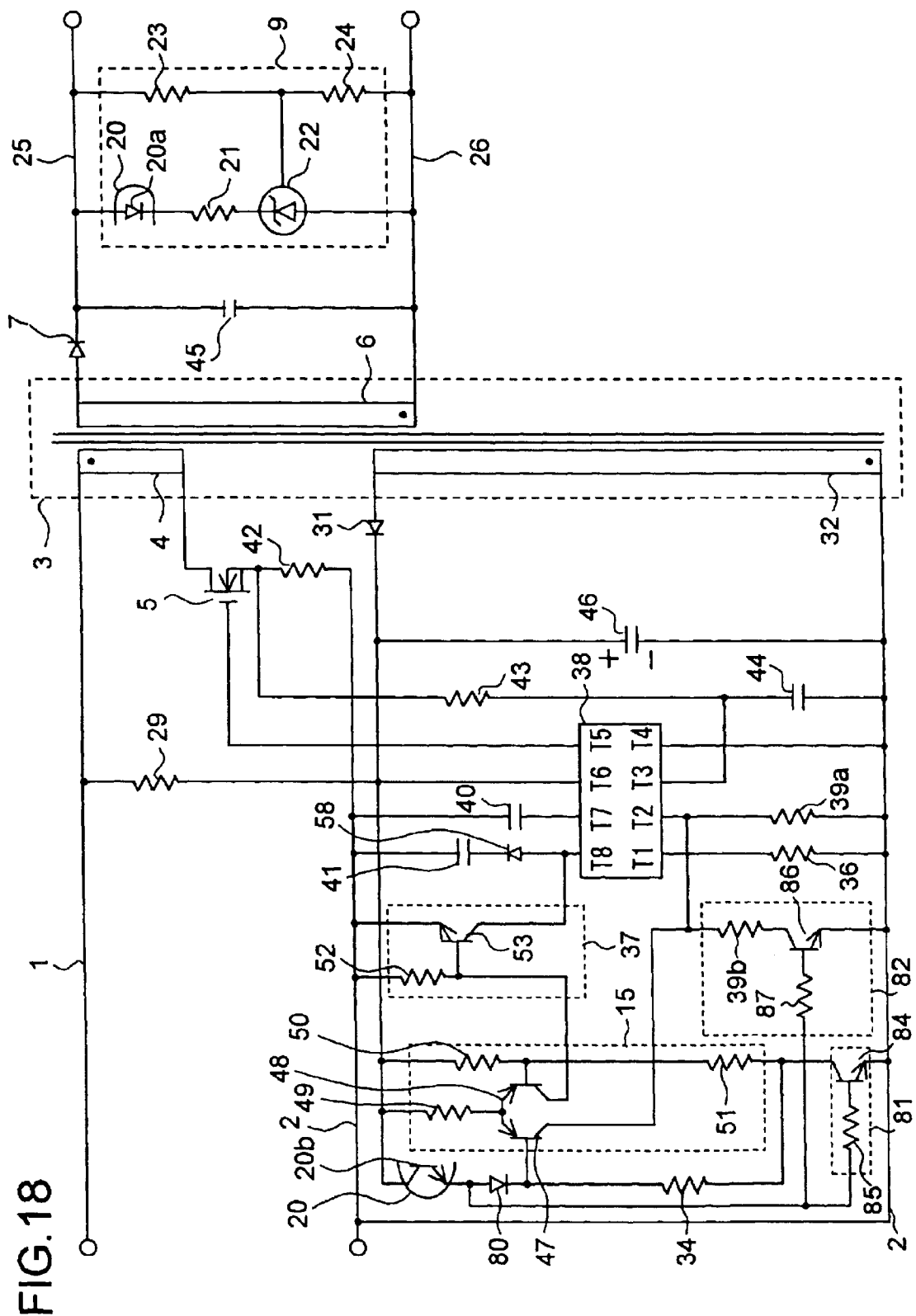
FIG. 18 is a circuit diagram of the switching power supply apparatus of a thirteenth embodiment of the invention.

FIG. 18 is a circuit diagram of the switching power supply apparatus of a thirteenth embodiment of the invention. In FIG. 18, such circuit components that find their counterparts in FIGS. 9 and 16 are identified with the same reference numerals, and their explanations will not be repeated.

In FIG. 18, the signal level checker circuit 15 is composed of resistors 49, 50, and 51 and transistors 47 and 48 The CS terminal controller circuit 37 is composed of a resistor 52 and a transistor 53. The start-up switcher circuit 81 is composed of a resistor 85 and a transistor 84. The start-up corrector circuit 82 is composed of resistors 87 and 39b and a transistor 86.

As shown in FIG. 17 described earlier, when the switching power supply apparatus starts to start up, at the time point A3, a current starts to flow through the phototransistor 20b, and the voltage at the node between the emitter of the phototransistor 20b and the diode 80 increases. This voltage is fed through the resistor 85 to the base of the transistor 84 and through the resistor 87 to the base of the transistor 86, and thus the transistors 84 and 86 turn on. As the result of the transistor 84 turning on, a current flows through the resistor 34 and through the serial circuit composed of the resistors 50 and 51, and a base current starts to flow through the transistor 47. Thus, the signal level checker circuit 15 starts to operate.

As described earlier, during the period up to the time point A3, no current flows through the signal level checker circuit 15. This prevents the lengthening of the time required for the charge voltage of the capacitor 46 to reach the operation starting voltage of the IC 38, i.e., FA5511.

Moreover, as the result of the transistor 86 turning on, the resistor 39b is added between the FB terminal T2 of the IC 38 and the negative power supply line 2. This ensures that the switching power supply apparatus performs reliable output voltage stabilizing control when operating in the steady state.

Incidentally, during the period up to the time point A3, the diode 80 prevents the base currents of the transistors 47, 84, and 86 from flowing along the route from the positive terminal of the capacitor 46 to the resistor 49, to the emitter of the transistor 47, to the base of the transistor 47, to the resistor 85, to the base of the transistor 84, to the emitter of the transistor 84, to the negative power supply line 2, and to the negative terminal of the capacitor 46 or along the route from the positive terminal of the capacitor 46 to the resistor 49, to the emitter of the transistor 47, to the base of the transistor 47, to the resistor 87, to the base of the transistor 86, to the emitter of the transistor 86, to the negative power supply line 2, and to the negative terminal of the capacitor 46. Thus, that this period, the diode 80 prevents the transistors 47, 84, and 86 from being turned on, and thereby prevents the signal level checker circuit 15 from operating and the resistor 39b from being connected between the FB terminal T2 of the IC 38 and the negative power supply line 2.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the principal circuit portions of the IC 38, namely the OSC 106, PWM logic circuit 105, FB terminal T2, and output buffer 101, is also stopped. This helps reduce the power loss suffered while the switching operation is being stopped, and thus helps reduce the power consumption of the apparatus as a whole.

Moreover, the start-up corrector circuit 82 so operates that, when the switching power supply apparatus shifts from start-up operation to steady-state operation, the second resistor 39b is connected in parallel with the first resistor 39a to reduce the resistance between the FB terminal T2 of the IC 38 and the negative power supply line 2. This lowers the potential at the FB terminal T2, and thereby ensures that the switching power supply apparatus performs reliable output voltage stabilizing control when operating in the steady state.

Moreover, through the operation of the start-up switcher circuit 81, when the switching power supply apparatus starts to start up, the start-up current supplied through the start-up resistor 29 is prevented from flowing through the signal level checker circuit 15 and thereby lengthening the time required for the charge voltage of the capacitor 46 to reach the operation starting voltage of the IC 38, i.e., FA5111.

Moreover, the signal level checker circuit 15, start-up switcher circuit 81, start-up corrector circuit 82, and CS terminal controller circuit 37 can be realized with a simple circuit configuration, and the switching controller circuit can be realized with an IC 38, i.e., FA5511. This helps reduce the space of the circuit board, and thereby reduce the size and cost of the switching power supply apparatus.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation.

Fourteenth Embodiment

FIG. 19 is a circuit diagram of the switching power supply apparatus of a fourteenth embodiment of the invention. In FIG. 19, such circuit components that find their counterparts in FIG. 16 are identified with the same reference numerals, and their explanations will not be repeated.

The switching power supply apparatus shown in FIG. 19 differs from that shown in FIG. 16 in that the start-up switcher circuit 81 shown in FIG. 16 is omitted and instead the feedback line 83 of the current consumed by the signal level checker circuit 15 is connected to the start-up corrector circuit 82. The voltage waveforms observed at relevant points in the switching power supply apparatus during the period from the start of its start-up until a shift to steady-state operation are the same as in the switching power supply apparatus shown in FIG. 16, and therefore the following description deals only with differences in operation.

In FIG. 17, when, at the time point A3, the internal switch of the start-up corrector circuit 82 turns on, the operating current of the signal level checker circuit 15 and the current though the resistor 34 flow through the internal switch of the start-up corrector circuit 82, and thus the signal level checker circuit 15 starts to operate. Moreover, as the result of the internal switch of the start-up corrector circuit 82 tuning on as described above, the resistor 39b is connected between the FB terminal T2 of the IC 38 and the negative power supply line 2.

During the period from the time point A0 to the time point A3, a diode 88 prevents a current from flowing along the route from the positive terminal of the capacitor 46 to the operating current supply line 89 of the signal level checker circuit 15, to the signal level checker circuit 15, to the resistor 34, to the resistor 39b, to the resistor 39a, to the negative power supply line 2, and to the capacitor 46. Thus, during that period, the diode 88 prevents the signal level checker circuit 15 from operating.

The switching power supply apparatus of this embodiment has a simpler circuit configuration than the switching power supply apparatus of the embodiment shown in FIG. 16. However, disadvantageously, the switching power supply apparatus of this embodiment is susceptible to the temperature-related drift of the forward voltage drop across the diode 88, and in addition the load current target value at which switching between burst switching and continuous switching is performed increases the temperature-related drift. Thus, this configuration is suitable in applications where the effects of temperature-drift can be ignored.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the IC 38 is also stopped. This helps reduce the power loss suffered while the switching operation is being stopped, and thus helps reduce the power consumption of the apparatus as a whole.

Moreover, the start-up corrector circuit 82 so operates that, when the switching power supply apparatus shifts from start-up operation to steady-state operation, the second resistor 39b is connected in parallel with the first resistor 39a to reduce the resistance between the FB terminal T2 of the IC 38 and the negative power supply line 2. This lowers the potential at the FB terminal T2, and thereby ensures that the switching power supply apparatus performs reliable output voltage stabilizing control when operating in the steady state.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation.

Fifteenth Embodiment

Figure 20:
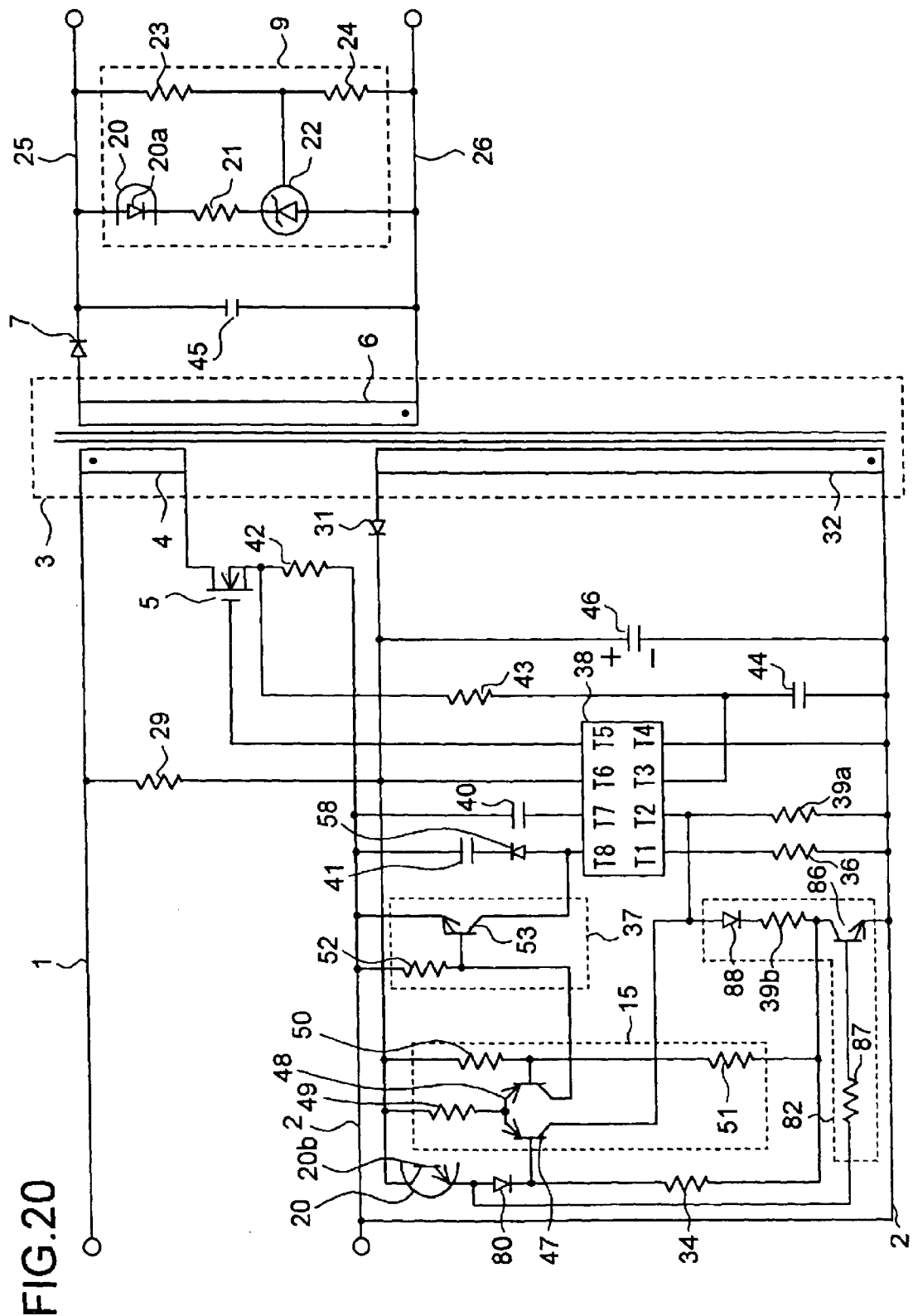
FIG. 20 is a circuit diagram of the switching power supply apparatus of a fifteenth embodiment of the invention.

FIG. 20 is a circuit diagram of the switching power supply apparatus of a fifteenth embodiment of the invention. In FIG. 20, such circuit components that find their counterparts in FIG. 18 are identified with the same reference numerals, and their explanations will not be repeated.

As shown in FIG. 7, at the start of the start-up of the switching power supply apparatus, when, at the time point A3, a current starts to flow through the phototransistor 20b, and the voltage at the node between the emitter of the phototransistor 20b and the diode 80 increases, this voltage, through the base resistor 87, turns the transistor 86 on. As the result of the transistor 86 turning on, a current flows through the resistor 34 and through the serial circuit composed of the resistors 50 and 51. This causes a base current to flow through the transistor 47, and thus the signal level checker circuit 15 starts to operate.

During the period up to the time point A3, no current flow through the signal level checker circuit 15., This prevents the lengthening of the time required for the charge voltage of the capacitor 46 to reach the operation starting voltage of the IC 38, i.e., FA5511. Moreover, as the result of the transistor 86 turning on, the serial circuit composed of the diode 88 and the resistor 39b is added between the FB terminal T2 of the IC 38 and the negative power supply line 2. This ensures that the switching power supply apparatus performs reliable output voltage stabilizing control when operating in the steady state.

Incidentally, during the period up to the time point A3, the diode 80 prevents the base currents of the transistors 47 and 86 from flowing along the route from the positive terminal of the capacitor 46 to the resistor 49, to the emitter of the transistor 47, to the base of the transistor 47, to the resistor 87, to the base of the transistor 86, to the emitter of the transistor 86, to the negative power supply line 2, and to the negative terminal of the capacitor 46. Thus, during that period, the diode 80 prevents the transistors 47 and 86 from being turned on, and thereby prevents the signal level checker circuit 15 from operating and the resistor 39b from being connected through the diode 88 between the FB terminal T2 of the IC 38 and the negative power supply line 2.

On the other hand, during the period from the time point A0 to the time point A3, the diode 88 prevents a current from flowing along the path from the positive terminal of the capacitor 46 to the resistor 49, to the emitter of the transistor 47, to the base of the transistor 47, to the resistor 34, to the resistor 39b, to the resistor 39a, and to the negative terminal of the capacitor 46. Thus, during that period, the diode 88 prevents the signal level checker circuit 15 from operating.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the principal circuit portions of the IC 38, namely the OSC 106, PWM logic circuit 105, FB terminal T2, and output buffer 101, is also stopped. This helps reduce the power loss suffered while the switching operation is being stopped, and thus helps reduce the power consumption of the apparatus as a whole.

Moreover, the start-up corrector circuit 82 so operates that, when the switching power supply apparatus shifts from start-up operation to steady-state operation, the second resistor 39b is connected in parallel with the first resistor 39a to reduce the resistance between the FB terminal T2 of the IC 38 and the negative power supply line 2. This lowers the potential at the FB terminal T2, and thereby ensures that the switching power supply apparatus performs reliable output voltage stabilizing control when operating in the steady state.

Moreover, the signal level checker circuit 15, start-up corrector circuit 82, and CS terminal controller circuit 37 can be realized with a simple circuit configuration, and the switching controller circuit can be realized with an IC 38, i.e., FA5511. This helps reduce the space of the circuit board, and thereby reduce the size and cost of the switching power supply apparatus.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation.

Sixteenth Embodiment

Figure 21:
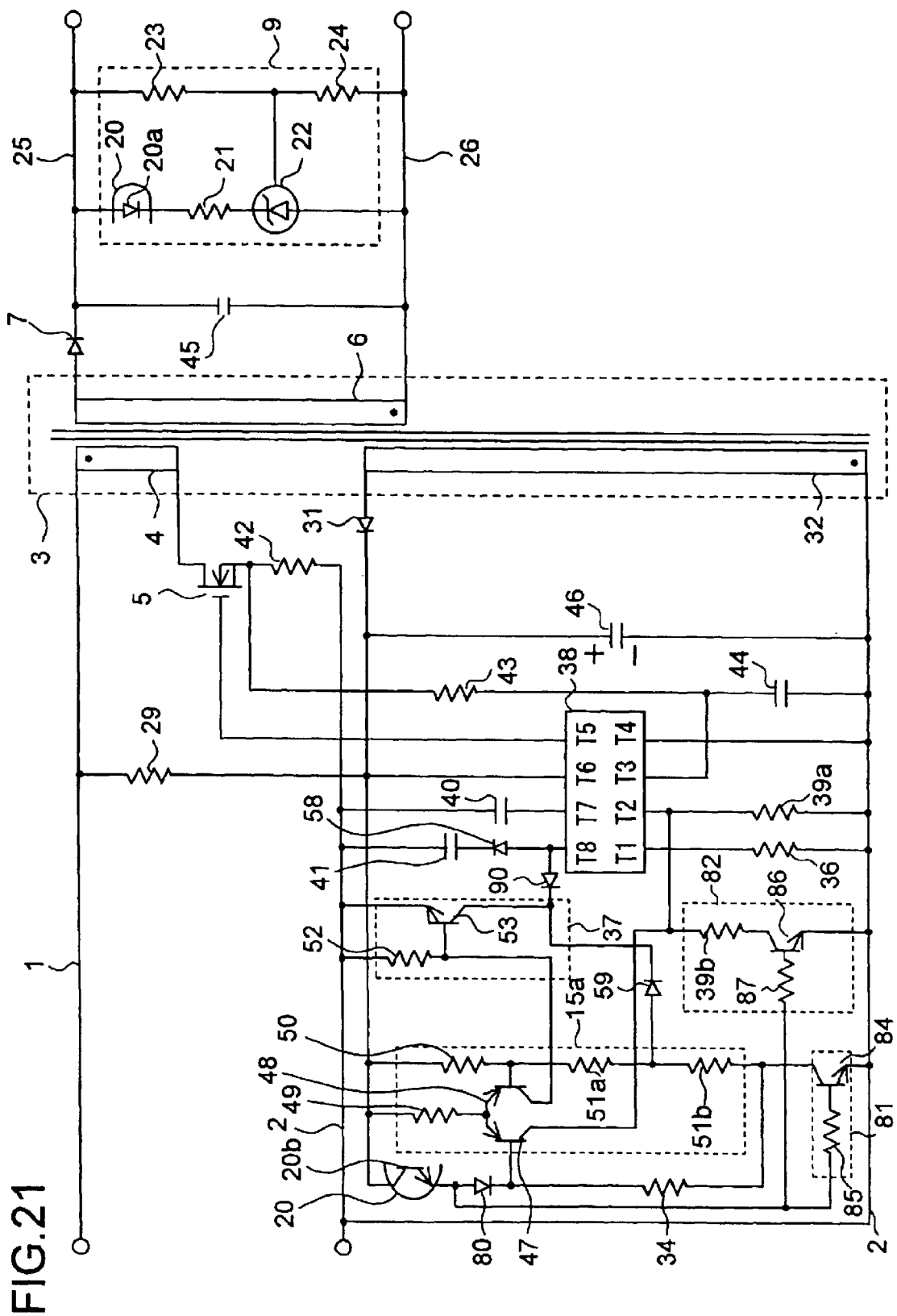
FIG. 21 is a circuit diagram of the switching power supply apparatus of a sixteenth embodiment of the invention.

FIG. 21 is a circuit diagram of the switching power supply apparatus of a sixteenth embodiment of the invention. In FIG. 21, such circuit components that find their counterparts in FIGS. 10, 16, 18, and 19 are identified with the same reference numerals, and their explanations will not be repeated.

In the switching power supply apparatuses shown in FIGS. 16, 18, 19, and 20, in burst switching operation, the period in which switching operation is stopped and the period in which switching operation is performed depend, as described earlier, on the delays in the control performed by the output voltage control system. By contrast, in the switching power supply apparatus of this embodiment shown in FIG. 21, like the switching power supply apparatus shown in FIG. 10, the comparison reference voltage provided within the signal level checker circuit 15a is varied between in the period in which switching operation is stopped and in the period in which switching operation is performed so that, according to how the width of this variation is set, the period in which switching operation is stopped and the period in which switching operation is performed can be extended and adjusted.

Specifically, in this embodiment, to obtain power corresponding to the comparison reference power described earlier in connection with FIGS. 18 and 20, in the voltage division circuit composed of the serially connected resistors 50 and 51, the lower-potential-side resistor 51 is divided into resistors 51a and 51b. The node between the resistors 51a and 51b is connected through a diode 59 to the collector of the transistor 53 provided in the CS terminal controller circuit 37, and the collector of the transistor 53 is connected through a diode 90 to the CS terminal T8 of the IC 38.

If the diode 90 is not provided (i.e., if the collector of the transistor 53 and the cathode of the diode 59 are connected directly to the CS terminal T8 of the IC 38 without the diode 90 connected in between), when the switching power supply apparatus starts to start up, during the period in which the internal switches of the start-up switcher circuit 81 and the start-up corrector circuit 82 are off, a high-level voltage is applied from the positive terminal of the capacitor 46 through the resistors 50 and 5 la and the diode 59 to the CS terminal T8 of the IC 38. This turns off the output of the IC 38 via its output terminal T5, and thus makes it impossible for the switching power supply apparatus to start up. This problem is overcome by the provision of the diode 90.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the principal circuit portions of the IC 38, namely the OSC 106, PWM logic circuit 105, FB terminal T2, and output buffer 101, is also stopped. This helps reduce the power loss suffered while the switching operation is being stopped, and thus helps reduce the power consumption of the apparatus as a whole.

Moreover, the start-up corrector circuit 82 so operates that, when the switching power supply apparatus shifts from start-up operation to steady-state operation, the second resistor 39b is connected in parallel with the first resistor 39a to reduce the resistance between the FB terminal T2 of the IC 38 and the negative power supply line 2. This lowers the potential at the FB terminal T2, and thereby ensures that the switching power supply apparatus performs reliable output voltage stabilizing control when operating in the steady state.

Moreover, through the operation of the start-up switcher circuit 81, when the switching power supply apparatus starts to start up, the start-up current supplied through the start-up resistor 29 is prevented from flowing through the signal level checker circuit 1 Sa and thereby lengthening the time required for the charge voltage of the capacitor 46 to reach the operation starting voltage of the IC 38, i.e., FA5111.

Moreover, the signal level checker circuit 15a, start-up switcher circuit 81, start-up corrector circuit 82, and CS terminal controller circuit 37 can be realized with a simple circuit configuration, and the switching controller circuit can be realized with an IC 38, i.e., FA5511. This helps reduce the space of the circuit board, and thereby reduce the size and cost of the switching power supply apparatus.

Moreover, the switching controller circuit (IC 38) is separate from the main switching device 5, and therefore, as compared with a case where the main switching device is formed integrally in a single package (on a single wafer) along with the switching controller circuit and other components, it is possible to adopt a main switching device having a low on-state resistance. This helps prevent degradation of power conversion efficiency in heavy-load operation.

Seventeenth Embodiment

Figure 22:
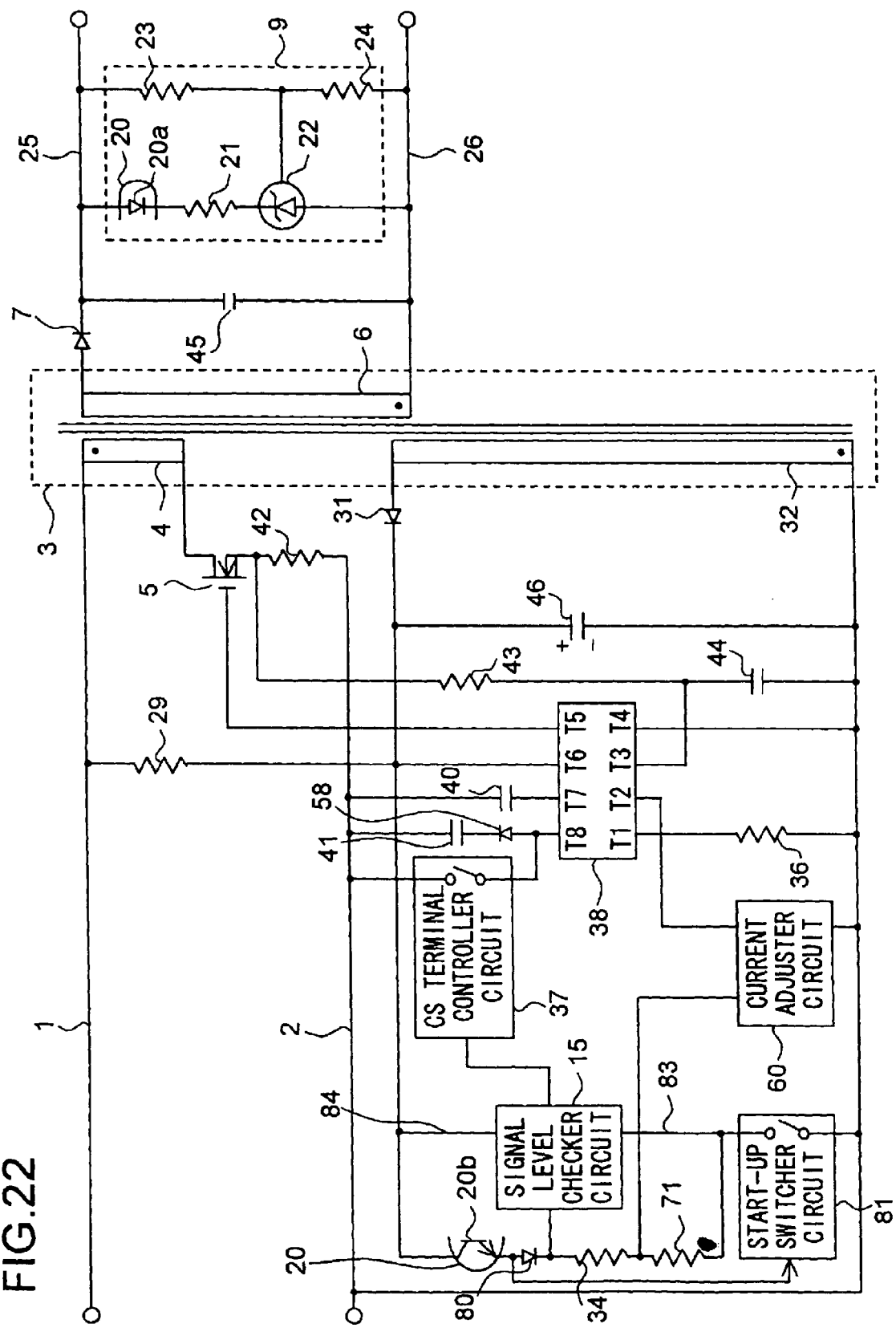
FIG. 22 is a circuit diagram of the switching power supply apparatus of a seventeenth embodiment of the invention.

FIG. 22 is a circuit diagram of the switching power supply apparatus of a seventeenth embodiment of the invention. In FIG. 22, such circuit components that find their counterparts in FIGS. 11 and 16 are identified with the same reference numerals, and their explanations will not be repeated. The switching power supply apparatus of this embodiment shown in FIG. 22 omits the start-up corrector circuit 82 shown in FIG. 16, and is instead additionally provided with a current adjuster circuit 60 shown in FIG. 11.

In the switching power supply apparatus of this embodiment shown in FIG. 22, a feedback signal is fed from the phototransistor 20b through the diode 80, the resistor 34, and the current adjuster circuit 60 to the FB terminal T2 of the IC 38. The current adjuster circuit 60 absorbs from the FB terminal T2 of the IC 38 a current proportional to the voltage at the node between the diode 80 and the resistor 34.

Accordingly, when the output voltage of the switching power supply apparatus is, for example, higher than a predetermined value, the output voltage detector circuit 9 increases the voltage at the node between the diode 80 and the resistor 34, and the current adjuster circuit 60 increases, in a manner corresponding to the increase in that voltage, the current that it absorbs from the FB terminal T2 of the IC 38. This causes the voltage at the FB terminal T2 to decrease.

As this voltage decreases, the PWM logic circuit 105 (see FIG. 6) provided within the IC 38 feeds, via the output terminal T5 of the IC 38, the main switching device 5 with a drive signal of which the high-level period is short. This causes the current supplied from the secondary coil 6 of the transformer 3 through the diode 7 to decrease, and thus the output voltage is so controlled as to decrease.

On the other hand, when the output voltage of the switching power supply apparatus is, for example, lower than the predetermined value, the output voltage detector circuit 9 decreases the voltage at the node between the diode 80 and the resistor 34, and the current adjuster circuit 60 decreases, in a manner corresponding to the decrease in that voltage, the current that it absorbs from the FB terminal T2 of the IC 38. This causes the voltage at the FB terminal T2 to increase.

As this voltage increases, the PWM logic circuit 105 (see FIG. 6) provided within the IC 38 feeds, via the output terminal T5 of the IC 38, the main switching device 5 with a drive signal of which the high-level period is long. This causes the current supplied from the secondary coil 6 of the transformer 3 through the diode 7 to increase, and thus the output voltage is so controlled as to increase.

When the switching power supply apparatus starts to start up, as described earlier, the start-up current that is supplied through the start-up resistor 29 flows through the signal level checker circuit 15, and this lengthens the time required for the charge voltage of the capacitor 46 to reach the operation starting voltage of the IC 38, i.e., FA5511. To prevent this, here, a start-up switcher circuit 81 is additionally provided.

The output current (feedback signal) of the phototransistor 20b is fed through a diode 80 to the signal level checker circuit 15, and the start-up switcher circuit 81 checks whether the feedback signal is present or not by monitoring the voltage at the node between the phototransistor 20b and the diode 80.

The current consumed by the signal level checker circuit 15 (the current consumed including that consumed by the comparison reference power) is fed thereto from the positive terminal of the capacitor 46 by way of a line 84, and is returned by way of a line 83 through the switch provided within the start-up switcher circuit 81 to the negative terminal of the capacitor 46. On the other hand, the current through the phototransistor 20b is fed thereto from the positive terminal of the capacitor 46, and is returned through the diode 80, the current-detection resistor 34, and the switch provided within the start-up switcher circuit 81 to the negative terminal of the capacitor 46.

When the switching power supply apparatus starts to start up, the internal switch of the start-up switcher circuit 81 is off, and the output voltage of the switching power supply apparatus is lower than a predetermined target voltage. Thus, no current is consumed by the signal level checker circuit 15 (including the comparison reference power provided therein) or the phototransistor 20b. Accordingly, the charge voltage of the capacitor 46, owing to the start-up current fed thereto through the start-up resistor 29, quickly rises and reaches the operation start voltage level of the IC 38, i.e., FA5511.

In the switching power supply apparatus of this embodiment, the signal level checker circuit 15 achieves burst switching control by repeatedly turning on and off the CS terminal controller circuit 37 provided in the line by way of which the IC 38, which serves as the switching controller, is supplied with operating power. Moreover, in burst switching control, while the switching operation of the main switching device 5 is being stopped, the supply of operating power to the principal circuit portions of the IC 38, namely the OSC 106, PWM logic circuit 105, FB terminal T2, and output buffer 101, is also stopped. This helps reduce the power loss suffered while the switching operation is being stopped, and thus helps reduce the power consumption of the apparatus as a whole.

Moreover, when the switching power supply apparatus starts up, the current adjuster circuit 60 so operates as to adjust the current at the FB terminal T2 of the IC 38. Thus, the PWM control IC makes the main switching device perform switching operation with a great on-state duty. This helps reduce start-up time.

Moreover, through the operation of the start-up switcher circuit 81, when the switching power supply apparatus starts to start up, the start-up current supplied through the start-up resistor 29 is prevented from flowing through the signal level checker circuit 15 and thereby lengthening the time required for the charge voltage of the capacitor 46 to reach the operation starting voltage of the IC 38, i.e., FA5111.

In the embodiments described hereinbefore, FA5511 manufactured by Fuji Electric Co., Ltd. is used as the switching controller. However, it is also possible to use any other IC having equivalent functions to realize similar circuit configurations.

In the switching power supply apparatus disclosed in Japanese Patent Application Laid-Open No. H10-304658 mentioned as prior art, the start-up circuit needs to adopt a control device resistant to a high voltage to shut off a voltage (at the drain of an FET serving as the main switching device) obtained by rectifying and smoothing commercially distributed alternating-current power. Disadvantageously, this increases the costs of this switching power supply apparatus. To overcome this disadvantage, the start-up circuit adopts a structure in which the main switching device is formed in a single package along with other components including the control device. However, with the current technology, it is impossible to form a main switching device with a low on-state resistance in a single package along with such other components. This leads to lower power conversion efficiency when the switching power supply apparatus is operating in a heavy-load state.

To solve this problem, in the switching power supply apparatuses of the embodiments described hereinbefore, the switching controller is separated from the main switching device. This makes it possible to use a main switching device having a low on-state resistance and thereby achieve high power conversion efficiency.

As described above, according to the present invention, a switching power supply apparatus uses as a feedback signal the result of comparison between the output direct-current voltage and a predetermined reference voltage, and drives the main switching device by turning on and off, according to the signal level of the feedback signal, the supply of operating power to a main switching device driving system that drives the main switching device. Thus, while the switching operation of the main switching device is being stopped in burst switching control, the supply of operating power to the main switching device driving system is also stopped. This helps reduce the power loss suffered while the switching operation is being stopped, and thus helps reduce the power consumption of the apparatus as a whole.

According to the present invention, a switching power supply apparatus includes: an output voltage detector that compares the output direct-current voltage with a predetermined reference voltage and that outputs the result of the comparison as a feedback signal; a switching controller that drives and controls the main switching device according to the feedback signal output from the output voltage detector; a signal level checker that monitors the signal level of the feedback signal and that outputs an operation control signal for turning on and off the switching controller according to the monitored signal level; and an operation/nonoperation switcher that is provided in the line by way of which the switching controller is supplied with operating power and that turns on and off the switching controller according to the operation control signal from the signal level checker. Thus, burst switching control is achieved as a result of the signal level checker repeatedly turning on and off the operation/nonoperation switcher provided in the line by way of which the switching controller is supplied with operating power. Moreover, while the switching operation of the main switching device is being stopped in burst switching control, the supply of the operating power to the switching controller is also stopped. This helps reduce the power loss suffered while the switching operation is being stopped, and thus helps reduce the power consumption of the apparatus as a whole.

According to the present invention, in a switching power supply apparatus, the signal level of the feedback signal is compared with the signal level of a previously generated oscillation signal, so that, according to the result of the comparison, the on-state duty of the drive signal to be fed to the main switching device is determined and switching between burst switching control and continuous switching control is performed. Moreover, while the switching operation of the main switching device is being stopped in burst switching control, supply of the operating power for driving the main switching device is stopped. Thus, switching between burst switching and continuous switching can be performed with high accuracy. Moreover, while the switching operation of the main switching device is being stopped in burst switching control, the supply of the operating power for driving the main switching device is also stopped. This helps reduce the power loss suffered while the switching operation is being stopped, and thus helps reduce the power consumption of the apparatus as a whole.

GLOSSARY OF TERMS AND ACRONYMS

PWM: Pulse-width Modulation
IC: Integrated Circuit
CS: Capacitor for Soft Starting
FB: Feedback

What is claimed is:

1. A switching power supply apparatus having a serial circuit, including a primary coil of a transformer and a main switching device, connected between a positive and a negative power supply line connected to a direct-current power source, the switching power supply apparatus outputting a direct-current voltage obtained by rectifying with a rectifier a high-frequency voltage induced in a secondary coil of the transformer by the main switching device performing switching operation, wherein the switching power supply apparatus uses as a feedback signal a result of comparison between the direct-current voltage and a predetermined reference voltage, and drives the main switching device by turning on and off, according to a signal level of the feedback signal, supply of operating power to a main switching device driving system that drives the main switching device.

2. A switching power supply apparatus having a serial circuit, including a primary coil of a transformer and a main switching device, connected between a positive and a negative power supply line connected to a direct-current power source, the switching power supply apparatus outputting a direct-current voltage obtained by rectifying with a rectifier a high-frequency voltage induced in a secondary coil of the transformer by the main switching device performing switching operation, wherein the switching power supply apparatus further includes: an output voltage detector that compares the direct-current voltage obtained through rectification with a predetermined reference voltage and that outputs a result of the comparison as a feedback signal;

a switching controller that drives and controls the main switching device according to the feedback signal output from the output voltage detector;

a signal level checker that monitors a signal level of the feedback signal and that outputs an operation control signal for turning on and off the switching controller according to the monitored signal level; and an operation/nonoperation switcher that is provided in a line by way of which the switching controller is supplied with operating power and that turns on and off the switching controller according to the operation control signal from the signal level checker, the switching power supply apparatus outputting a desired voltage by driving the main switching device with a drive signal from the switching controller that is so turned on and off.

3. A switching power supply apparatus as claimed in claim 2, wherein the feedback signal from the output voltage detector is transmitted to the switching controller through a photodiode of a photocoupler, and the signal level checker monitors the signal level of the feedback signal by comparing a current level flowing through a phototransistor of the photocoupler with a reference current level.

4. A switching power supply apparatus as claimed in claim 3, wherein a current detection resistor is connected in series with the phototransistor of the photocoupler, and the signal level checker turns on and off the switching controller by feeding the switching controller with, as the operation control signal, a signal obtained by comparing a voltage drop across the current detection resistor with a voltage of a current level check reference power source.

5. A switching power supply apparatus as claimed in claim 3, wherein operating power of the signal level checker and the phototransistor of the photocoupler is supplied from subsidiary control power extracted from a node between a plurality of diodes constituting a serial circuit provided in a steady-operation current supply line by way of which a voltage induced in a subsidiary coil of the transformer is supplied after being rectified with the plurality of diodes.

6. A switching power supply apparatus as claimed in claim 2, wherein the operating power of the switching controller is supplied by way of a start-up current supply line by way of which a start-up current is supplied from the positive power supply line through a start-up resistor, or by way of a steady-operation current supply line by way of which a voltage induced in a subsidiary coil of the transformer is supplied after being rectified with a serial circuit composed of a plurality of diodes, and operating power of the signal level checker is supplied from subsidiary control power extracted from a node between the plurality of diodes.

7. A switching power supply apparatus as claimed in claim 2, wherein the switching controller is realized as a pulse-width modulation (PWM) control circuit that outputs, as the drive signal with which to drive the main switching device, a pulse signal that is pulse-widthmodulated according to a voltage level of the feedback signal from the output voltage detector.

8. A switching power supply apparatus as claimed in claim 7,
wherein used as the PWM control circuit is a PWM control integrated circuit (IC) that is realized as an integrated circuit chip having at least a feedback(FB) terminal to which a voltage related to the feedback signal is input and a capacitor for soft starting(CS) terminal to which a voltage for enabling or disabling an internal circuit is input.

9. A switching power supply apparatus as claimed in claim 2,
wherein, when the pulse-width modulation (PWM) control integrated circuit (IC) is used as the switching controller,
a start-up corrector is additionally provided to correct start-up of the PWM control IC;
a first resistor is connected between a feedback (FB) terminal of the PWM control IC and the negative power supply line;
the signal level checker feeds a capacitor for soft starting (CS) terminal controller, which serves as the operation/nonoperation switcher, and the FB terminal with the operation control signal and an inverted feedback signal, respectively, according to a result of checking of the signal level of the feedback signal;
the CS terminal controller connects and disconnects a CS terminal of the PWM control IC to and from the negative power supply line according to the operation control signal; and
the start-up corrector connects and disconnects, through a second resistor, the FB terminal to and from the negative power supply line according to a voltage level of the subsidiary control power.

10. A switching power supply apparatus as claimed in claim 9,
wherein the CS terminal controller includes an NPN-type transistor having a collector thereof connected to the CS terminal of the PWM control IC, having an emitter thereof connected to the negative power supply line, and having a base thereof connected to the collector of the other of the transistors included in the signal level checker.

11. A switching power supply apparatus as claimed in claim 9,
wherein the start-up corrector includes:
a serial circuit composed of a Zener diode and a plurality of resistors connected between a line of the subsidiary control power and the negative power supply line; and
an NPN-type transistor having a base thereof connected to a node between the resistors, having a collector thereof connected through the second resistor to the FB terminal of the PWM control IC, and having an emitter thereof connected to the negative supply power line.

12. A switching power supply apparatus as claimed in claim 9,
wherein the signal level checker includes, for generation of the reference voltage, voltage division resistors, of which a lower-potential-side resistor is divided into two resistors, with a node therebetween connected through a diode to the CS terminal of the PWM control IC.

13. A switching power supply apparatus as claimed in claim 9,
wherein the switching power supply apparatus further includes:

a capacitor connected between the CS terminal of the PWM control IC and the negative power supply line; and
a diode connected between the capacitor and the CS terminal.

14. A switching power supply apparatus as claimed in claim 2,
wherein the signal level checker includes a pair of transistors having emitters thereof connected together to form a comparator, with a base of one of the transistors connected to a node between the current detection resistor and the phototransistor, with a base of the other of the transistors connected to the current level check reference power source, with a collector of the one of the transistors connected to a feedback (FB) terminal of a pulse-width modulation (PWM) control integrated circuit (IC), and with a collector of the other of the transistors connected to a capacitor for soft starting (CS) terminal controller.

15. A switching power supply apparatus as claimed in claim 2,
wherein, when a pulse-width modulation (PWM) control integrated circuit (IC) is used as the switching controller, the switching power supply apparatus further includes:
a current adjuster connected between a feedback (FB) terminal of the PWM control IC and the negative power supply line to adjust a current output from the FB terminal according to the signal level of the feedback signal; and
a capacitor for soft starting (CS) terminal controller that serves as the operation/nonoperation switcher by connecting and disconnecting a CS terminal of the PWM control IC to and from the negative power supply line according to an output signal of the signal level checker.

16. A switching power supply apparatus as claimed in claim 15,
wherein the current adjuster includes an NPN-type transistor having a collector thereof connected to the FB terminal of the PWM control IC, having an emitter thereof connected through a resistor to the negative power supply line, and having a base thereof connected to a line of the feedback signal.

17. A switching power supply apparatus as claimed in claim 15,
wherein the current adjuster includes an NPN-type transistor having a collector thereof connected to the FB terminal of the PWM control IC, having an emitter thereof connected through a resistor to the negative power supply line, and having a base thereof connected to a line of the feedback signal, and in series with the resistor connected between the base of the NPN-type transistor and the negative power supply line is connected an NPN-type transistor having a collector and a base thereof connected together.

18. A switching power supply apparatus as claimed in claim 2,
wherein, when a pulse-width modulation (PWM) control integrated circuit (IC) is used as the switching controller,
a start-up corrector is additionally provided to correct start-up of the PWM control IC;
a start-up switcher is additionally provided to turn on and off supply of operating power to the signal level checker;

a first resistor is connected between a feedback (FB) terminal of the PWM control IC and the negative power supply line;

the signal level checker feeds a capacitor for soft starting (CS) terminal controller, which serves as the operation/nonoperation switcher, and the FB terminal with the operation control signal and an inverted feedback signal, respectively, according to a result of checking of the signal level of the feedback signal;

the CS terminal controller connects and disconnects a CS terminal of the PWM control IC to and from the negative power supply line according to the operation control signal;

the start-up corrector detects whether or not the feedback signal is present so that, if the feedback signal is present, the start-up corrector connects, through a second resistor, the FB terminal of the PWM control IC to the negative power supply line and, if not, the start-up corrector cuts off the second resistor; and the start-up switcher detects whether or not the feedback signal is present so that, if the feedback signal is present, the start-up switcher turns on supply of the operating power to the signal level checker and, if not, the start-up switcher turns off supply of the operating power to the signal level checker.

19. A switching power supply apparatus as claimed in claim 18, wherein the start-up switcher includes an NPN-type transistor having a collector thereof connected to a node between a current detection resistor connected to a line of the feed back signal and an internal reference voltage line of the signal level checker, having a base thereof connected to the phototransistor, and having an emitter thereof connected to the negative power supply line.

20. A switching power supply apparatus as claimed in claim 18, wherein the start-up corrector includes an NPN-type transistor having a collector thereof connected through the second resistor to the FB terminal of the PWM control IC, having a base thereof connected through a resistor to the phototransistor, and having an emitter thereof connected to the negative power supply line.

21. A switching power supply apparatus as claimed in claim 2, wherein, when a pulse-width modulation (PWM) control integrated circuit (IC) is used as the switching controller, a start-up corrector is additionally provided to correct start-up of the PWM control IC;

a first resistor is connected between a feedback (FB) terminal of the PWM control IC and the negative power supply line;

the signal level checker feeds a capacitor for soft starting (CS) terminal controller, which serves as the operation/nonoperation switcher, and the FB terminal with the operation control signal and an inverted feedback signal, respectively, according to a result of checking of the signal level of the feedback signal;

the CS terminal controller connects and disconnects a CS terminal of the PWM control IC to and from the negative power supply line according to the operation control signal; and the start-up corrector detects whether or not the feedback signal is present so that, if the feedback signal is present, the start-up corrector connects, through a diode and the second resistor, the FB terminal of the PWM control IC to the negative power source line and turns on supply of operating power to the signal level checker and, if not, the start-up corrector cuts off the diode and the second resistor and turns off supply of the operating power to the signal level checker.

22. A switching power supply apparatus as claimed in claim 21, wherein the start-up corrector includes an NPN-type transistor having a collector thereof connected through the diode and the second resistor to the FB terminal of the PWM control IC, having a base thereof connected through a resistor to the phototransistor, and having an emitter thereof connected to the negative power supply line.

23. A switching power supply apparatus as claimed in claim 21, wherein the signal level checker includes, for generation of the reference voltage, voltage division resistors, of which a lower-potential-side resistor is divided into two resistors, with a node therebetween connected through a diode to the CS terminal controller, and the CS terminal controller is connected through another diode to the CS terminal of the PWM control IC.

24. A switching power supply apparatus as claimed in claim 2, wherein, when a pulse-width modulation (PWM) control integrated circuit (IC) is used as the switching controller, a start-up switcher is additionally provided to turn on and off supply of operating power to the signal level checker;

a current adjuster is additionally provided that is connected between a feedback (FB) terminal of the PWM control IC and the negative power supply line to adjust a current output from the FB terminal according to the signal level of the feedback signal;

the signal level checker feeds a capacitor for soft starting (CS) terminal controller, which serves as the operation/nonoperation switcher, with the operation control signal according to a result of checking of the signal level of the feedback signal;

the CS terminal controller connects and disconnects a CS terminal of the PWM control IC to and from the negative power supply line according to the operation control signal; and the start-up switcher detects whether or not the feedback signal is present so that, if the feedback signal is present, the start-up switcher turns on supply of operating power to the signal level checker and, if not, the start-up switcher turns off supply of operating power to the signal level checker.

25. A switching power supply apparatus having a serial circuit, including a primary coil of a transformer and a main switching device, connected between a positive and a negative power supply line connected to a direct-current power source, the switching power supply apparatus outputting a desired direct-current voltage by controlling the main switching device according to a feedback signal obtained as a result of comparison between a direct-current voltage obtained through rectification of a high-frequency voltage induced in a secondary coil of the transformer by the main switching device performing switching operation and a previously set reference voltage, wherein a signal level of the feedback signal is compared with a signal level of a previously generated oscillation signal;

according to a result of the comparison, an on-state duty of a drive signal to be fed to the main switching device is determined and switching between burst switching control and continuous switching control is performed; and while switching operation of the main switching device is being stopped in burst switching control, supply of operating power for driving the main switching device is stopped.

26. A switching power supply apparatus as claimed in claim 25, wherein burst switching control is achieved by turning on and off supply of operating power to a switching controller that drives the main switching device.

27. A switching power supply apparatus as claimed in claim 25, wherein, when a pulse-width modulation (PWM) control integrated circuit (IC) is used as the switching controller, a capacitor is connected between a feedback (FB) terminal of the PWM control IC and an internal power terminal connected to an internal power supply line.

28. A switching power supply apparatus as claimed in claim 25, wherein, when a pulse-width modulation (PWM) control integrated circuit (IC) is used as the switching controller, a serial circuit composed of a capacitor and a resistor is connected between a feedback (FB) terminal of the PWM control IC and an internal power terminal connected to an internal power supply line.

* * * * *